(12) United States Patent
Mumick et al.

(10) Patent No.: US 10,298,749 B2
(45) Date of Patent: May 21, 2019

(54) CALLBACK NOTIFICATION FROM DEVICES WITH INSUFFICIENT CREDIT FOR COMMUNICATION

(71) Applicant: Kirusa, Inc., New Providence, NJ (US)

(72) Inventors: Inderpal Singh Mumick, Berkely Heights, NJ (US); Surinder Singh Anand, Highland, NJ (US)

(73) Assignee: Kirusa, Inc., New Providence, NJ (US)

( * ) Notice: Subject to any disclaimer, the term of this patent is extended or adjusted under 35 U.S.C. 154(b) by 0 days.

(21) Appl. No.: 15/594,583

(22) Filed: May 13, 2017

(65) Prior Publication Data

US 2017/0331946 A1 Nov. 16, 2017

Related U.S. Application Data

(60) Provisional application No. 62/336,579, filed on May 14, 2016.

(51) Int. Cl.
*H04M 3/02* (2006.01)
*H04M 15/00* (2006.01)
(Continued)

(52) U.S. Cl.
CPC .............. *H04M 3/02* (2013.01); *H04L 67/26* (2013.01); *H04M 3/42195* (2013.01); *H04M 15/08* (2013.01); *H04M 15/56* (2013.01); *H04M 15/8044* (2013.01); *H04M 15/8055* (2013.01); *H04M 15/85* (2013.01); *H04M 15/852* (2013.01); *H04M 15/88* (2013.01); *H04W 4/14* (2013.01); *H04W 4/16* (2013.01); *H04W 4/20* (2013.01); *H04W 4/24* (2013.01); *H04M 3/2218* (2013.01); *H04M 3/42042* (2013.01);
(Continued)

(58) Field of Classification Search
CPC ..... H04M 3/42022; H04M 3/02; H04M 15/00
See application file for complete search history.

(56) References Cited

U.S. PATENT DOCUMENTS

| | | | |
|---|---|---|---|
| 2004/0192359 A1* | 9/2004 | McRaild | H04M 15/00 455/466 |
| 2013/0188786 A1* | 7/2013 | Kahn | H04M 3/543 379/142.01 |
| 2014/0199960 A1* | 7/2014 | Kahn | H04M 3/42042 455/405 |

FOREIGN PATENT DOCUMENTS

| | | | | |
|---|---|---|---|---|
| WO | 2012125012 A1 | 9/2012 | | |
| WO | 2015137899 A2 | 9/2015 | | |
| WO | WO/2015/137899 | * 9/2015 | ............ | H04M 17/00 |

* cited by examiner

*Primary Examiner* — Myron Wyche
(74) *Attorney, Agent, or Firm* — Ashok Tankha

(57) ABSTRACT

A method and a callback notification system (CNS) are provided for sending a missed call ring alert (MCRA) from a source number to a destination number. The CNS receives communication information from a calling party device (CGPD) or a network thereof, when an unsuccessful communication attempt is made by the CGPD to contact a called party device (CDPD), and places a call to the destination number with an identification of an originator of the call as the source number using the communication information. The CNS identifies a ring of the CDPD when the call successfully reaches the destination number and terminates the call before chargeable completion of the call, thereby sending an MCRA from the source number of the CGPD to the destination number of the CDPD. The CNS sends one or more alternative callback notifications to the destination number, concurrently with the MCRA or if the MCRA is unsuccessful.

41 Claims, 35 Drawing Sheets

```
┌─────────────────────────────────────────────────────────┐ 101
│ RECEIVE COMMUNICATION INFORMATION COMPRISING THE SOURCE │
│ NUMBER AND THE DESTINATION NUMBER FROM THE CALLING PARTY│
│ DEVICE OR A NETWORK OF THE CALLING PARTY, WHEN AN       │
│ UNSUCCESSFUL COMMUNICATION ATTEMPT IS MADE BY THE       │
│ CALLING PARTY DEVICE TO CONTACT THE CALLED PARTY DEVICE │
└─────────────────────────────────────────────────────────┘
                             │
                             ▼
┌─────────────────────────────────────────────────────────┐ 102
│ SEND ONE OR MORE CALLBACK NOTIFICATIONS TO THE          │
│ DESTINATION NUMBER WITH AN IDENTIFICATION OF AN         │
│ ORIGINATOR OF THE CALLBACK NOTIFICATIONS AS THE SOURCE  │
│ NUMBER USING THE RECEIVED COMMUNICATION INFORMATION     │
└─────────────────────────────────────────────────────────┘
```

(51) Int. Cl.
    *H04W 4/14*      (2009.01)
    *H04W 4/20*      (2018.01)
    *H04L 29/08*     (2006.01)
    *H04M 3/42*      (2006.01)
    *H04W 4/16*      (2009.01)
    *H04M 15/08*     (2006.01)
    *H04W 4/24*      (2018.01)
    *H04M 3/22*      (2006.01)
    *H04W 80/12*     (2009.01)

(52) U.S. Cl.
    CPC .. *H04M 2203/651* (2013.01); *H04M 2207/12* (2013.01); *H04M 2207/18* (2013.01); *H04W 80/12* (2013.01)

CALLBACK NOTIFICATION FROM DEVICES WITH INSUFFICIENT CREDIT FOR COMMUNICATION

CROSS-REFERENCE TO RELATED APPLICATIONS

This application claims priority to and the benefit of the provisional patent application No. 62/336,579 titled "Callback Notification From Devices With Insufficient Credit For Communication", filed in the United States Patent and Trademark Office on May 14, 2016. The specification of the above referenced patent application is incorporated herein by reference in its entirety.

BACKGROUND

A large majority of users of user devices in emerging markets, as well as a growing number of users in North America and Europe possess prepaid accounts with telecommunication carriers, for example, AT&T Inc., Verizon Communications Inc., Vodafone Group Plc, MTN Group, Orange, Bharti Airtel Limited, etc. Some users, hereinafter referred to as "calling parties", run out of credit for communication in their prepaid accounts with the telecommunication carriers. As used herein, "calling party" refers to a user who wants to contact a called party by placing a call to the called party or by sending a message to the called party. Also, as used herein, "called party" refers to a user who is a recipient or an intended recipient of a call placed by a calling party or a message sent by the calling party using a calling party device. Moreover, these calling parties may run out of credit at a time or a place where they do not have an easy access to recharge their prepaid accounts with credit for communication. Furthermore, when the calling parties do not possess sufficient credit for data communication over a data network of the telecommunication carriers, the calling parties are unable to communicate over the data network, for example, using voice over internet protocol (VoIP) calls, instant messaging services using the internet, etc. Furthermore, some user devices do not possess capabilities for data communication to allow communication over other data networks, for example, a free Wi-Fi® hotspot that implements Wi-Fi® of Wi-Fi Alliance Corporation. This leaves the calling parties in a situation where they cannot communicate even for urgent needs, for example, by placing a call, sending a short message service (SMS) message, etc.

A missed call is a voice call attempt by a calling party to a called party that is not answered by the called party. Since charging for a voice call starts when the called party answers the call, there is no charge to the calling party or the called party for a missed call. Even though missed calls to a number are free, if a calling party does not have credit for communication in a prepaid account, the calling party using a calling party device is unable to place a missed call. Moreover, the calling party using the calling party device needs to have credit in a prepaid account to send a short message service (SMS) message to a called party device since the calling party will be charged for sending the SMS message as soon as the SMS message is sent from the calling party device, irrespective of whether the SMS message is delivered to the called party device.

Consider a typical scenario where a user is unable to communicate due to lack of credit in his/her mobile prepaid account. In this scenario, the user arrives home from a trip and attempts to call or send a short message service (SMS) message to a partner from a mobile device, but is unable to communicate as he/she does not have sufficient credit for communication in his/her mobile prepaid account. In the meantime, the partner is expecting to receive a call or an SMS message from the user and wonders why the user has not contacted yet. If the user is able to place a missed call or send a callback SMS message to the partner, the partner, on receiving an alert about the missed call or the callback SMS message, can contact the user to connect and complete communication with the user. Hence, there is a need for a method and a system for sending a callback notification, for example, a missed call or a callback SMS message from a calling party device to a called party device in the absence of credit or due to insufficient credit for communication in a calling party's prepaid account.

In another scenario, when the calling party has prepaid credit for communication in a prepaid account or a postpaid billing account but does not have a facility to place a call or send a short message service (SMS) message to an international number, the calling party is unable to contact the international number. In yet another scenario, the calling party device has prepaid credit for communication in a prepaid account or a postpaid billing account but the calling party does not want to place a paid call to another number and would instead like to place a missed call that will be free. The calling party cannot be sure that the call will not be charged though the calling party only wants to place a missed call. For example, if the called party picks up the call before the calling party terminates the call, the calling party will be charged. Hence, there is a need for a method and a system that ensures that the call placed is a missed call and not a paid call.

Furthermore, with a choice of telecommunication carriers available for selection by prospective customers, the telecommunication carriers look for ways to improve customer satisfaction and customer retention. Furthermore, telecommunication carriers constantly upgrade services and offer new services for generating incremental revenue from the customers. Hence, there is a need for a method and a system that generate incremental revenue from customers of telecommunication carriers. Furthermore, there is a need for improving satisfaction and retention of customers of the telecommunication carriers.

Therefore, there is a long felt need for a method and a system for sending one or more callback notifications, for example, a missed call ring alert, a callback short message service (SMS) message, and other types of callback notifications, for example, a callback client push notification, a callback network initiated unstructured supplementary service data (USSD) push notification, a callback wireless internet browser push notification, a callback subscriber identity module push notification, a callback electronic mail, a client application notification, etc., from a source number of a calling party device to a destination number of a called party device in the absence of credit or due to insufficient credit for communication in an account registered by a network of the calling party. Moreover, there is a need for a method and a system for sending a callback notification, for example, by placing a missed call and/or by sending another callback notification such as an SMS message from any calling party device independent of features available on the calling party device. While conventional systems may allow calling parties to notify a called party by other means such as dialing a USSD code, but require the calling parties to be aware of such a service, there is a need for a method and a system for automatically detecting attempts made by a calling party device to contact a called party device that are unsuccessful due to absence of credit or insufficient credit for communication in the calling party's account or due to absence of network connectivity between the calling party device and the called party device, and placing a missed call or sending a callback SMS message or another callback notification to the called party device without the calling party initiating the missed call or sending the callback SMS message or other callback notification. Furthermore, there is a need for a method and a system for placing a missed call or sending another callback notification, for example, a callback SMS message to an international number in the absence of an international calling facility. Furthermore, there is a need for a method and a system for ensuring that the call placed is a missed call and not a paid call. Furthermore, there is a need for a method and a system for generating incremental revenue for telecommunication carriers from their customers and improving satisfaction and retention of customers of the telecommunication carriers.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above mentioned need for sending one or more callback notifications, for example, a missed call ring alert, a callback short message service (SMS) message, a callback client push notification, a callback network initiated unstructured supplementary service data (USSD) push notification, a callback wireless internet browser (WIB) push notification, a callback subscriber identity module (SIM) push notification, a callback electronic mail (email), a client application notification, etc., from a source number of a calling party device to a destination number of a called party device in the absence of credit or due to insufficient credit for communication in an account registered by a network of a calling party associated with the calling party device. Moreover, the method and the system disclosed herein send a callback notification, for example, by placing a missed call and/or by sending an alternative callback notification such as an SMS message from any calling party device independent of features available on the calling party device. Furthermore, the method and the system disclosed herein automatically detect communication attempts made by a calling party device to contact a called party device that are unsuccessful due to absence of credit or insufficient credit for communication in the calling party's account or due to absence of network connectivity between the calling party device and the called party device, and place a missed call or send an alternative callback notification, for example, a callback SMS message to the called party device without the calling party initiating the missed call or sending the callback notification. Furthermore, the method and the system disclosed herein place a missed call or send an alternative callback notification, for example, a callback SMS message to an international number in the absence of an international calling facility. Furthermore, the method and the system disclosed herein ensure that the call placed is a missed call and not a paid call. Furthermore, the method and the system disclosed herein generate incremental revenue for telecommunication carriers from their customers and improve satisfaction and retention of customers of the telecommunication carriers.

The method disclosed herein employs a callback notification system comprising at least one processor configured to execute computer program instructions for sending one or more callback notifications as disclosed above from a source number of a calling party device to a destination number of a called party device. The callback notification system receives communication information comprising the source number and the destination number from the calling party device or a network of the calling party associated with the calling party device when a communication attempt made by the calling party device to contact the called party device is unsuccessful, for example, due to insufficient credit for voice communication, and/or a short message service (SMS) communication, and/or data communication over the network in the calling party's account or due to absence of network connectivity between the calling party device and the called party device. The callback notification system sends the callback notification to the destination number with an identification of an originator of the callback notification as the source number using the received communication information. For example, the callback notification system places a call to the destination number with an identification of an originator of the call as the source number using the received communication information. The callback notification system sends a missed call ring alert from the source number of the calling party device to the destination number of the called party device by identifying a ring of the called party device when the call successfully reaches the destination number and terminating the call on identification of the ring of the called party device and prior to chargeable completion of the call.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
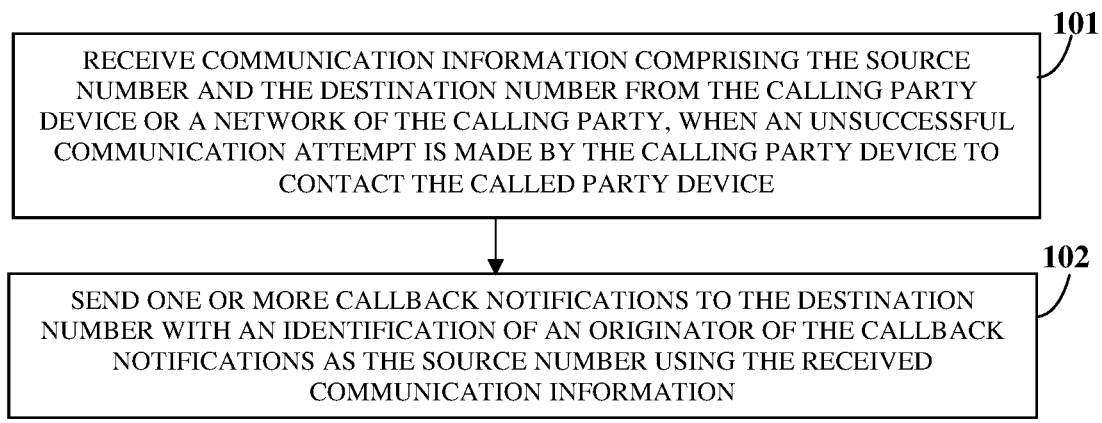
FIG. 1 illustrates a method for sending one or more callback notifications from a source number of a calling party device to a destination number of a called party device.

FIG. 1 illustrates a method for sending one or more callback notifications from a source number of a calling party device to a destination number of a called party device. As used herein, "source number" refers to one of one or more numbers owned by a user of the calling party device. Also, as used herein, "destination number" refers to one of one or more numbers of the called party device to which a callback notification is sent. Also, as used herein, "calling party device" and "called party device" refer to user devices, for example, a mobile phone, a smartphone, a tablet computing device, a computer capable of making calls, and any other type of communication device capable of placing and receiving calls and/or initiating and receiving other communication attempts. Also, as used herein, "user devices" refer to electronic devices, for example, personal computers, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, client devices, portable electronic devices, network enabled computing devices, interactive network enabled communication devices, gaming devices, image capture devices, any other suitable computing equipment, combinations of multiple pieces of computing equipment, etc.

Also, as used herein, "callback notification" refers to a notification delivered to a called party device requesting a called party to contact a calling party back when a communication attempt made by the calling party device to contact the called party device is unsuccessful. Also, as used herein, "communication attempt" refers to an attempt made by the calling party device to contact the called party device, for example, by placing a call or sending a short message service (SMS) message to the called party device. The communication attempt that does not go through from the calling party device to the called party device is deemed unsuccessful, for example, due to absence of credit or insufficient credit for voice communication, and/or an SMS communication, and/or data communication over a network in an account registered by the network for the calling party, or absence of network connectivity between the calling party device and the called party device, incapability of the calling party device for data communication, or absence of an international calling facility, etc. The communication attempt that is deemed unsuccessful is hereafter referred to as "unsuccessful communication attempt". Also, as used herein, "network" refers to a telecommunication network that allows devices connected to the network, for example, the calling party device and the called party device to interact with each other and share resources. The network is a carrier network, a data network such as an internet protocol (IP) network, etc.

The callback notifications comprise a missed call ring alert, a callback short message service (SMS) message, a callback client push notification, a callback network initiated unstructured supplementary service data (USSD) push notification, a callback wireless internet browser (WIB) push notification, a callback subscriber identity module (SIM) push notification, a callback electronic mail (email), a client application notification, etc. As used herein, "missed call ring alert" refers to an alert generated by placement of a call to the called party device to produce a single ring on the called party device followed by termination of the call resulting in the placed call appearing as a missed call on the called party device. Also, as used herein "callback SMS message" refers to a callback notification sent to the called party device via an SMS, requesting the called party to contact the calling party back when a communication attempt made by the calling party device to contact the called party device is unsuccessful.

Also, as used herein, "push notification" refers to a notification that is pushed to the called party device, for example, by an unstructured supplementary service data (USSD) gateway, a wireless internet browser server, etc., requesting the called party to contact the calling party back when a communication attempt made by the calling party device to contact the called party device is unsuccessful. Also, as used herein, "callback client push notification" refers to a callback notification that is pushed to the called party device using client push notification services, for example, the Apple push notification service of Apple Inc., the Firebase® cloud messaging services of Google Inc., the Windows® push notification services of Microsoft Corporation, etc., requesting the called party to contact the calling party back when a communication attempt made by the calling party device to contact the called party device is unsuccessful. Also, as used herein, "callback electronic mail" is an electronic mail (email) notification sent as a callback request to an email address of the called party, requesting the called party to contact the calling party back, if an electronic mail identification (email ID) of the called party is available with the calling party, when a communication attempt made by the calling party device to contact the called party device is unsuccessful. Also, as used herein, "client application notification" refers to a callback notification in a client application implemented on the called party device requesting the called party to contact the calling party back when a communication attempt made by the calling party device to contact the called party device is unsuccessful.

The method disclosed herein employs a callback notification system comprising at least one processor configured to execute computer program instructions for sending one or more callback notifications from a source number of a calling party device to a destination number of a called party device. In an embodiment as disclosed in the detailed description of FIG. 2, the callback notification system sends a missed call ring alert as a callback notification to the called party device. In another embodiment as disclosed in the detailed description of FIG. 3B, the callback notification system sends a missed call ring alert as a callback notification concurrently with one or more alternative callback notifications, for example, a callback short message service (SMS) message, a callback network initiated unstructured supplementary service data (USSD) push notification, etc., to the called party device. For example, the callback notification system places a missed call ring alert and sends a flash SMS message stating "I do not have credit in my account now; please call me back" concurrently to the called party device. The missed call ring alert and the flash SMS message are rendered on a graphical user interface of the called party device. The missed call ring alert catches attention of the called party and the missed call is stored in a call log of the called party device, whereas the flash SMS message catches attention when the called party activates the called party device and provides the context of the missed call. In another embodiment, the callback notification sent to the called party device comprises additional information, for example, description of another service offered by a carrier network provider, pricing information of such a service, information about steps to buy or subscribe to such a service, etc. In another embodiment, the callback notification sent to the called party device comprises information describing or promoting a product or a service belonging to an external enterprise. In another embodiment, the callback notification sent to the called party device comprises an advertisement for a product or a service owned by an external enterprise.

In an embodiment, a client application, that is, a callback notification application is provided by the callback notification system on the calling party device. The callback notification application is a software application downloadable and usable on the calling party device. The software application is configured as a mobile application, for example, a smartphone application or an application for any feature phone. The callback notification application on the calling party device communicates with the callback notification system via a data network, for example, the internet. In the method disclosed herein, the callback notification system receives 101 communication information comprising the source number and the destination number from the calling party device or the network of the calling party associated with the calling party device, when an unsuccessful communication attempt is made by the calling party device to contact the called party device. In an embodiment, the communication information further comprises a timestamp of the unsuccessful attempt made by the calling party device to contact the called party device.

The carrier network is a communication network established by a carrier, for example, AT&T Inc., Verizon Communications Inc., etc., for providing voice communication, and/or a short message service (SMS) communication, and/ or data communication facilities to customers of the carrier network. Users who are customers of the carrier network can use the carrier network by buying prepaid credit, hereinafter referred to as "credit", or possessing postpaid accounts with the carrier. The users engage in voice communication, for example, through fixed line telephone networks, cellular networks implementing, for example, a global system for mobile communications (GSM) standard, a code division multiple access (CDMA) method, etc., and other voice communication networks that form part of the carrier network. The users engage in data communication through a data network that, in an embodiment, forms a part of the carrier network. The calling party can connect the calling party device to a carrier's data network, for example, by possessing credit for the connection, by obtaining free access to the data network via the callback notification system through prior authorization from a cellular operator, etc. The users whose credit for voice communication, and/or SMS communication, and/or data communication over the network is insufficient are not allowed to place any call, including a missed call, or send a short message service (SMS) message over the network. A communication attempt made by these users' calling party devices will be unsuccessful. In an embodiment, the callback notification system receives the communication information of the unsuccessful attempt made by the calling party device to contact the called party device from the carrier network. In different embodiments of the callback notification system, the callback notification system receives the communication information from different components of the carrier network.

In an embodiment, the callback notification system receives the communication information of the unsuccessful communication attempt from a mobile switching center (MSC) in the carrier network associated with the calling party device. In this embodiment, the callback notification system receives the communication information by extracting the source number and the destination number from signaling information of the unsuccessful communication attempt made by the calling party device to contact the called party device. The signaling information is forwarded by the MSC of the carrier network associated with the calling party device. The MSC performs communication switching functions comprising, for example, call set-up, release of calls, routing of calls, routing of short message service (SMS) messages, routing of conference calls, fax, service billing, and interfacing with a public switched telephone network (PSTN). The carrier network provider reserves a mobile station international subscriber directory number (MSISDN) or a short code that is used as a C number for forwarding communication attempts, for example, call attempts by calling party devices with insufficient credit for voice communication, and/or a short message service (SMS) message communication, and/or data communication. The MSISDN characterizes the carrier network provider and tracks the communication attempts. The carrier network provider configures the MSC to route calls or SMS messages to the callback notification system through the reserved C number. Moreover, the carrier network provider identifies a list of MSISDNs for which the callback notification system is activated.

Furthermore, for each of the identified mobile station international subscriber directory numbers (MSISDNs), the carrier network provider configures a home location register (HLR) or the MSC to forward the communication attempts by calling party devices with insufficient credit for voice communication, and/or the short message service (SMS) communication, and/or data communication to the callback notification system through the reserved C number. The HLR is a database containing pertinent data of users of the carrier network, for example, the calling party and the called party. The HLR comprises, for example, recent location information, account status, preferences, etc., of the calling party and the called party. For sending an SMS message by the calling party device, before the carrier network provider forwards the SMS message to the called party device, the carrier network provider scans through the HLR to find the MSC that the called party device has recently used. If the MSC recently used by the called party device reports the called party device is not available, an SMS message waiting flag is set in the HLR. The called party device receives the SMS message sent by the calling party device only when the MSC notifies the HLR that the called party device is detected. The carrier network provider ensures that the integrated services digital network (ISDN) user part (ISUP) or session initiation protocol (SIP) signaling information for the forwarded communication attempts includes the MSISDN of the called party device in an "original_called-_party" field or a "redirecting_party" field.

In another embodiment, the callback notification system receives the communication information of the unsuccessful communication attempt from a service control point (SCP) of an intelligent network (IN), that is, the SCP/IN, in the carrier network. The carrier network provider specifies a protocol or an application programming interface (API) to be used for communication between the SCP/IN and the callback notification system. The protocol comprises the communication information comprising the source number, the destination number, and the timestamp of the unsuccessful communication attempt. The SCP/IN pushes the communication information to the callback notification system. In an embodiment, the callback notification system pulls the communication information from the SCP/IN. The protocol further comprises a granularity of the communication between the SCP/IN and the callback notification system, for example, pushing the communication information about individual unsuccessful communication attempts and pushing or pulling the communication information for a batch of unsuccessful communication attempts. Pushing individual unsuccessful communication attempts ensures a shortest delay between the unsuccessful communication attempt by the calling party device and a callback notification received by the called party device through the callback notification system. Pushing or pulling unsuccessful communication attempts in batches potentially reduces load on the SCP/IN. In an embodiment, the granularity used is pushing of individual unsuccessful communication attempts by the SCP/IN. The communication information of the unsuccessful communication attempts is pushed or pulled using an application programming interface (API) or a query, in real time or spooled, one individual communication attempt at a time or multiple communication attempts in a batch. In an embodiment, the communication information about a larger set of communication attempts, not limited to unsuccessful communication attempts, is transmitted to the callback notification system. In this embodiment, the callback notification system further filters out the communication information only for the relevant unsuccessful communication attempts from the larger set of communication attempts for which the callback notification system receives the communication information.

Furthermore, the protocol comprises frequency and size of a batch of unsuccessful communication attempts when the service control point (SCP) of an intelligent network (IN), that is, the SCP/IN, pushes the communication information. For example, the SCP/IN pushes the unsuccessful communication attempts in batches at a fixed periodic interval, for example, sixty seconds. In another embodiment, the SCP/IN pushes the unsuccessful communication attempts in batches based on the number of unsuccessful communication attempts or a combination of the number of unsuccessful communication attempts and frequency of the pushes. For example, the SCP/IN pushes batches of hundred unsuccessful communication attempts with a frequency of at least once every sixty seconds. If there are more than a hundred unsuccessful communication attempts in less than sixty seconds, the SCP/IN pushes the unsuccessful communication attempts in batches of hundred. If fewer than a hundred unsuccessful communication attempts are logged in a sixty second interval after a previous batch is pushed, then the SCP/IN pushes the batch after the sixty second interval elapses. In an embodiment, the frequency used to push the unsuccessful communication attempts in a batch is once every thirty seconds. In another embodiment, the callback notification system pulls the unsuccessful communication attempts in batches at a fixed periodic time interval, for example, every sixty seconds. In an embodiment, the frequency used to pull the unsuccessful communication attempts in a batch is once every thirty seconds. Furthermore, the carrier identifies a list of mobile station international subscriber directory numbers (MSISDNs) for which the callback notification system is activated and configures the SCP/IN to forward the communication information for the unsuccessful communication attempts for each of the identified MSISDNs to the callback notification system.

In another embodiment, the callback notification system receives the communication information from a billing server and/or a mediation platform of the carrier network. The billing server is a computer system that handles billing of the calling party and stores billing details of the communication attempts made by the calling party to contact the called party. The mediation platform is a computer system that converts data of an American standard code for information interchange (ASCII) format or a binary format to a normalized data type format and aids in billing performed by the billing server. The callback notification system periodically pulls call detail records from the service control point (SCP) of the intelligent network (IN), that is, the SCP/IN, and/or the billing server, and/or the mediation platform. As used herein, "call detail records" refer to data records produced by a network element in the carrier network, for example, a service control point, an intelligent network, a mobile switching center, a billing server, a mediation platform, etc., that documents details of communication attempts over the carrier network. The call detail records comprise, for example, a calling party number or the source number, a called party number or the destination number, type of communication attempt such as a call, a short message service (SMS) message or data, date and time of the communication attempt, size or duration of the communication attempt, success or failure of the communication attempt including reasons for the failure or termination of the communication attempt, success or failure of a charging attempt, the amount charged, etc.

The call detail records are typically written in batches in files, and are processed by and exchanged between the different network elements, for example, a service control point, an intelligent network, a mobile switching center, a billing server, a mediation platform, etc. The call detail records are stored in databases as individual records for subsequent processing and analysis for generating reports about usage, revenue, costs, and network utilization as needed by different entities. As used herein, "call detail records" comprises call detail records stored in call detail record (CDR) files, individual call detail records stored in databases, and selected and relevant information about communication attempts sent from a network element, for example, the service control point of an intelligent network, or a billing server, or a mediation platform to the callback notification system for the purpose of identifying unsuccessful communication attempts made by the calling party devices to contact the called party devices. In an embodiment, the intelligent network, or the billing server, or the mediation platform generates call detail records for calls that fail and shares the call detail records with the callback notification system by pushing the call detail record files on a periodic basis, or provides access to the callback notification system to pull the call detail records, for example, using secure file transfer protocols.

The callback notification system receives the communication information by processing the call detail records received from the service control point (SCP) of an intelligent network (IN), or the billing server, or the mediation platform. The callback notification system applies filters to the call detail records for identifying communication attempts made by the calling party device to contact the called party device that are unsuccessful, for example, due to insufficient credit for voice communication, and/or a short message service (SMS) communication, and/or data communication over the carrier network in the calling party's account or absence of network connectivity between the calling party device and the called party device, if the call detail records received from the SCP of the IN, that is, the SCP/IN, or the billing server, or the mediation platform are unfiltered. The callback notification system pulls the communication information of the unsuccessful communication attempts from the SCP/IN in the carrier network using one of multiple protocols. The protocols comprise, for example, pulling call detail records for the communication attempts made by calling party devices with insufficient credit for communication or pulling call detail records for all communication attempts and then filtering the communication attempts made by calling party devices with insufficient credit for communication.

For every communication attempt, the call detail records identify the source number, the destination number, starting time of the communication attempt, duration of communication, type of communication attempt, etc. In an embodiment, the callback notification system receives the communication information by periodically sending a query about unsuccessful communication attempts made by the calling party devices to contact the called party devices to the service control point (SCP) of an intelligent network (IN), that is, the SCP/IN of the carrier network, or the billing server, and/or the mediation platform. The callback notification system sends a query about the unsuccessful communication attempts to a database, or a system, or a software module on the SCP/IN, or the billing server, or the mediation platform. The callback notification then processes the information received in response to the sent query about the unsuccessful communication attempts to filter out the unsuccessful communication attempts and identify the source number and the destination number. The protocols further comprise, for example, pulling the communication information about the unsuccessful communication attempts from a database in the carrier network or pulling the communication information about the unsuccessful communication attempts directly from a signaling system number 7 (SS7) network or a signaling transport (SIGTRAN) network.

When the callback notification system initiates a pull of the call detail records from the service control point (SCP), the carrier network provider shares information about the call detail records. The information about the call detail records shared by the carrier comprises, for example, a format of the call detail records, a location of the call detail records, and access details for pulling the call detail records for communication attempts that are unsuccessful due to insufficient credit for communication. In an embodiment, the carrier network provider configures the SCP of an intelligent network (IN), that is, the SCP/IN, to generate separate call detail records for communication attempts that are unsuccessful due to insufficient credit for communication. The information about the call detail records shared by the carrier network provider further comprises information about a table, for example, a table name and a database schema of a database in which the communication information of all communications, for example, calls, or unsuccessful communication attempts, for example, unsuccessful call attempts are stored. Moreover, the carrier network provider provides the callback notification system with read access to the database table.

In an embodiment, the callback notification system receives the communication information by processing call detail records periodically pushed by the service control point (SCP) of the intelligent network (IN), that is, the SCP/IN, or the billing server, or the mediation platform to filter out and identify the source number and the destination number for the unsuccessful communication attempt made by the calling party device to contact the called party device. In another embodiment, the callback notification system receives the communication information in real time from the call detail records pushed by the SCP/IN, or the mobile switching center (MSC), or the billing server, or the mediation platform using an application programming interface (API). The SCP/IN, the MSC, the billing server, and the mediation platform push the communication information comprising the source number and the destination number about the unsuccessful communication attempt in real time to the callback notification system using the API. In another embodiment, the callback notification system receives the communication information from the SCP/IN of the carrier network by receiving signaling information and data traffic processed by the SCP/IN using mirroring on a network switch connected to the SCP/IN. In an embodiment, the callback notification system processes the received signaling information to decode and filter out the unsuccessful communication attempt. Based on the protocol or the API specified by the carrier network provider, the callback notification system is configured and integrated with the carrier network provider for receiving the communication information from the carrier network of the calling party device when the communication attempt made by the calling party device to contact the called party device is unsuccessful, for example, due to insufficient credit for voice communication, and/or a short message service (SMS) communication, and/or data communication over the carrier network.

In an embodiment, the callback notification system connects to the carrier's the service control point (SCP) of the intelligent network (IN), that is, the SCP/IN, or the billing server, or the mediation platform, for example, using file transfer protocols and call detail records for unsuccessful communication attempts, using push or pull mechanisms, which will be then processed for collecting the required details about insufficient credit calls or short message service (SMS) attempts. After the details are collected, the callback notification system uses the collected details to initiate sending of callback notifications to the called party device. In an embodiment, the callback notification system considers one or more predefined fields in the call detail records to filter out communication attempts that failed due to insufficient credit. The predefined fields comprise, for example, a result code, pay type, service type, hotline indicator, user state, etc. In an example, the callback notification system uses the result code field to check for a unique error code corresponding to insufficient credit to find all insufficient credit communication attempts made. In another example, the callback notification system considers a prepaid pay type, normal voice tariff as the service type, normal calls for the hotline indicator, and prepaid active users for the user state for filtering the communication attempts. The callback notification system uses a single or a combination of fields in the call detail records to filter the insufficient credit calls for which the callback notification is to be initiated.

The callback notification system has the flexibility to process the call detail record files in terms of a call detail record format, presence or absence of successful calls, presence or absence of calls that fail due to reasons other than insufficient credit, the protocol used, and frequency of exchanging the call detail record files. The frequency of exchanging the call detail record files impacts a delay between the communication attempt by the calling party and the placement of the missed call ring alert by the callback notification system. The callback notification system minimizes the delay when configured in a mode where the callback notification system pulls the call detail record files. The callback notification system also exposes a representational state transfer RESTful application programming interface (API) or an API such as web services to the intelligent network (IN), or the billing server, or the mediation platform to process the insufficient credit communication attempts in real time.

Figure 9A:
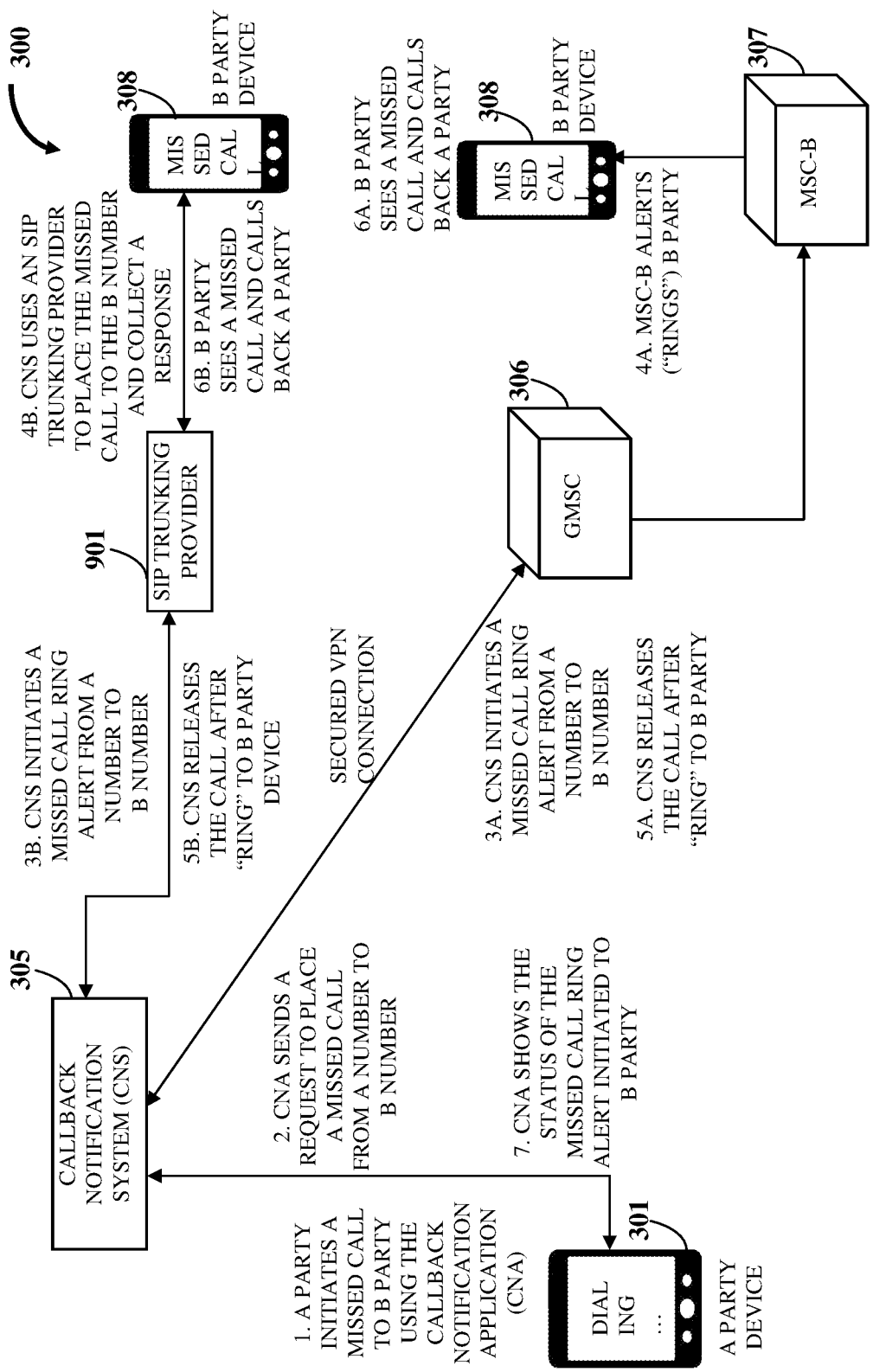
FIGS. 9A-9B exemplarily illustrate embodiments of the system comprising the callback notification system for sending one or more callback notifications from a source number of a calling party device to a destination number of a called party device using communication information received from a client application implemented on the calling party device.
Figure 9B:
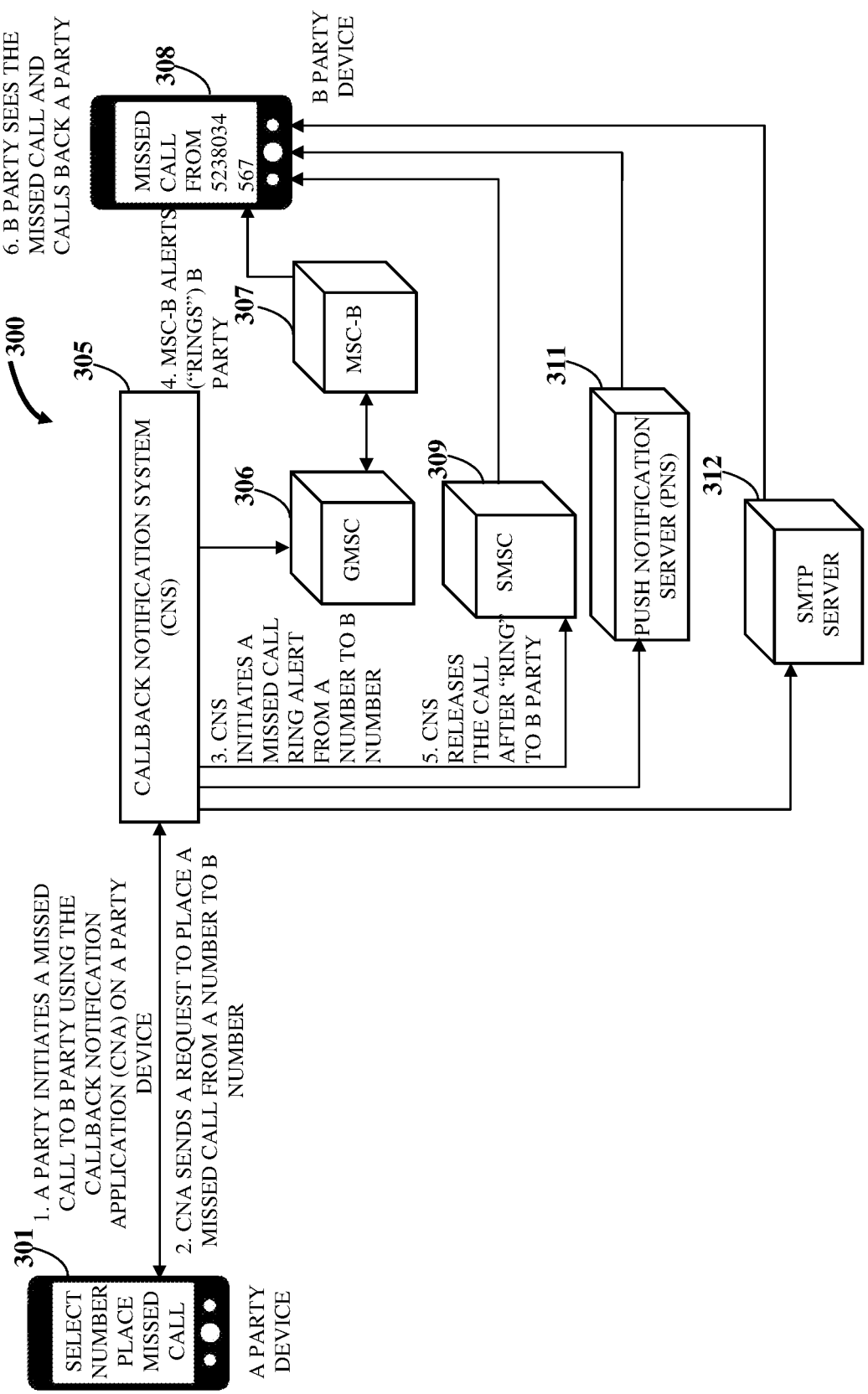

In another embodiment, the callback notification system receives the communication information from the callback notification application implemented on the calling party device as disclosed in the detailed description of FIGS. 9A-9B. The data inputted to the callback notification system, for example, the source number and the destination number received from the callback notification application deployed on the calling party device is transformed, processed, and executed by an algorithm in the callback notification system for sending the callback notification to the called party device as follows. The callback notification system employs a separate method for processing and parsing the input received from the callback notification application deployed on the calling party device to extract the source number and the destination number. This method is different for each mode of communication. Consider an example where the source number is "19081231234" and the destination number is "2348012341234". In an embodiment, the callback notification application sends a JavaScript object notation (JSON) object to the callback notification system over a data network in the following format:

```
{
    destination_number:"2348012341234",
    source_number:"19081231234"
}
```

In an embodiment, the callback notification system, in communication with the callback notification application implemented on the calling party device, detects communication attempts made by the calling party device to contact the called party device that are unsuccessful due to the insufficient credit for voice communication, and/or a short message service (SMS) communication, and/or data communication over the network in the calling party's account. For example, the callback notification system detects an unsuccessful communication attempt made by the calling party device to place a call or send an SMS message from the source number of the calling party device to the destination number of the called party device due to an absence of credit or insufficient credit for voice communication, and/or the SMS communication, and/or data communication in the calling party's account through the callback notification application implemented on the calling party device. The callback notification system receives, captures, and detects information about communication attempts that are unsuccessful due to insufficient credit for voice communication, and/or SMS communication, and/or data communication over the network. A generic computer using a generic program cannot receive communication comprising the source number and the destination number from the calling party device or the network of the calling party associated with the calling party device, when an unsuccessful communication attempt is made by the calling party device to contact the called party device in accordance with the method steps disclosed above.

On receiving the communication information, the callback notification system sends 102 one or more callback notifications to the destination number with an identification of an originator of the callback notifications as the source number using the received communication information. The callback notification system places a call to send a missed call ring alert and/or sends one or more alternative callback notifications, for example, a callback short message service (SMS) message, a callback client push notification, a callback initiated unstructured supplementary service data (USSD) push notification, a callback electronic mail, etc., to the destination number with an identification of an originator of the callback notification as the source number using the received communication information.

For sending a callback notification, for example, a callback short message service (SMS) message by the callback notification system to the destination number of the called party device, the carrier network provider configures a short message service center (SMSC) in the carrier network to allow the callback SMS message to be initiated by the callback notification system. The configuration is such that the SMSC is responsible for reception of SMS messages from the users of the carrier network, that is, the called party device and the calling party device, storage of the SMS messages, forwarding of the SMS messages, delivering of the SMS messages, and maintenance of unique time stamps in the SMS messages. For sending callback client push notifications to the called party device, the callback notification system uses push notification servers via the network, for example, the Apple push notification server of Apple Inc., the Firebase® cloud messaging server of Google Inc., the Windows® push notification services of Microsoft Corporation, etc. For sending callback unstructured supplementary service data (USSD) push notifications to the called party device, the callback notification uses a USSD gateway of the carrier network. For sending callback wireless internet browser (WIB) push notifications to the called party device, the callback notification system uses the SmartTrust® Wib™ push server. For sending callback electronic mails (emails) to the called party device, the callback notification system uses a simple mail transfer protocol (SMTP) server. The WIB push server, the push notification servers, and the SMTP server are herein referred to as "cloud servers". The cloud servers are a collection of separate servers hosted in a cloud computing environment. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides on-demand network access to a shared pool of the configurable computing physical and logical resources. The callback notification system reports, to the calling party device, status of the callback notifications, that is, the missed call ring alert and the alternative callback notifications sent to the called party device. In an embodiment, the callback notification system sends a status of sending the callback notifications from the source number of the calling party device to the destination number of the called party device to the callback notification application implemented on the calling party device. A generic computer using a generic program cannot send one or more callback notifications to the destination number of the called party device with an identification of an originator of the callback notifications as the source number using the received communication information in accordance with the method steps disclosed above.

In an embodiment, the callback notification system generates separate call detail records for each of the sent callback notifications and calculates revenue generated from callbacks and other responses, for example, in the form of short message service (SMS) messages from the called party device to the calling party device by correlating the separate call details records for each of the sent callback notifications with call detail records of the callbacks and the other responses from the called party device. The callback notification system detects successful reach of the callback notifications from the source number of the calling party device to the destination number of the called party device. In an embodiment, the callback notification system reports to the calling party device, the successful reach of the callback notifications to the called party device. The callback notification system measures the volume of callbacks and other responses generated due to the sent callback notifications, and the revenue generated from the callbacks and the other responses from the called party device. The callback notifications trigger the called parties to callback or respond to the callback notification via the carrier network, thereby increasing revenue generated by the carrier network provider. Measuring delivery of the sent callback notifications and metrics of the callbacks and the other responses from the called party device and determining the revenue generated from the callbacks and the other responses from the called party device facilitates building user profiles and classifying users, for example, the calling party and the called party into different categories, for example, based on a delivery rate of the sent callback notifications, a callback rate from the called party device to the calling party device, and average revenue generated for the carrier network provider per callback notification initiated and callback or response received. Each user's profile comprises metrics for the delivery rate, the callback rate, and the average revenue generated per callback notification, where the user is a calling party, and separate metrics for the delivery rate, the callback rate, and the average revenue generated per callback notification, where the user is a called party. A database of the user profiles and the classification of the calling parties and the called parties into different categories, for example, as "preferred", "average", and "not preferred", will enable the carrier network provider to provide specialized offers that benefit users matching their profile and classification and to expand and sustain a subscriber base of the carrier network provider. A generic computer using a generic program cannot generate separate call detail records for each of the sent callback notifications and cannot calculate revenue generated from callbacks and other responses from the called party device to the calling party device in accordance with the method steps disclosed above.

In an embodiment, the callback notification system analyzes the communication information of the unsuccessful communication attempt made by the calling party device to contact the called party device based on one or more predetermined parameters to determine whether the calling party associated with the calling party device as identified by the source number and the called party associated with the called party device as identified by the destination number qualify for sending of the callback notification from the source number to the destination number. The predetermined parameters comprise, for example, a timestamp of the unsuccessful communication attempt, time of sending of the callback notification to the destination number, history of communication attempts to contact the destination number, a profile of the calling party, a profile of the called party, time of day, and load on the callback notification system. Profile data in the profiles of the calling party and the called party comprises, for example, call history comprising calls attempted and calls answered, duration of the answered calls, calls attempted but not answered due to the called party device not being reachable, the called party device being busy, or the called party not answering the calls, calls attempted but not completed due to the calling party hanging up before the called party answers the calls, calls attempted but failed due to insufficient credit in a prepaid account, a category of the destination number, for example, on-net calls, national off-net calls, or international calls attempted and the calls answered, etc. As used herein, "on-net calls" refer to calls made between a calling party and a called party subscribed to the same carrier network. Also, as used herein, "off-net calls" refer to calls between a calling party and a called party subscribed to different carrier networks. The profile data further comprises, for example, data about calls attempted and calls answered where the user is the called party, data about the frequency and amount of recharges to the user's prepaid account, and a snapshot of balance in the user's prepaid account at a different time.

The callback notification system performs data analysis on the communication information to determine whether the callback notification will be sent to the called party device based on whether the calling party and the called party qualify for sending of the callback notification from the source number to the destination number as disclosed in the non-provisional patent application Ser. No. 15/424,903 titled "Placement of a Missed Call" filed in the United States Patent and Trademark Office on Feb. 6, 2017, which claims priority to and the benefit of the provisional patent application No. 62/292,835 titled "Placement Of A Missed Call", filed in the United States Patent and Trademark Office on Feb. 8, 2016, and incorporated herein by reference in its entirety. In an embodiment, the callback notification system determines that the calling party as identified by the source number does not qualify for sending the callback notification at a particular time because of a high frequency of callback notification requests to one or more destination numbers at that time. In another embodiment, the callback notification system determines that the called party as identified by the destination number does not qualify for receiving a callback notification at a particular time because of receiving a recent request from the destination number for sending a callback notification indicating that the called party device as identified by the destination number does not have sufficient credit to place a return call or send a return short message service (SMS) message to the calling party device.

In another embodiment, the callback notification system has a capacity for sending missed call ring alerts, for example, a capacity of about 100,000 missed call ring alerts in an hour, or a maximum of 50 concurrent missed call ring alerts. Based on a current rate of receiving communication attempts with insufficient credit, the callback notification system adjusts a threshold for qualifying a user, that is, a calling party or a called party for sending a callback notification, for example, by placing a missed call upward or downward to not exceed the available capacity and to not leave the available capacity unused. For example, when the rate of receiving communication attempts with insufficient credit is high, the callback notification system adjusts the threshold for qualifying a user to place a missed call upward to keep the number of missed call ring alerts below the available capacity. When the rate of receiving communication attempts with insufficient credit is low, the callback notification system lowers the threshold for qualifying the user to send the missed call ring alert without falling below a minimum threshold and without violating other business rules to take advantage of the higher capacity available.

In an embodiment, the callback notification system provides a high qualification score to the called party as a potential recipient of a callback notification based on multiple factors comprising, for example, factors that indicate a likelihood of the called party making a callback such as a high frequency of call attempts that are successfully answered, a high average recharge amount, a higher average credit in the called party's prepaid account, a higher average amount recharged and/or spent per unit time, a high average call duration of calls attempted and calls answered, a low percentage of calls attempted with an insufficient credit, the length of using the carrier network's service and making the answered calls, etc. The factors that indicate a likelihood of the called party receiving the callback notification comprise, for example, percentage of call attempts to the called party device that are successfully answered and call attempts that are incomplete due to the called party device not being reachable, or due to the called party device being busy, or due to the called party not answering the call. The callback notification system provides a high qualification score to the calling party as a potential sender of the callback notification, for example, by placement of a missed call ring alert based on multiple factors comprising, for example, a high frequency of receiving calls that are answered, a high rate of answering incoming calls, a high average call duration of the incoming calls, a low rate of attempting calls that are disconnected by the calling party, length of using the carrier network's service, making and receiving answered calls, etc. The callback notification system computes a qualification score for a user, both as a potential sender of a callback notification and as a potential recipient of a callback notification. The callback notification system calculates and updates the qualification score dynamically based on processing of a substantial amount of data points in the user's profile data.

In an embodiment, the callback notification system computes multiple sub-scores as part of the qualification score. The sub-scores comprise long term sub-scores and recent sub-scores. The callback notification system computes the long term sub-scores by processing the collected profile data, with the recent profile data being given a slightly higher weightage compared to the previous profile data. One of the long term sub-scores determines whether the called party, that is, the recipient of the callback notification is likely to have sufficient credit to make a callback. Another long term sub-score determines an expected value of the callback from the called party and is based on data points in the profile data that indicate whether calls made by the calling party are answered by the called party and the average call duration of the calls. The recent sub-scores are substantially based on recent data points in the profile data. One recent sub-score determines whether the called party, that is, the recipient of the callback notification has sufficient credit to make a callback and is based on data points comprising, for example, type of the most recent call attempt, that is, the call attempted and the call answered, or the call attempted but not answered, or the call attempted but failed due to insufficient credit, the most recent known prepaid account balance of the called party, etc. Another recent sub-score determines whether the called party is likely to receive the callback notification as a recipient and is based on a recent communication attempt by the called party, or a recent communication attempt received and answered by the called party, or a recent communication attempt made to the called party that was incomplete due to the called party device not being reachable, or due to the called party device being busy, or due to the called party not answering the call. A generic computer using a generic program cannot determine whether the calling party or the calling party device and the called party or the called party device are qualified for sending one or more callback notifications from the source number of the calling party device to the destination number of the called party device based on one or more of multiple predetermined parameters in accordance with the method steps disclosed above.

In addition to sending one or more callback notifications, for example, by placing a missed call ring alert, sending a callback short message service (SMS) message, etc., to the called party device, when an unsuccessful communication attempt is made by the calling party device to contact the called party device due to insufficient credit or an absence of credit for voice communication, and/or an SMS communication, and/or data communication in the calling party's account, in an embodiment, the callback notification system provides multiple options for communicating with the called party device. The options for communicating with the called party device comprise, for example, receiving an advance of credit in the calling party's account for voice communication, and/or the SMS communication, and/or data communication over the network from the callback notification system, receiving credit in the calling party's account for voice communication, and/or the SMS communication, and/or data communication over the network from the callback notification system in exchange for engaging, for example, listening to, viewing, interacting with, etc., with an advertisement on the calling party device, etc. The options further comprise, for example, placing a collect call to the called party device based on an agreement from the called party device to pay for the collect call; sending a callback message to the called party device with a request for a callback to the calling party device. In an embodiment, the callback message is an interactive message. The callback notification system sends the callback message to the called party device using a short message service (SMS), or a subscriber identity module (SIM) push, or network initiated unstructured supplementary service data (USSD), or a wireless internet browser (WIB) push, and a client application notification. In an embodiment, the callback notification system in communication with the carrier provides an emergency credit feature to the calling party. A generic computer using a generic program cannot provide options for communicating with the called party device when the communication attempt made by the calling party device to contact the called party device is unsuccessful in accordance with the method steps disclosed above.

Figure 2:
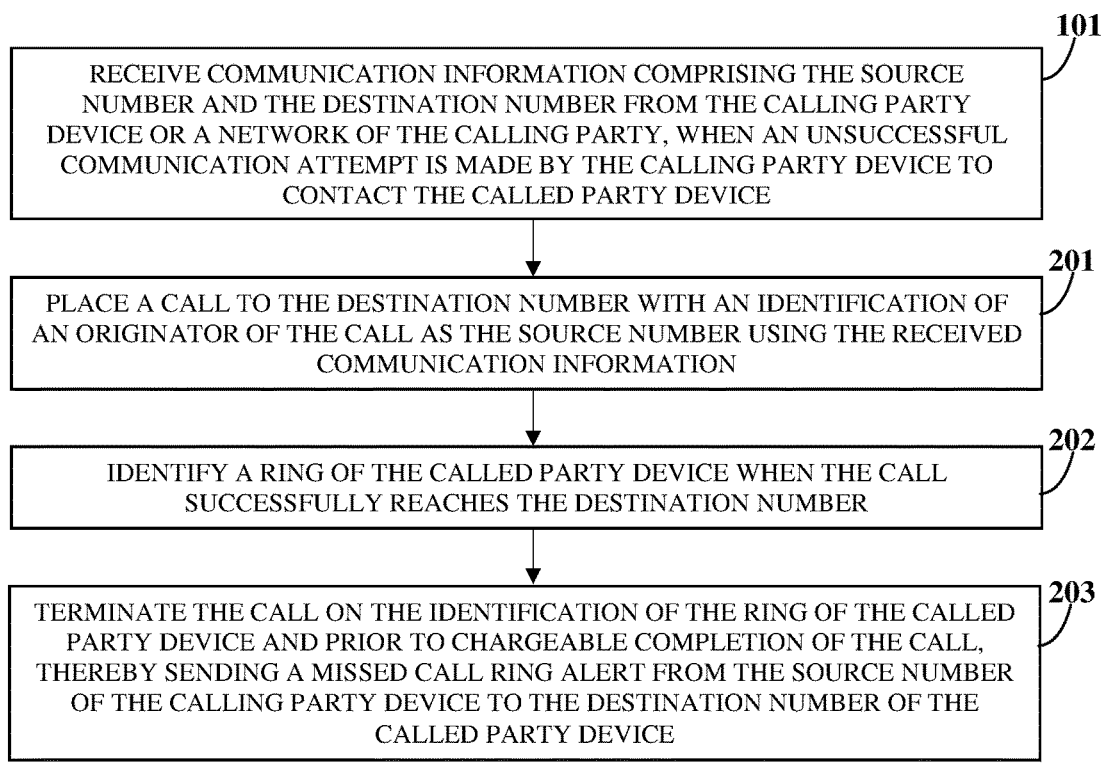
FIG. 2 illustrates a method for sending a callback notification comprising a missed call ring alert from a source number of a calling party device to a destination number of a called party device.

FIG. 2 illustrates a method for sending a callback notification comprising a missed call ring alert from a source number of a calling party device to a destination number of a called party device. The callback notification system receives 101 communication information comprising the source number and the destination number from the calling party device or a network, for example, a carrier network or a data network of a calling party association with the calling party device, when an unsuccessful communication attempt is made by the calling party device to contact the called party device as disclosed in the detailed description of FIG. 1. The calling party device may contact the called party device, for example, by placing a call or sending a short message service (SMS) message to the destination number of the called party device.

Consider an example where the communication attempt made by the calling party device to contact the called party device is a call attempt. Due to insufficient credit for voice communication, and/or a short message service (SMS) communication, and/or data communication over the carrier network in an account registered by the carrier network for the calling party device or absence of network connectivity between the calling party device and the called party device, the call attempt made by calling party device to contact the called party device will turn into an unsuccessful call attempt. As used herein, "unsuccessful call attempt" refers to a call attempt that does not go through from the calling party device to the called party device, for example, due to insufficient credit or absence of credit for voice communication, and/or an SMS communication, and/or data communication over the carrier network, absence of network connectivity between the calling party device and the called party device, incapability of the calling party device for data communication, absence of an international calling facility, etc. The callback notification system receives the communication information of the unsuccessful call attempt from the carrier network. The callback notification system receives the communication information from one of different components of the carrier network, for example, a mobile switching center (MSC) of the carrier network associated with the calling party device, a service control point (SCP) of the carrier network, or a specialized resource function node (SRF) of the carrier network, a billing server, a mediation platform, the callback notification application implemented on the calling party device as disclosed in the detailed description of FIG. 1, FIGS. 7-8, FIGS. 9A-9B, and FIG. 10.

The callback notification system places 201 a call to the destination number with an identification of an originator of the call as the source number using the received communication information. In an embodiment, the callback notification system places a short outbound call to the destination number through the carrier network. In this embodiment, the callback notification system provides the source number to an automatic number identification (ANI) feature of the carrier network as the identification of the originator of the call. As used herein, "automatic number identification" is a feature of the carrier network for automatically determining an origination telephone number on toll calls for billing purposes. In an embodiment, the callback notification system places the short outbound call to the destination number using only signaling resources without reserving or expecting any media resources for media comprising, for example, early media, voice of the called party, etc., to optimize the usage of network resources of the carrier network. As used herein, "signaling resources" refers to resources of the carrier network used to place, maintain, and terminate the short outbound call. Also, as used herein, "media resources" refer to resources of the carrier network used to transmit media over the carrier network. Also, as used herein, "early media" refers to media, for example, textual media, image media, audio media, video media, audiovisual media, multimodal media, etc., or any combination thereof, in the form of system tones, announcements, etc., transmitted by the carrier network to the calling party device during the process of setting up a call, before completion of the call, that is, before the call is answered by the called party device.

The callback notification system monitors the progress of the call to receive an indication of the call successfully reaching the destination number, for example, a ringtone of the called party device, signaling system no. 7 (SS7) signals, or session initiation protocol (SIP) commands that indicate that the called party device is ringing. The callback notification system identifies 202 a ring of the called party device when the call successfully reaches the destination number. The callback notification system terminates 203 the call on the identification of the ring of the called party device and prior to chargeable completion of the call, thereby sending a missed call ring alert from the source number of the calling party device to the destination number of the called party device. As used herein, "chargeable completion of call" refers to a completion of a call that results in billing of the calling party after the called party answers the call. The callback notification system ensures a ring on the called party device. If the called party answers the call, the calling party is charged.

In an embodiment, the callback notification system places the missed call using only signaling resources. Moreover, the missed call ring alert is such that an indication of the missed call appears on a call log of the called party device. The indication is identical to that of a call from the calling party device missed by the called party device due to a failure to pick up the call by the called party device. In an embodiment, the callback notification system sends the missed call ring alert from the source number of the calling party device to the destination number of the called party device with an identification of an originator of the missed call ring alert as the source number without requiring an explicit initiation of the placement of the call to the destination number by the calling party device. Furthermore, the callback notification system generates separate call detail records for each of the sent missed call ring alerts and calculates revenue generated from callbacks from the called party device to the calling party device by correlating the separate call details records for the sent missed call ring alerts with call detail records of the callbacks. The callback notification system measures the volume of callbacks generated due to the missed call ring alerts, and the revenue generated from the callbacks. The callback notification system sends a status of the placement of the missed call ring alert from the source number of the calling party device to the destination number of the called party device to the callback notification application implemented on the calling party device.

The callback notification system sends one or more alternative callback notifications to the called party device when the placement of the call to the destination number of the called party device for sending of the missed call ring alert to the destination number is unsuccessful. As used herein, "alternative callback notifications" refer to callback notifications, for example, a callback short message service (SMS) message, a callback client push notification, a callback network initiated unstructured supplementary service data (USSD) push notification, a callback wireless internet browser (WIB) push notification, a callback subscriber identity module (SIM) push notification, a callback electronic mail, a client application notification, etc., other than the missed call ring alert sent to the called party device by the callback notification system, indicating an unsuccessful call attempt to contact the destination number from the source number at a specified time. In an embodiment, when the callback notification system is unable to ring, that is, connect to the destination number of the called party device because the called party device is out of coverage area of the carrier network or the called party device with the destination number is switched off, the callback notification system sends one or more of the alternative callback notifications to the destination number indicating that the source number was trying to place a call to the destination number at a specified time.

In another embodiment, the callback notification system sends one or more of the alternative callback notifications concurrently with the missed call ring alert to the called party device. For example, the callback notification system sends a flash short message service (SMS) message along with the missed call ring alert to the called party device. In an embodiment, the callback notification system detects successful reach of the alternative callback notifications from the source number of the calling party device to the destination number of the called party device. The callback notification system monitors the progress of the alternative callback notifications to receive an indication of the alternative callback notifications successfully reaching the destination number, for example, in the form of signaling system no. 7 (SS7) signals, or session initiation protocol (SIP) commands, a message submission report, a message delivery report, etc., that indicate that the alternative callback notifications have reached the called party device. The callback notification system reports successful reach of the alternative callback notifications to the calling party device.

For placing and terminating the call by the callback notification system, the carrier configures a gateway mobile switching center (GMSC) in the carrier network to allow calls to be initiated by the callback notification system. The configuration is such that the GMSC allows calls to be initiated from any valid on-net source number belonging to the carrier to any destination number, for example, an on-net number, or an off-net number, or an international number. As used herein, "on-net number" refers to a number belonging to the carrier network that has deployed the callback notification system. Also, as used herein, "off-net number" refers to a number belonging to a carrier other than the carrier network that has deployed the callback notification system. Moreover, the carrier configures the GMSC and the intelligent network (IN) of the carrier network to generate zero-rated call detail records (CDR) for call attempts initiated by the callback notification system though the call attempts are not answered, as the call attempts are missed calls. The generated call detail records are used to identify callbacks, that is, return calls placed by the called party device that received the missed call to the calling party device that is the originator of the missed call as a result of the missed call placed by the callback notification system.

The callback notification system analyzes the unsuccessful call attempt to determine whether the calling party associated with the calling party device as identified by the source number and the called party associated with the called party device as identified by the destination number qualify for sending the missed call ring alert from the source number to the destination number. The callback notification system performs data analysis to determine whether the missed call will be placed or not. In an embodiment, the callback notification system determines that the calling party as identified by the source number does not qualify for placing the missed call at a particular time because of high frequency of missed call requests to one or more destination numbers at that time. In another embodiment, the callback notification system determines that the called party as identified by the destination number does not qualify for placing the missed call at a particular time because of receiving a recent request from the destination number for placing a missed call indicating that the called party device as identified by the destination number does not have sufficient credit to place a return call to the calling party device.

In addition to sending a callback notification, for example, placing a missed call ring alert and/or sending one or more alternative callback notifications to the called party device due to insufficient credit or absence of credit for voice communication, and/or a short message service (SMS) communication, and/or data communication in the calling party's account, in an embodiment, the callback notification system provides multiple options to the calling party device for communicating with the called party device when the unsuccessful call attempt is made by the calling party device to contact the called party device is unsuccessful as disclosed in the detailed description of FIG. 1.

The carrier network provider typically generates call detail records only for charged calls, that is, calls that are completed. In an embodiment, the carrier configures the service control point (SCP) of the intelligent network (IN), that is, the SCP/IN to generate separate call detail records for call attempts that are unsuccessful due to insufficient credit for communication. In an embodiment, the callback notification system, in communication with the callback notification application implemented on the calling party device, detects call attempts made by the calling party device to contact the called party device that are unsuccessful. In an embodiment, on detecting an unsuccessful call attempt by the calling party device to place a call from the source number to the destination number, the callback notification application communicates with a call completion application implemented on the calling party device and disclosed in the non-provisional patent application Ser. No. 14/105,158 titled "Sender Driven Call Completion System" filed in the United States Patent and Trademark Office on Dec. 12, 2013, now issued as U.S. Pat. No. 9,185,227 and incorporated herein by reference in its entirety, to provide options to the calling party to complete the call. The call completion application generates a request defining multiple call completion actions for completing the call and renders the generated request on a graphical user interface (GUI) of the calling party device. One of the call completion actions is, for example, transmitting a missed call alert notification to the called party device. The rendered request prompts the calling party to select one of the call completion actions, for example, transmitting a missed call alert notification to the called party device. When the user selects the call completion action to transmit a missed call alert notification to the called party device, the callback notification application communicates a request to the callback notification system to initiate placement of a call from the source number of the calling party device to the destination number of the called party device to send a missed call ring alert to the called party device.

The callback notification system implements one or more specific computer programs for sending a callback notification from a source number of a calling party device to a destination number of a called party device. The callback notification system places the missed call and/or sends an alternative callback notification from the source number of the calling party device to the destination number of the called party device independent of a presence of credit for voice communication, a short message service (SMS) communication, and data communication in the calling party's account. The callback notification system receives communication information comprising the source number and the destination number from the calling party device or different components of a carrier network of the calling party device, when an unsuccessful communication attempt is made by the calling party device to contact the called party device. The callback notification processes and transforms the received communication information to extract the source number and the destination number for sending the callback notification to the destination number of the called party device with an identification of an originator of the call as the source number. The callback notification processes periodically pushed or pulled call detail records from a service control point (SCP) of the intelligent network (IN), or a billing server, or a mediation platform to filter out and identify the source number and the destination number of the unsuccessful communication attempt.

The method disclosed herein improves the functionality of the computer and provides an improvement in communication related technology related to sending a callback notification, for example, a missed call ring alert and/or an alternative callback notification from a source number of a calling party device to a destination number of a called party device as follows: When an unsuccessful communication attempt is made by the calling party device to contact the called party device, an event monitor of the callback notification system receives the communication information from the callback notification application in the calling party device or from one of different components of the carrier network in different ways as disclosed in the detailed description of FIG. 1, FIGS. 7-8, FIGS. 9A-9B, and FIG. 10. On implementing the method disclosed herein, the callback notification system, through the use of separate and autonomous computer programs, sends a callback notification to the called party device independent of presence of credit for voice communication, a short message service (SMS) communication, and data communication in the calling party's account. In the embodiment of sending a missed call ring alert to the called party device, the callback notification system ensures that the called party using the called party device hears a single ring and that the placed missed call is displayed as a missed call on the called party device. The callback notification system monitors the progress of the callback notification successfully reaching the destination number and sends a status of the callback notification sent from the source number to the callback notification application on the calling party device. For example, the callback notification system monitors the progress of the placed call successfully reaching the destination number, terminates the call on identification of the ring of the called party device and prior to chargeable completion of the call, and sends a status of sending the missed call ring alert from the source number and the destination number to the callback notification application on the calling party device.

The callback notification system profiles and scores the calling party and the called party identified by the source number and the destination number respectively, to determine whether the calling party and the called party qualify for the sending of the callback notification. The callback notification system, through the use of separate and autonomous computer programs, places a missed call and/or sends an alternative callback notification to the destination number of the called party device with an identification of an originator of the callback notification as the source number in the absence of credit or due to insufficient credit for voice communication, a short message service (SMS) communication, or data communication in the calling party's account. The callback notification system, through the use of separate and autonomous computer programs, also places a missed call to an international number in the absence of an international calling facility, and ensures that the call placed to the international number or any destination number is a missed call and not a paid call. The callback notification system employs the event monitor, an application server, and a callback notification media platform to transform the calling party's unsuccessful communication attempt due to insufficient credit or the absence of credit for voice communication, an SMS communication, or data communication, or in the absence of an international calling facility, into sending of a missed call ring alert and/or sending of an alternative callback notification from the source number of the calling party device to the destination number of the called party device as disclosed in the detailed descriptions of FIGS. 11-15.

The method disclosed herein provides an improvement in how a short outbound call for sending the missed call ring alert to the called party device is placed, monitored, and terminated as disclosed in the detailed description of FIG. 2, to ensure that the call attempted is a missed call and not an answered call. Furthermore, the method disclosed herein provides an improvement in automatically detecting an unsuccessful communication attempt for sending a callback notification from the calling party device and using the application server and the callback notification media platform of the callback notification system to send the callback notification without the calling party device being an active element while the callback notification is being sent. The callback notification application in the calling party device waits to receive the status of the callback notification from the callback notification system.

Carriers deploying the callback notification system can allow on-net users to send a missed call ring alert to any recipient through the callback notification system for a missed call. The recipient can be other on-net users belonging to the carrier network, off-net users belonging to other carriers in the same country as the carrier, and international users. Carriers deploying the callback notification system can be assured that the call placed by the callback notification system is released before the called party has an opportunity to answer the call placed by the callback notification system. Hence, the carrier network providers do not incur any interconnect charges for missed calls made to the called party. The method disclosed herein provides an improvement in sending multiple callback notifications irrespective of the status of the communication attempt made by the calling party device to contact the called party device. Even if one of the callback notifications goes unnoticed, the other callback notifications draw the attention of the called party.

The focus of the method and the callback notification system disclosed herein is an improvement to communication technology and computer functionalities, and not on tasks for which a generic computer is used in its ordinary capacity. Accordingly, the method and the callback notification system disclosed herein are not directed to an abstract idea. Rather, the method and the callback notification system disclosed herein are directed to a specific improvement to the way the processors in the callback notification system, embodied in, for example, receiving the communication information from the callback notification application in the calling party device or from one of different components of the carrier network, determining whether the calling party and the called party are qualified for sending a callback notification, for example, by placing a call and/or sending a callback short message service (SMS) message to the destination number with an identification of an originator of the callback notification as the source number, and detecting successful reach of the callback notification to the called party device. For sending a missed call ring alert as a callback notification, the processor in the callback notification system terminates the call on the identification of ring of the called party device and prior to chargeable completion of the call, thereby placing the missed call from the source number of the calling party device to the destination number of the called party device.

In the method disclosed herein, the design and flow of data and interactions between the calling party device, different components of the carrier network, the callback notification system, the cloud servers, and the called party device are deliberate, designed, and directed. The source number and the destination number received from the carrier network are processed by the callback notification system to steer the callback notification system towards a finite set of predictable outcomes. The callback notification system implements one or more specific computer programs for sending a callback notification to the destination number and detecting successful reach of the callback notification to the destination number from the source number.

The interactions between the calling party device, different components of the carrier network, the callback notification system, the cloud servers, and the called party device allow the callback notification system to send the callback notification from the source number to the destination number using an application server that is in the same or different geographical location as that of a carrier network or a data network of the source number and/or the destination number. From this data, the callback notification system, through the use of other, separate and autonomous computer programs, places the missed call to an international number independent of a presence of a facility for calling international numbers in the calling party device. The callback notification system ensures that the call placed to the destination number is a missed call that does not incur a cost by automatically terminating the call when the call successfully reaches the destination number without a need for any user input. Furthermore, since the callback notification system receives the communication information of an unsuccessful communication attempt made by the calling party device to contact the called party device from the carrier network to send the callback notification, the callback notification system sends the callback notification from any calling party device independent of features available on the calling party device. Furthermore, deploying the callback notification system allows the carrier network provider to generate incremental revenue from customers and to improve satisfaction and retention of the customers by providing callback notifications when credit for communication in the accounts of the customers is insufficient and by generating callbacks. The callback notification system ensures that the communication attempt from the calling party device with insufficient credit for voice communication, and/or a short message service (SMS) communication, and/or data communication results in the intended called party hearing a ring and receiving a missed call and/or an alternative callback notification on the called party device. The called party can then call back the calling party to connect and complete communication with the calling party. To perform the functions disclosed above would require fifteen or more separate computer programs and subprograms, the execution of which cannot be performed by a person using a generic computer with a generic program. The steps performed by the callback notification system disclosed above are tangible, provide useful results, and are not abstract. The software implementation of the callback notification system is an improvement in computer related and communication technology.

Figure 3A:
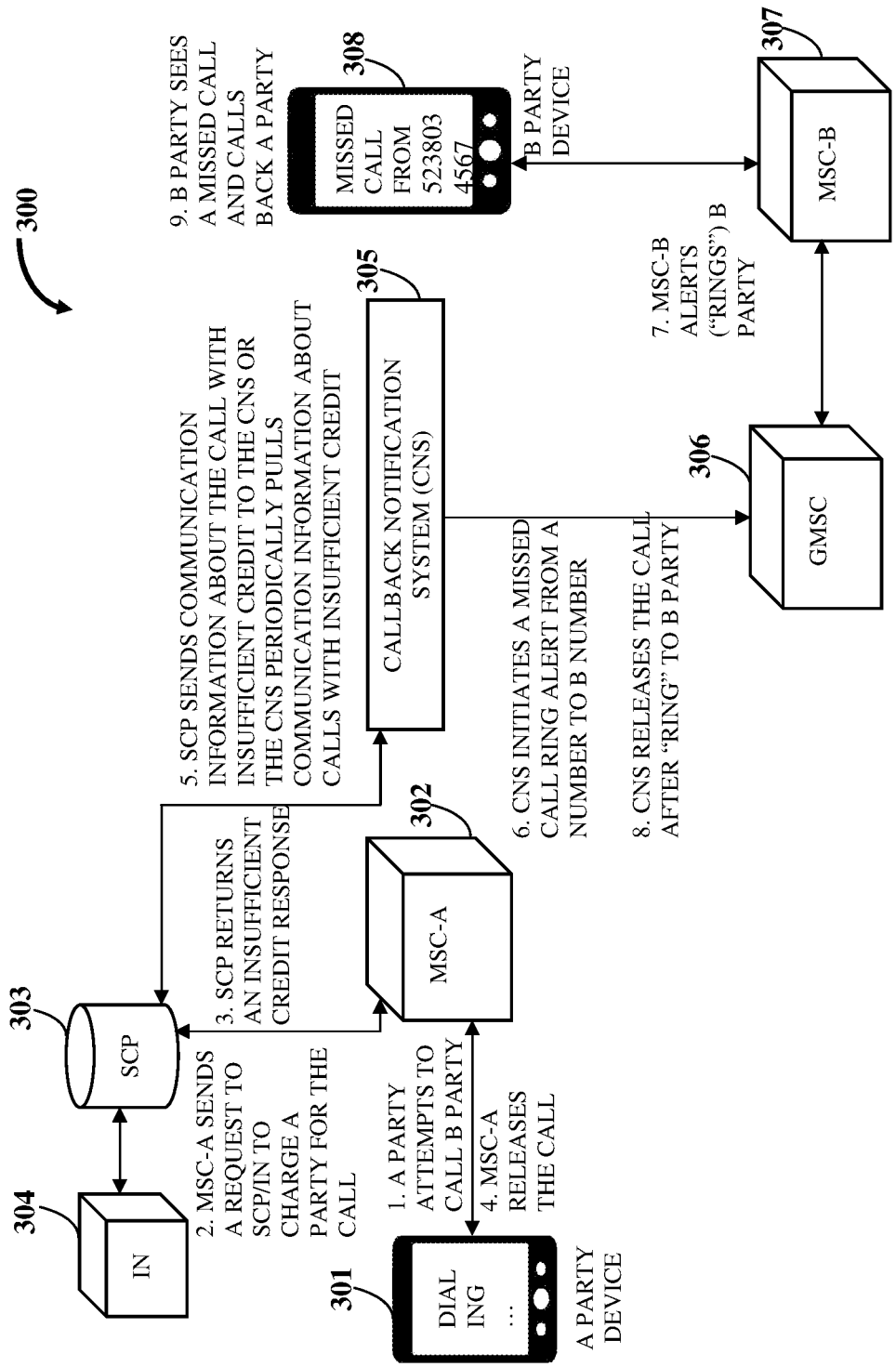
FIG. 3A exemplarily illustrates a system comprising a callback notification system for sending a missed call ring alert from a source number of a calling party device to a destination number of a called party device.

FIG. 3A exemplarily illustrates a system 300 comprising the callback notification system 305 for sending a missed call ring alert from a source number of a calling party device 301 to a destination number of a called party device 308. As exemplarily illustrated in FIG. 3A, the callback notification system 305 receives communication information of an unsuccessful call attempt made by the calling party device 301 to contact the called party device 308 from a service control point (SCP) 303 of an intelligent network (IN) 304, that is, the SCP/IN 303/304, in a carrier network as disclosed in the detailed description of FIG. 1. FIG. 3A exemplarily illustrates a high level architecture comprising network components of the carrier network and the callback notification system 305, and the flow of information between the calling party device 301, the network components of the carrier network, the callback notification system 305, and the called party device 308 for sending the missed call ring alert to the called party device 308. Consider an example where a calling party is referred to as an "A party" and a called party is referred to as a "B party". In this example, the calling party device 301 is hereafter referred to as an "A party device" and referenced by the numeral 301, and the called party device 308 is hereafter referred to as a "B party device" and referenced by the numeral 308. The A party using the A party device 301 attempts to call the B party device 308. An originating mobile switching center (MSC), that is, the MSC serving the A party device 301, also referred to as MSC-A 302, sends a request to the SCP/IN 303/304 to charge the A party for the call. The SCP 303 returns a response conveying insufficient credit in the A party's account registered with the carrier network provider. The MSC-A 302 releases the call placed by the A party device 301.

In an embodiment, the service control point (SCP) 303 sends communication information about the unsuccessful call attempt made by the A party device 301 to contact the B party device 308 to the callback notification system 305. In another embodiment, the callback notification system 305 periodically pulls the communication information about unsuccessful call attempts, that is, calls made by the A party device 301 with insufficient credit for communication from the SCP 303, thereby receiving the communication information about the unsuccessful call attempt made by the A party device 301 to contact the B party device 308. The callback notification system 305 pulls the communication information about the unsuccessful call attempts from the SCP 303 using one of the protocols disclosed in the detailed description of FIG. 1.

The callback notification system 305 initiates a missed call ring alert by placing a call from a source number of the A party device 301, herein referred to as an "A number", to a destination number of the B party device 308, herein referred to as a "B number" through a gateway mobile switching center (GMSC) 306. A terminating mobile switching center (MSC), that is, the MSC serving the B party device 308, herein referred to as MSC-B 307, alerts the B party device 308 about the call placed by the callback notification system 305 by ringing the B party device 308. The callback notification system 305 releases the placed call after the B party device 308 receives a ring. The B party device 308 receives a missed call. The B party sees the missed call on the B party device 308 and calls back the A party for connecting and completing communication with the A party.

Figure 3B:
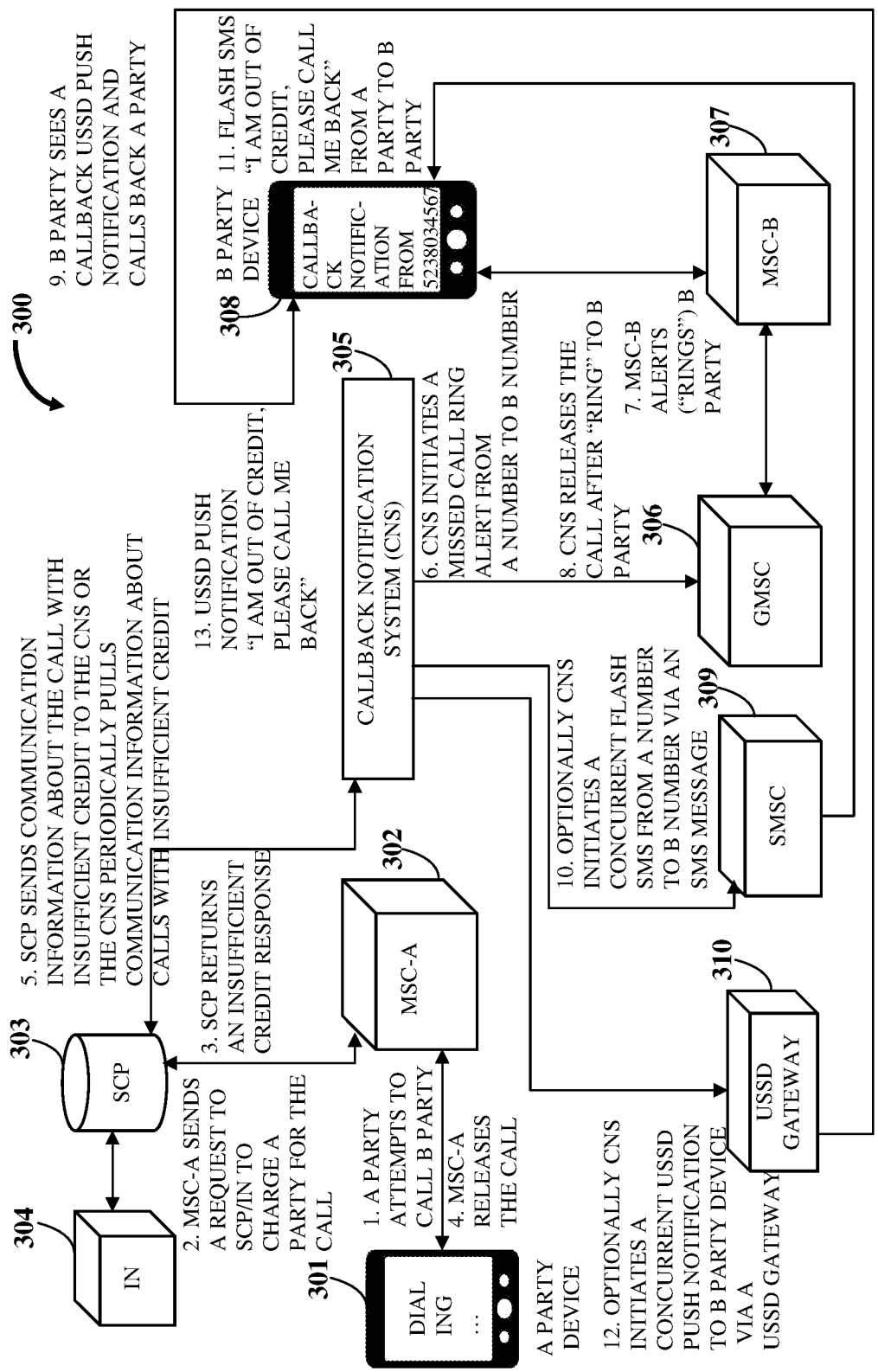
FIG. 3B exemplarily illustrates an embodiment of the system comprising the callback notification system for sending one or more alternative callback notifications concurrently with a missed call ring alert from a source number of a calling party device to a destination number of a called party device.

FIG. 3B exemplarily illustrate an embodiment of the system 300 comprising the callback notification system 305 for sending one or more alternative callback notifications concurrently with a missed call ring alert from a source number of a calling party device 301, herein referred to as an "A party device", to a destination number of a called party device 308, herein referred to as a "B party device", when a call attempt made by the A party device 301 to contact the B party device 308 is unsuccessful. As disclosed in the detailed description of FIG. 3A, the callback notification system 305 initiates a missed call ring alert by placing a call from the A number to the B number through the gateway mobile switching center (GMSC) 306. The MSC-B 307 alerts the B party device 308 about the call placed by the callback notification system 305 by ringing the B party device 308. The callback notification system 305 releases the placed call after the B party device 308 receives a ring. In an embodiment as exemplarily illustrated in FIG. 3B, the callback notification system 305 initiates an alternative callback notification, for example, a concurrent callback short message service (SMS) message such as a flash SMS message from the A number to the B number via a short message service center (SMSC) 309. In this embodiment, the callback notification system 305 does not check for status of the missed call ring alert and in parallel initiates the flash SMS message. The SMSC 309 delivers the flash SMS message from the A party device 301 to the B party device 308 with a message stating "I am out of credit, please call me back". The missed call ring alert catches attention of the B party and is present in a call log of the B party device 308 whereas the flash SMS message catches the attention of the B party when the B party activates the B party device 308 and provides the context of the missed call. In another embodiment, the callback notification system 305 initiates a concurrent callback network initiated unstructured supplementary service data (USSD) push notification to the B party device 308 via a USSD gateway 310. The USSD gateway 310 delivers the USSD push notification with a message "I am out of credit, please call me back" to the B party device 308. The B party sees the USSD push notification on the B party device 308 and calls back the A party for connecting and completing communication with the A party.

Figure 3C:
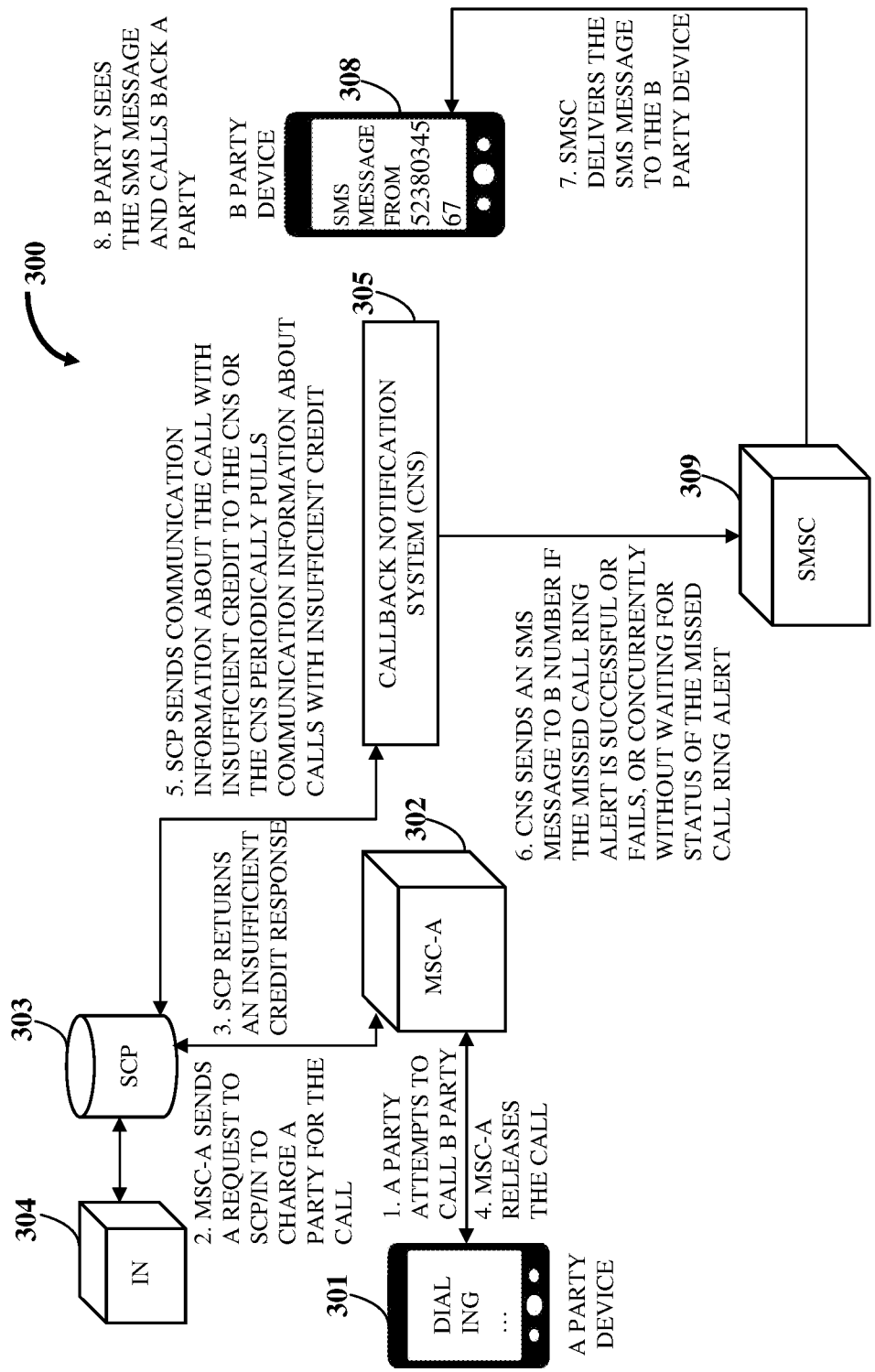
FIGS. 3C-3E exemplarily illustrate embodiments of the system comprising the callback notification system for sending an alternative callback notification from a source number of a calling party device to a destination number of a called party device.
Figure 3D:
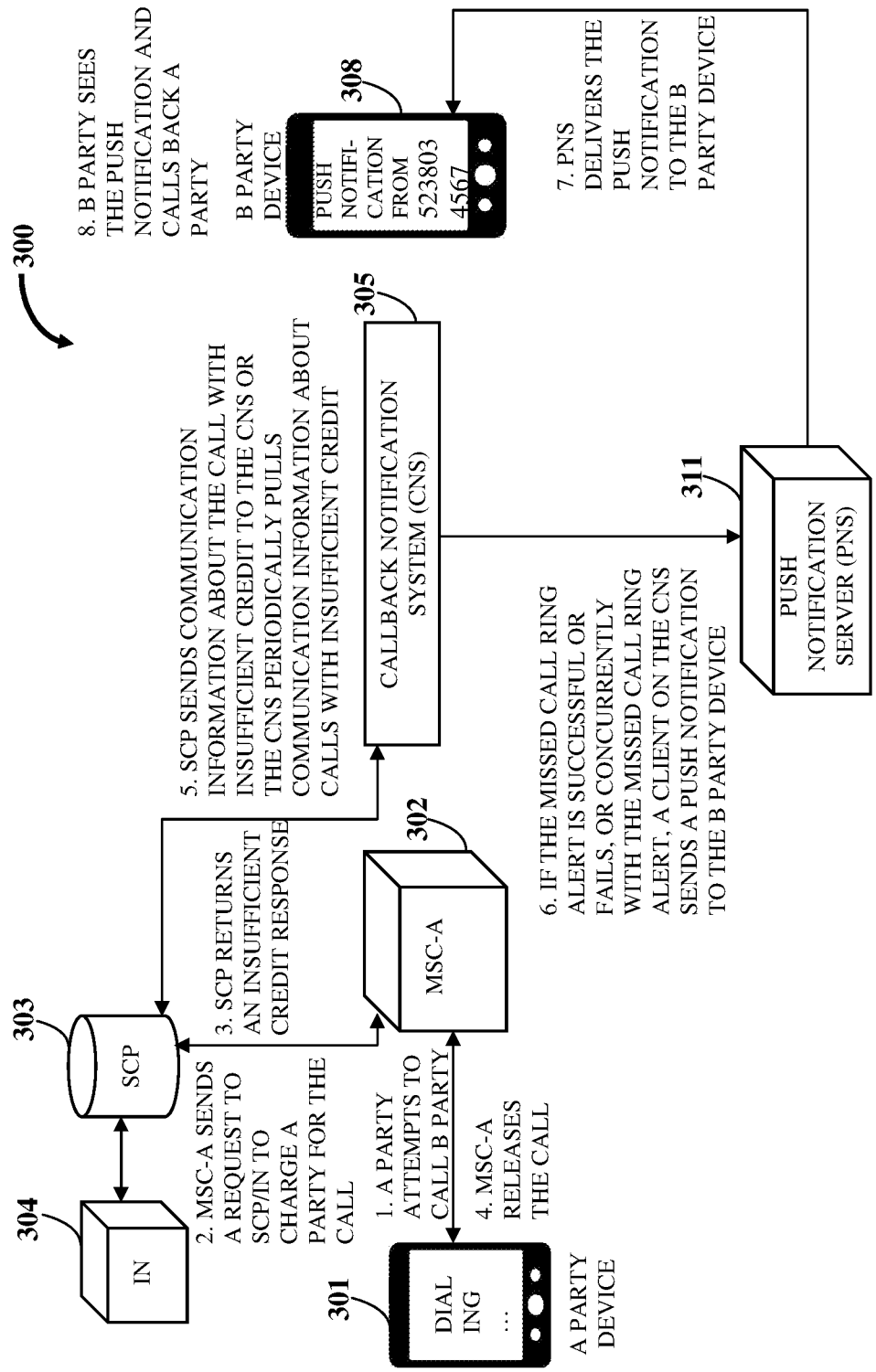
Figure 3E:
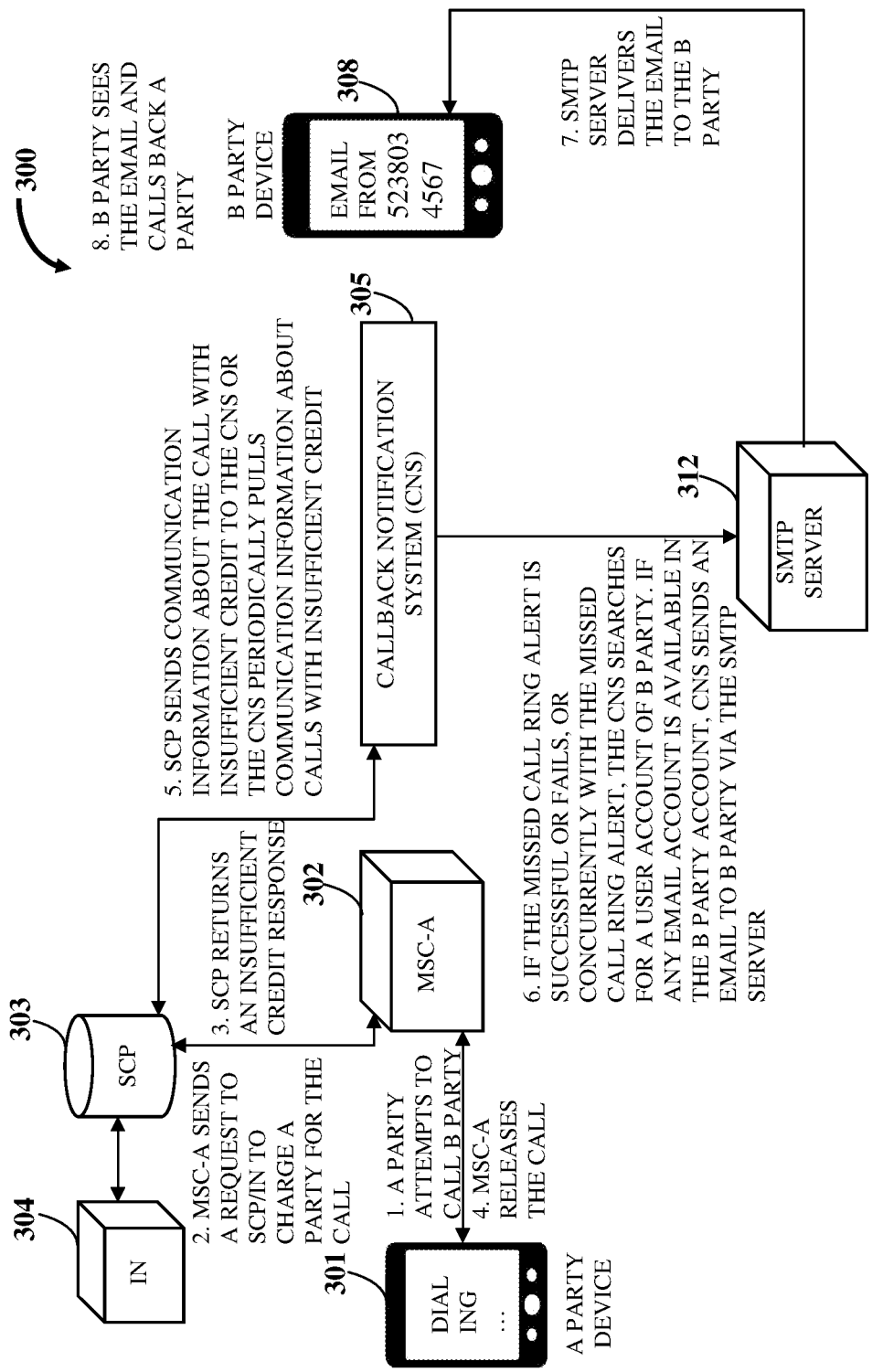

FIGS. 3C-3E exemplarily illustrate embodiments of the system 300 comprising the callback notification system 305 for sending an alternative callback notification from a source number of a calling party device 301, herein referred to as an "A party device", to a destination number of a called party device 308, herein referred to as a "B party device", when a call attempt made by the A party device 301 to contact the B party device 308 is unsuccessful. In an embodiment as exemplarily illustrated in FIG. 3C, if the missed call ring alert fails, the callback notification system 305 sends a callback short message service (SMS) message to the B party device 308 via the short message service center (SMSC) 309. The SMSC 309 delivers the callback SMS message to the B party device 308. In another embodiment, the callback notification system 305 sends a callback SMS message as an alternative callback notification to the B number via the SMSC 309 even if the missed call ring alert is successful. In another embodiment, the callback notification system 305 sends a callback SMS message as an alternative callback notification concurrently with the missed call ring alert via the SMSC 309, without waiting for the status of the missed call ring alert. The B party sees the callback SMS message on the B party device 308 and calls back the A party for connecting and completing communication with the A party.

In another embodiment as exemplarily illustrated in FIG. 3D, if the missed call ring alert fails, the callback notification system 305 sends a callback client push notification to the B party device 308 via a push notification server 311. The push notification server 311 delivers the callback client push notification as an alternative callback notification to the B party device 308. In another embodiment, the callback notification system 305 sends a callback client push notification as an alternative callback notification to the B party device 308 via the push notification server 311 even if the missed call ring alert is successful. In another embodiment, the callback notification system 305 sends a callback client push notification as an alternative callback notification to the B party device 308 via the push notification server 311 concurrently with the missed call ring alert, without waiting for the status of the missed call ring alert. The B party sees the callback client push notification on the B party device 308 and calls back the A party for connecting and completing communication with the A party.

In an embodiment as exemplarily illustrated in FIG. 3E, if the missed call ring alert fails, the callback notification system 305 searches for a user account associated with the B party device 308. If, in the user account, a callback electronic mail (email) identification (ID) or address of the B party is available, the callback notification system 305 sends a callback email as an alternative callback notification to the email ID of the B party device 308 via a simple mail transfer protocol (SMTP) server 312. The SMTP server 312 delivers the callback email to the email ID of the B party. In another embodiment, the callback notification system 305 sends a callback email as an alternative callback notification to the B party device 308 via the SMTP server 312 even if the missed call ring alert is successful. In another embodiment, the callback notification system 305 sends a callback email as an alternative callback notification to the B party device 308 via the SMTP server 312 concurrently with the missed call ring alert, without waiting for the status of the missed call ring alert. The B party sees the callback email on the B party device 308 and calls back the A party for connecting and completing communication with the A party.

Figure 3F:
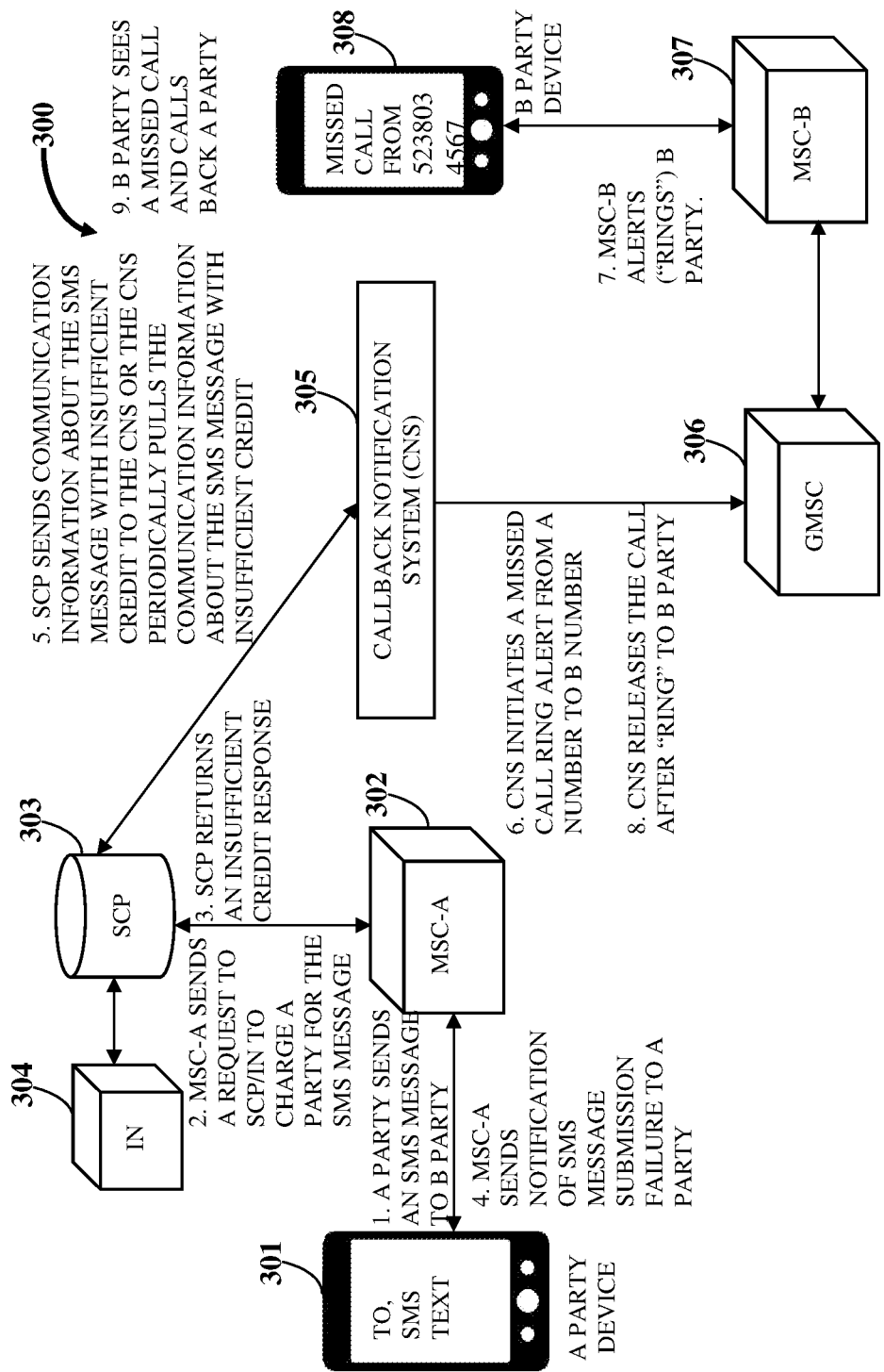
FIG. 3F exemplarily illustrates an embodiment of the system comprising the callback notification system for sending a missed call ring alert from a source number of a calling party device to a destination number of a called party device.

FIG. 3F exemplarily illustrates an embodiment of the system 300 comprising the callback notification system 305 for sending a missed call ring alert from a source number of a calling party device 301, herein referred to as an "A party device", to a destination number of a called party device 308, herein referred to as a "B party device", when a short message service (SMS) communication attempt made by the A party device 301 to contact the B party device 308 is unsuccessful. In this embodiment, the callback notification system 305 receives the communication information of the unsuccessful SMS communication attempt from the service control point (SCP) 303 of the intelligent network (IN) 304, that is, the SCP/IN 303/304, in the carrier network as disclosed in the detailed description of FIG. 1. The A party using the A party device 301 attempts to send an SMS message to the B party device 308. The originating mobile switching center (MSC), that is, the MSC-A 302 serving the A party device 301 sends a request to the SCP/IN 303/304 to charge the A party for the SMS message. The SCP 303 returns a response conveying insufficient credit in the A party's account registered with the carrier network provider. The MSC-A 302 sends a notification of failure in the SMS message submission to the A party device 301.

In an embodiment, the service control point (SCP) 303 sends communication information about the unsuccessful short message service (SMS) communication attempt made by the A party device 301 to contact the B party device 308 to the callback notification system 305. In another embodiment, the callback notification system 305 periodically pulls the communication information about unsuccessful SMS communication attempts, that is, SMS messages sent to the B party device 308 with insufficient credit for communication from the SCP 303, thereby receiving the communication information about the unsuccessful SMS communication attempt made by the A party device 301 to contact the B party device 308. The callback notification system 305 pulls the communication information about the unsuccessful SMS communication attempts from the SCP 303 using one of the protocols disclosed in the detailed description of FIG. 1.

The callback notification system 305 initiates a missed call ring alert by placing a call from the A number of the A party device 301 to the B number of the B party device 308 through the gateway mobile switching center (GMSC) 306. The terminating mobile switching center (MSC), that is, the MSC-B 307 serving the B party device 308, alerts the B party device 308 about the call placed by the callback notification system 305 by ringing the B party device 308. The callback notification system 305 releases the placed call after the B party device 308 receives a ring. The B party device 308 receives a missed call. The B party sees the missed call on the B party device 308 and calls back the A party for connecting and completing communication with the A party. In an embodiment, the callback notification system 305 sends a callback short message service (SMS) message to the B party device 308 via the short message service center (SMSC) 309, and/or a callback client push notification to the B party device 308 via the push notification server 311, and/or a callback electronic mail (email) to an email identification (ID) of the B party via the simple mail transfer protocol (SMTP) server 312, if the missed call ring alert is successful or fails, or concurrently with the missed call ring alert as disclosed in the detailed description of FIGS. 3B-3E, when the short message service (SMS) communication attempt made by the A party device 301 to contact the B party device 308 is unsuccessful.

Figure 4:
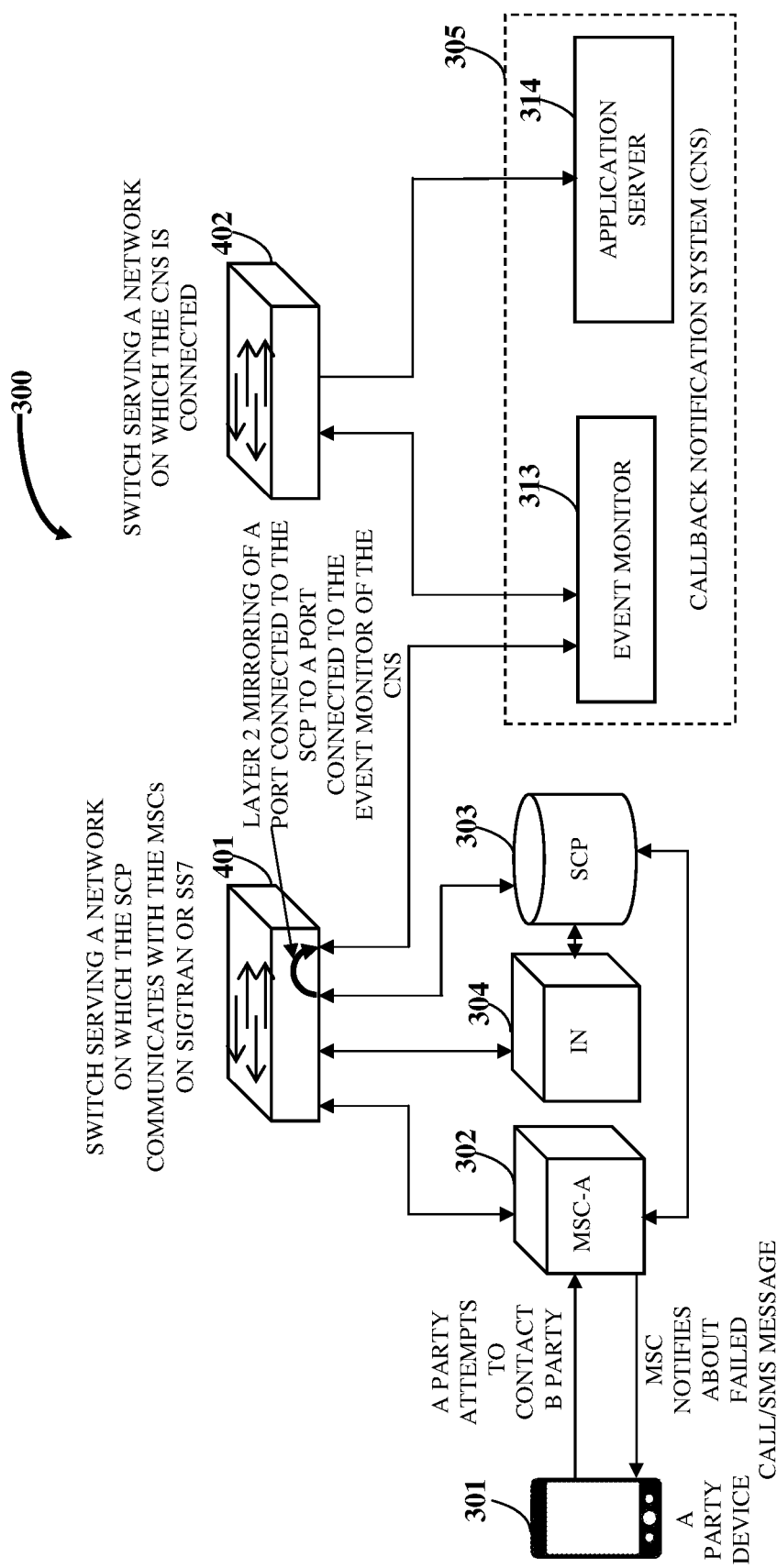
FIG. 4 exemplarily illustrates an architectural diagram of the system comprising the callback notification system for pulling communication information from a service control point, about communication attempts from a calling party device with insufficient credit for communication using layer 2 port mirroring.

FIG. 4 exemplarily illustrates an architectural diagram of the system 300 comprising the callback notification system 305 for pulling communication information from a service control point (SCP) 303, about communication attempts from a calling party device 301, herein referred to as "A party device", with insufficient credit for communication using layer 2 port mirroring. A calling party, that is, the A party attempts to contact a called party, that is, the B party, for example, by placing a call or sending a short message service (SMS) message to a called party device 308, herein referred to as a "B party device" exemplarily illustrated in FIGS. 3A-3C and FIG. 3F. Due to insufficient credit, the mobile switching center (MSC) serving the A party device 301, that is, the MSC-A 302 notifies the A party device 301 about the unsuccessful communication attempt, for example, the failed call or SMS message submission attempt. The callback notification system 305 comprises an event monitor 313 and an application server 314. The event monitor 313 is installed with connectivity to a network over which the SCP 303 and the MSC-A 302 communicate.

A network switch 401 serves the network, for example, a signaling transport (SIGTRAN) network or a signaling system number 7 (SS7) network over which the intelligent network (IN) 304, the mobile switching center (MSC) serving the A party device 301, that is, the MSC-A 302, and the service control point (SCP) 303 communicate. The carrier network provider configures layer 2 port mirroring on the network switch 401 on the carrier network on which the SCP 303, the MSC-A 302, and a mobile switching center (MSC) serving the B party device 308, that is, MSC-B 307 exemplarily illustrated in FIGS. 3A-3C and FIG. 3F, communicate with each other. As used herein, "layer 2 port mirroring" refers to sending a copy of network packets seen on one network switch port to a network monitoring connection on another switch port over a data link layer of an open systems interconnection (OSI) model implemented on the carrier network. The network switch 401 is configured for layer 2 port mirroring from a port connected to the SCP 303 to a port connected to the event monitor 313 of the callback notification system 305. The event monitor 313 connects to two networks: one network for layer 2 port mirroring of traffic to and from the SCP 303 and another network for communication with the application server 314. The callback notification system 305 periodically pulls the communication information, that is, call detail records from the SCP 303 of the intelligent network (IN) 304 of the carrier network via the network switch 401 using the configured layer 2 port mirroring. The communication to and from the SCP 303 follows standards, for example, communication following customized applications for mobile networks enhanced logic (CAMEL) standards. The communication to and from the SCP 303 uses protocols, for example, a transaction capabilities application part (TCAP) protocol, a signaling connection control part (SCCP) protocol, a message transfer part level 3 (MTP3) protocol, a message transfer part 2 user adaptation (M2UA) layer protocol, a stream control transmission protocol (SCTP), an internet protocol (IP), etc. The event monitor 313 decodes the CAMEL traffic to and from the SCP 303 over these protocols and filters events related to communication attempts with insufficient credit for communication and send the filtered events to the application server 314. A network switch 402 serves a network on which the event monitor 313 and the application server 314 of the callback notification system 305 are connected.

Figure 5:
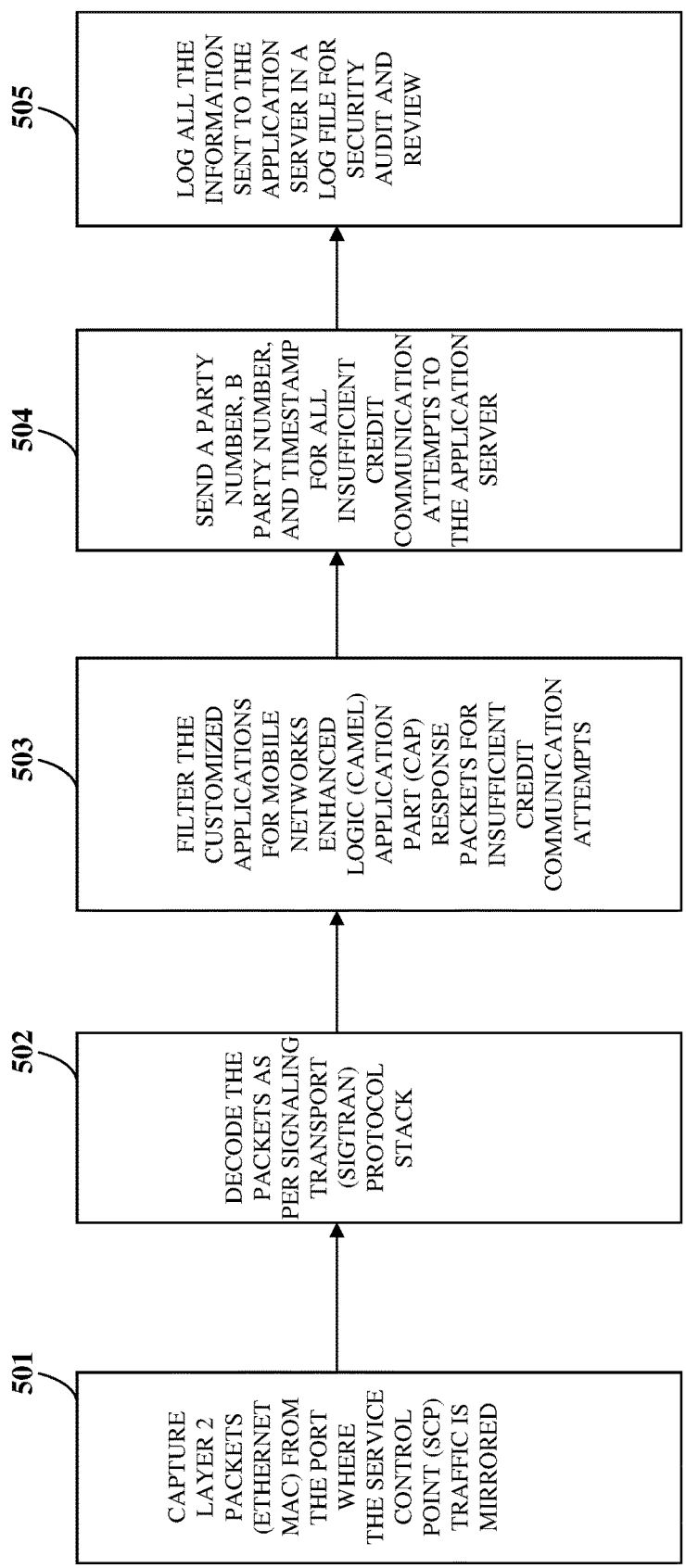
FIG. 5 exemplarily illustrates a method for logging information about communication attempts from calling party devices to contact called party devices with insufficient credit for communication, passed to the callback notification system for facilitating a complete security audit by a network.

Disclosed below is an example of a configuration for layer 2 port mirroring on a stackable gigabit Ethernet switch. This configuration is provided on the switch for remote port monitoring (RMON). This configuration assumes that the SCP/IN 303/304 processing the communication following customized applications for mobile networks enhanced logic (CAMEL) transactions over the signaling transport (SIGTRAN) network with multiple mobile switching centers (MSCs) is served a stackable gigabit Ethernet switch with RMON port mirroring support. The configuration also requires the event monitor 313 to be deployed on the same network and connected to the same switch that is serving the SCP/IN 303/304. If the event monitor 313 is connected to a different switch on another network, then the switch can be configured to forward the traffic to a remote network over a virtual local area network (VLAN). If required, the callback notification system 305 defines commands for configuring a switch port analyzer (SPAN) over a VLAN. The port on the switch that is connected to the SCP/IN 303/304 is configured as the source port. If the SCP/IN 303/304 is connected to the switch on multiple ports, each of the ports is configured as the source port. The port connected to the event monitor 313 is configured as the destination port. The following configuration commands for RMON on a local network are executed after entering the configuration mode:

port mirroring session_id source SCP_slot_id/SCP_port_id\
destination CNS_Event_Monitor_slot_id/CNS_Event_Monitor_port_id The configuration needed on network switches 401 and 402, for example, Cisco switches that support the switch port analyzer (SPAN) assumes that the SCP/IN 303/304 processing the communication following customized applications for mobile networks enhanced logic (CAMEL) transactions over the signaling transport (SIGTRAN) network with multiple MSCs is served a network switch with SPAN support. The configuration also requires that the event monitor 313 to be deployed on the same network and connected to the same network switch that is serving the SCP/IN 303/304. If the event monitor 313 is connected to a different switch on another network, then the switch can be configured to forward the traffic to a remote network over a virtual local area network (VLAN). If required, the callback notification system 305 defines commands for configuring the SPAN over a VLAN. The port on the network switch 401 that is connected to the SCP/IN 303/304 is configured as the source port. If the SCP/IN 303/304 is connected to the network switch 401 on multiple ports, each of the ports is configured as the source port. The port connected to the event monitor 313 is configured as the destination port. The traffic type is configured as "Both" to mirror both transmit (Tx) and receive (Rx) packets on the source port. The following configuration commands for the SPAN are executed after entering the configuration mode:

monitor session session_number source interface SCP_interface-id both
monitor session session_number destination interface CNS_Event_Monitor_interface-id FIG. 5 exemplarily illustrates a method for logging information about communication attempts from calling party devices to contact called party devices with insufficient credit for communication, passed to the callback notification system 305 exemplarily illustrated in FIG. 4, for facilitating a complete security audit by a network. The event monitor 313 of the callback notification system 305 exemplarily illustrated in FIG. 4, captures 501 layer 2 packets, for example, Ethernet medium access control (MAC) packets, from the port of the network switch 401, for example, a stackable gigabit Ethernet switch exemplarily illustrated in FIG. 4, where SCP traffic is mirrored. The event monitor 313 then decodes 502 the captured packets as per a signaling transport (SIGTRAN) protocol stack. The event monitor 313 then filters 503 the customized applications for mobile networks enhanced logic (CAMEL) application part (CAP) response packets for communication attempts with insufficient credit. The event monitor 313 sends 504 communication information comprising the A number of the A party device 301, the B number of the B party device 308, and a timestamp for communication attempts with insufficient credit to the application server 314 exemplarily illustrated in FIG. 4. The event monitor 313 logs 505 all the communication information sent to the application server 314 in a log file for security audit and review. The event monitor 313 ensures that the communication information passed to the application server 314 is logged to facilitate a complete security audit by the carrier network provider. The security audit provides evidence that only relevant communication information about communication attempts with insufficient credit is being passed out from the event monitor 313.

Figure 6:
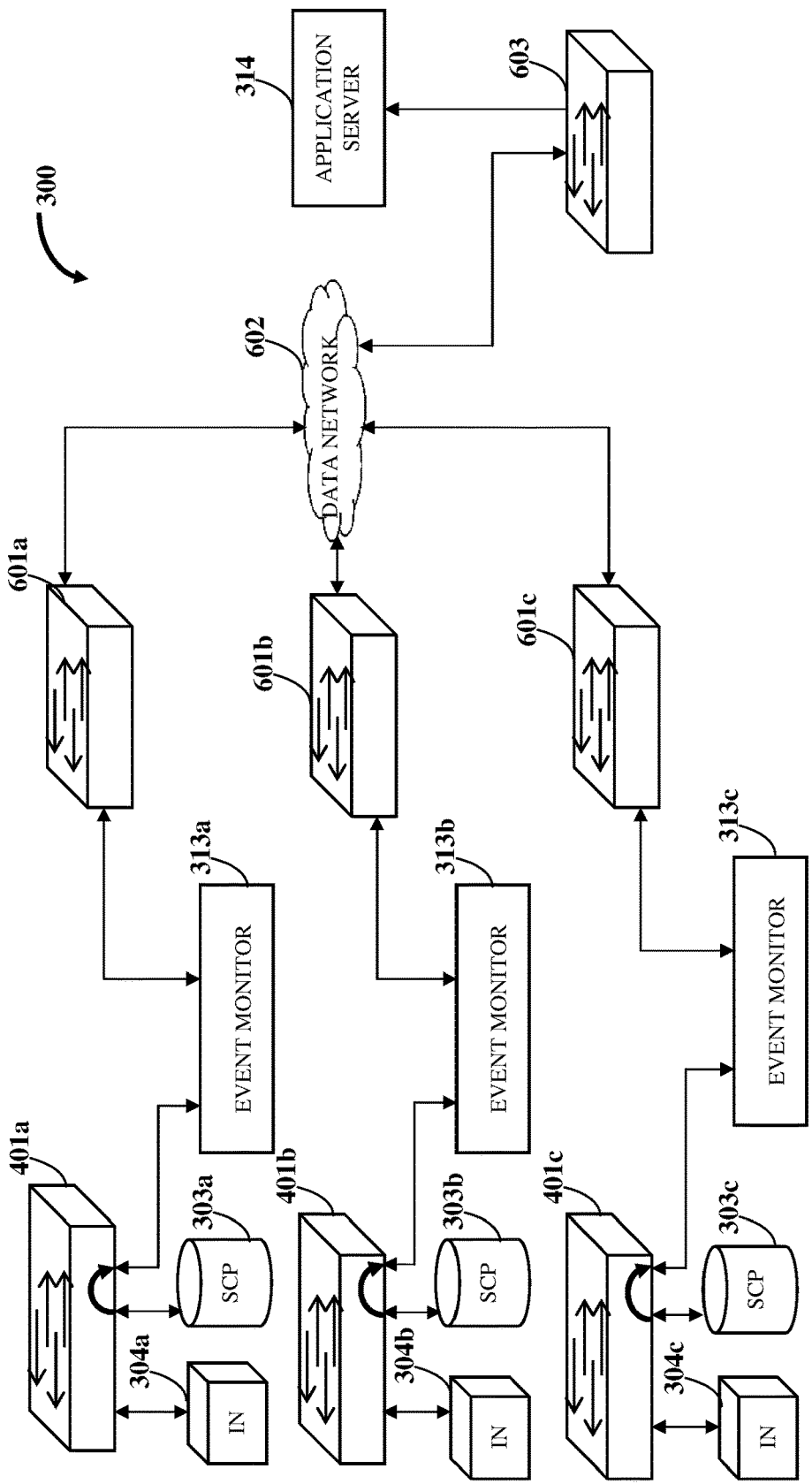
FIG. 6 exemplarily illustrates a schematic diagram of a distributed architecture of the system comprising the callback notification system for receiving information from multiple service control points about communication attempts made by calling party devices to contact called party devices, with insufficient credit for communication, using layer 2 port mirroring.

FIG. 6 exemplarily illustrates a schematic diagram of a distributed architecture of the system 300 comprising the callback notification system 305 exemplarily illustrated in FIG. 4, for receiving information from multiple service control points (SCPs) 303*a*, 303*b*, and 303*c* about communication attempts made by calling party devices to contact called party devices, with insufficient credit for communication, using layer 2 port mirroring. As exemplarily illustrated in FIG. 6, multiple event monitors 313*a*, 313*b*, and 313*c* are deployed to share load from multiple intelligent networks 304*a*, 304*b*, and 304*c* and multiple service control points 303*a*, 303*b*, and 303*c* respectively. The event monitors 313*a*, 313*b*, and 313*c* are deployed for the SCPs 303*a*, 303*b*, and 303*c* respectively with the layer 2 port mirroring being done locally for the SCPs 303*a*, 303*b*, and 303*c* in the network switches 401*a*, 401*b*, and 401*c* respectively, as disclosed in the detailed description of FIG. 4. The network switches 601*a*, 601*b*, 601*c*, and 603 serve a data network 602 on which the event monitors 313*a*, 313*b*, and 313*c* and the application server 314 of the callback notification system 305 are connected. The network switches 601*a*, 601*b*, and 601*c* are in operable communication with the network switch 603 via the data network 602. The event monitors 313*a*, 313*b*, and 313*c* communicate with the network switch 603 and in turn with the application server 314 via their respective network switches 601*a*, 601*b*, and 601*c* and the data network 602.

Figure 7:
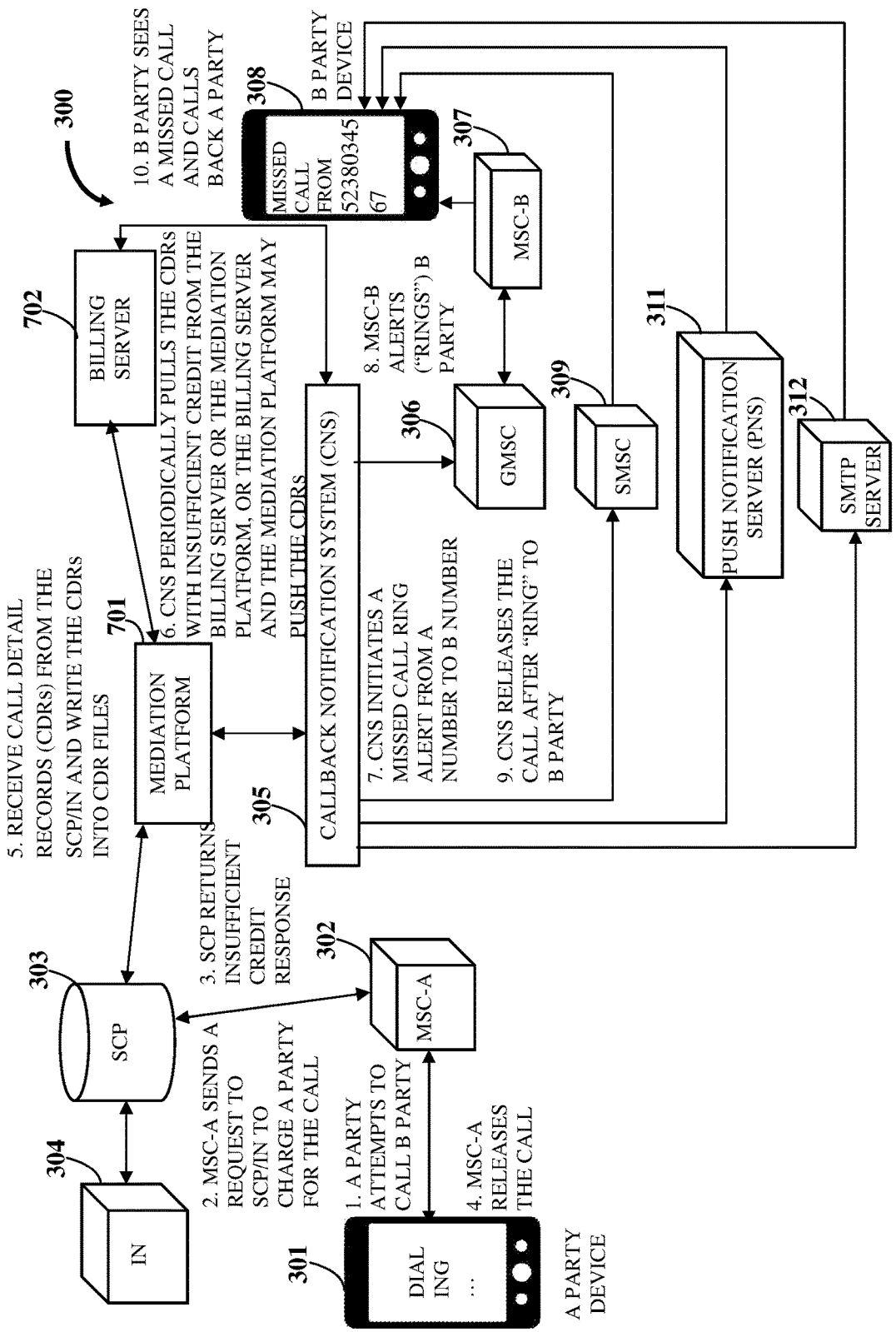
FIG. 7 exemplarily illustrates an embodiment of the system comprising the callback notification system for sending one or more callback notifications from a source number of a calling party device to a destination number of a called party device using communication information received from a service control point of a carrier network via a billing server and/or a mediation platform.

FIG. 7 exemplarily illustrates an embodiment of the system 300 comprising the callback notification system 305 for sending one or more callback notifications from a source number of a calling party device 301, herein referred to as an "A party device" and referenced by the numeral 301, to a destination number of a called party device 308, herein referred to as a "B party device" and referenced by the numeral 308, using communication information received from a service control point (SCP) 303 of a carrier network via a billing server 702 and/or a mediation platform 701. In this embodiment, the callback notification system 305 receives the communication information of an unsuccessful call attempt from the SCP 303 of an intelligent network (IN) 304, that is, the SCP/IN 303/304, in the carrier network as disclosed in the detailed description of FIG. 3A. A calling party, that is, the A party, attempts to call a called party, that is, the B party. The originating mobile switching center (MSC), that is, the MSC serving the A party device 301, MSC-A 302, sends a request to the SCP/IN 303/304, to charge A party for the call. The SCP 303 returns a response conveying insufficient credit in the A party's account with the carrier. The MSC-A 302 releases the call made by the A party device 301 to contact the B party device 308.

The callback notification system 305 periodically pulls call detail records from the service control point (SCP)/intelligent network (IN) 303/304, or the billing server 702, or the mediation platform 701 for the unsuccessful call attempt made by the A party device 301 to the B party device 308. The mediation platform 701, in communication with the billing server 702, receives call detail records (CDRs) from the SCP/IN 303/304 and writes the CDRs into CDR files. In an embodiment, the callback notification system 305 receives communication information by processing the CDRs received periodically pushed by the SCP/IN 303/304, or the billing server 702, or the mediation platform 701 to identify the A number and the B number as disclosed in the detailed description of FIGS. 1-2. The callback notification system 305 initiates a missed call ring alert by placing a call from the A number of the A party device 301 to the B number of the B party device 308 through the gateway mobile switching center (GMSC) 306. The terminating mobile switching center (MSC), that is, the MSC serving the B party device 308, herein referred to as MSC-B 307, alerts the B party of the call placed by the callback notification system 305 by ringing the B party device 308. The callback notification system 305 releases the placed call after the B party device 308 receives a ring. The B party device 308 receives a missed call. The B party sees the missed call on the B party device 308 and calls back the A party for connecting and completing communication with the A party.

In an embodiment, the callback notification system 305 sends an alternative callback notification, for example, a callback short message service (SMS) message to the B party device 308 via the short message service center (SMSC) 309, and/or a callback client push notification to the B party device 308 via the push notification server 311, and/or a callback electronic mail (email) to an email identification (ID) of the B party via the simple mail transfer protocol (SMTP) server 312, if the missed call ring alert is successful or fails, or concurrently with the missed call ring alert as disclosed in the detailed description of FIGS. 3B-3E. The B party device 308 receives the alternative callback notification and the B party calls back the A party for connecting and completing communication with the A party.

Figure 8:
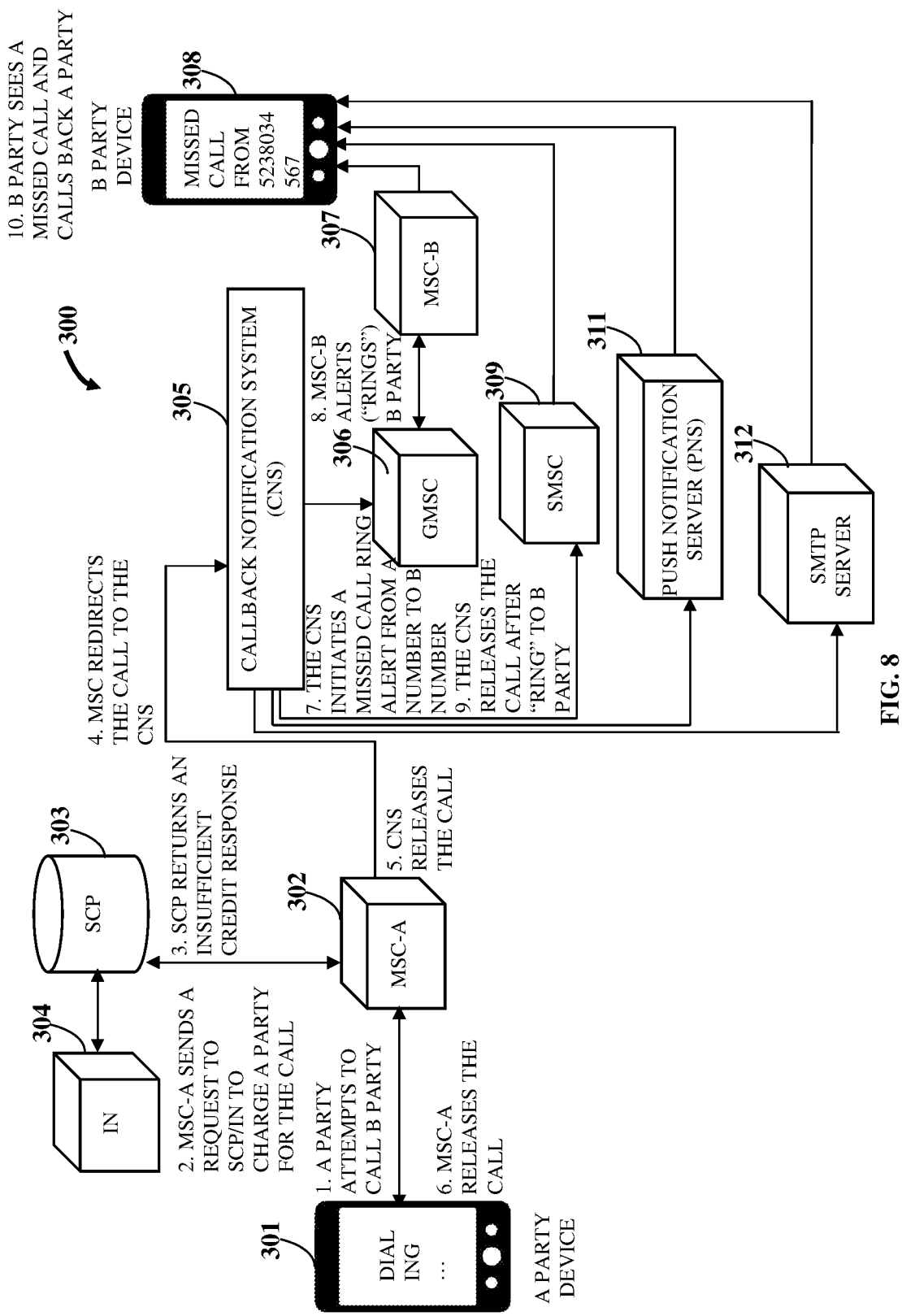
FIG. 8 exemplarily illustrates an embodiment of the system comprising the callback notification system for sending one or more callback notifications from a source number of a calling party device to a destination number of a called party device using communication information received from a mobile switching center of a carrier network.

FIG. 8 exemplarily illustrates an embodiment of the system 300 comprising the callback notification system 305 for sending one or more callback notifications from a source number of a calling party device 301, herein referred to as an "A party device", to a destination number of a called party device 308, herein referred to as an "B party device", using communication information received from a mobile switching center (MSC) of a carrier network. In this embodiment, the callback notification system 305 receives the communication information of an unsuccessful call attempt from the MSC serving the A party device 301, that is, MSC-A 302. As exemplarily illustrated in FIG. 8, A calling party, that is, the A party, attempts to call a called party, that is, the B party. The originating mobile switching center (MSC), that is, the MSC-A 302, sends a request to the service control point (SCP) 303 of the intelligent network (IN) 304, that is, the SCP/IN 303/304, to charge the A party for the call. The service control point (SCP) 303 returns a response conveying insufficient credit in the A party's account registered with the carrier. The MSC-A 302 redirects the call attempt made by the A party to the callback notification system 305. The callback notification system 305 releases the redirected call from the MSC-A 302, which in turn releases the call made by the A party. The MSC-A 302 forwards signaling information of the unsuccessful call attempt made by the A party device 301 to contact the B party device 308 to the callback notification system 305.

The callback notification system 305 receives the communication information by extracting the source number and the destination number from the signaling information. The callback notification system 305 initiates a missed call ring alert by placing a call from the source number, that is, the A number, of the A party device 301 to the destination number, that is, the B number of the B party device 308 through the gateway mobile switching center (GMSC) 306. The terminating mobile switching center (MSC), that is, the MSC serving the B party device 308, herein referred to as MSC-B 307, alerts the B party of the call placed by the callback notification system 305 by ringing the B party device 308. The callback notification system 305 releases the placed call after the B party device 308 receives a ring. The B party device 308 receives a missed call. The B party sees the missed call on the B party device 308 and calls back the A party for connecting and completing communication with the A party. In an embodiment, the callback notification system 305 sends an alternative callback notification, for example, a callback short message service (SMS) message to the B party device 308 via the short message service center (SMSC) 309, and/or a callback client push notification to the B party device 308 via the push notification server 311, and/or a callback electronic mail (email) to an email identification (ID) of the B party via the simple mail transfer protocol (SMTP) server 312, if the missed call ring alert is successful or fails, or concurrently with the missed call ring alert as disclosed in the detailed description of FIGS. 3B-3E. The B party device 308 receives the alternative callback notification and the B party calls back the A party for connecting and completing communication with the A party.

FIGS. 9A-9B exemplarily illustrate embodiments of the system 300 comprising the callback notification system 305 for sending one or more callback notifications from a source number of a calling party device 301, herein referred to as an "A party device", to a destination number of a called party device 308, herein referred to as a "B party device" using communication information received from a client application implemented on the A party device 301. The client application implemented on the A party device 301 is herein referred as the "callback notification application". In this embodiment, the callback notification system 305 receives communication information of an unsuccessful call attempt from the callback notification application implemented on the A party device 301.

As exemplarily illustrated in FIG. 9A, a calling party, that is, the A party, using the A party device 301 initiates a missed call to a destination number of the B party device 308 belonging to the B party using the callback notification application implemented on the A party device 301. When either the A party or the B party belongs to a carrier network that has deployed the callback notification system 305, the callback notification application sends a request to place a missed call from a source number, for example, an A number of the A party device 301 to the destination number, for example, a B number the B party device 308, to the callback notification system 305. The callback notification system 305 initiates a missed call ring alert by placing a call from the A number to the B number through the gateway mobile switching center (GMSC) 306 via a secured virtual private network (VPN) connection. The mobile switching center (MSC) serving the B party device 308, that is, MSC-B 307, alerts the B party of the call placed by the callback notification system 305 by ringing the B party device 308. After the B party device 308 receives a ring, the callback notification system 305 releases the placed call. The callback notification application on the A party device 301 shows status of the missed call ring alert initiated to the B party. The B party sees a missed call on the B party device 308 and calls back the A party to connect and complete communication with the A party.

When both the A party and the B party do not belong to the carrier network that has deployed the callback notification system 305, the callback notification application sends a request to place a missed call from the A number of the A party device 301 to the B number of the B party device 308, to the callback notification system 305. The callback notification system 305 initiates a missed call ring alert by placing a call from the A number to the B number. The callback notification system 305 uses a session initiation protocol (SIP) trunking provider 901 to place the missed call to the B number and collect a response from the B party device 308. After the B party device 308 receives a ring, the callback notification system 305 releases the initiated call. The callback notification application on the A party device 301 shows status of the missed call initiated to the B party. The B party sees a missed call on the B party device 308 and calls back the A party to connect and complete communication with the A party.

As exemplarily illustrated in FIG. 9B, the A party initiates a missed call to the B party using the callback notification application on the A party device 301. The callback notification application sends a request to place a missed call from the A number to the B number, to the callback notification system 305 as disclosed in the detailed description of FIG. 9A. The callback notification application on the A party device 301 shows status of the missed call initiated to the B party. In an embodiment, the callback notification system 305 sends an alternative callback notification, for example, a callback short message service (SMS) message to the B party device 308 via the short message service center (SMSC) 309, a callback client push notification to the B party device 308 via the push notification server 311, and a callback electronic mail (email) to an email identification (ID) of the B party via the simple mail transfer protocol (SMTP) server 312, if the missed call ring alert is successful or fails, or concurrently with the missed call ring alert as disclosed in the detailed description of FIGS. 3B-3E.

Figure 10:
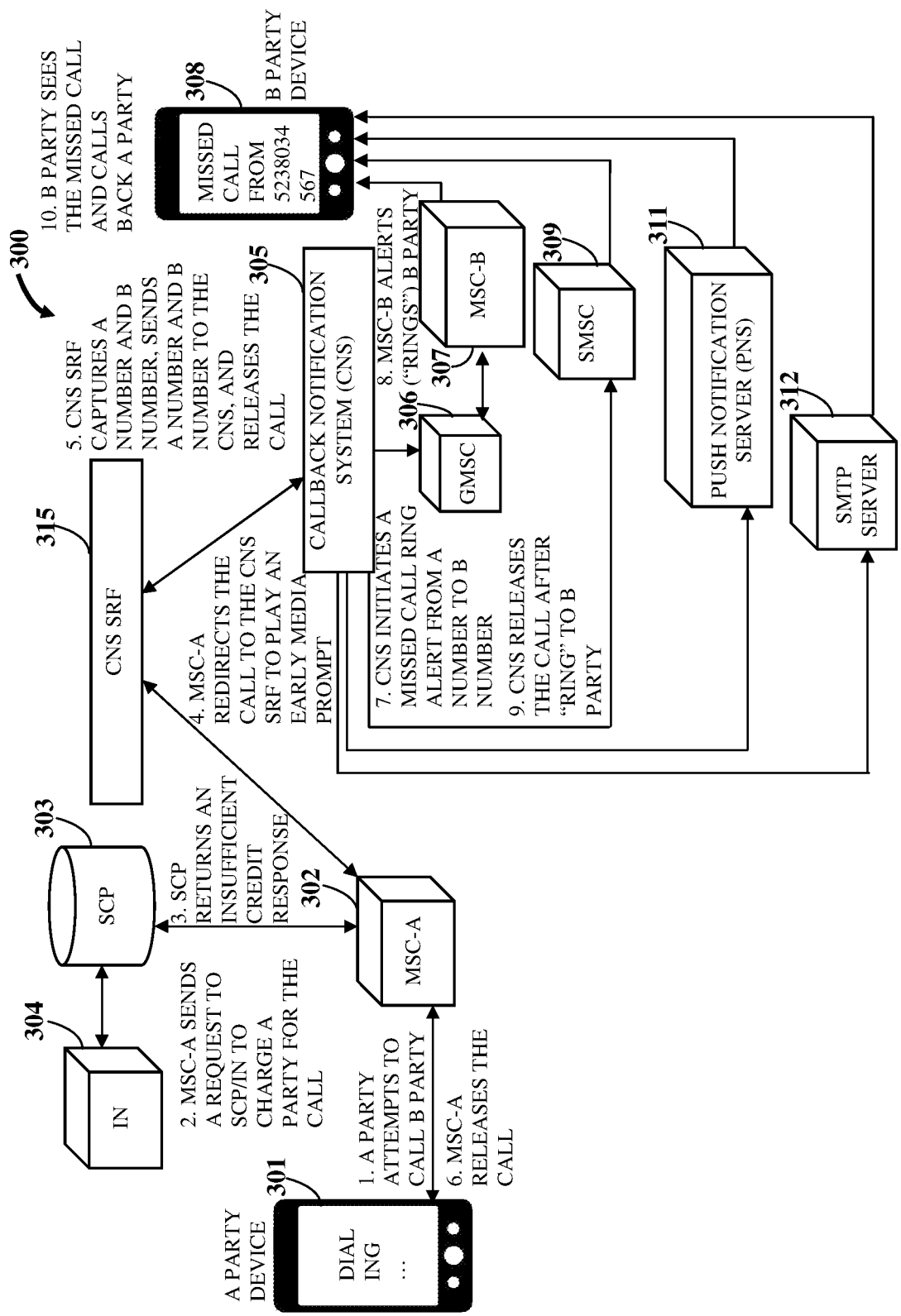
FIG. 10 exemplarily illustrates an embodiment of the system comprising the callback notification system for sending one or more callback notifications from a source number of a calling party device to a destination number of a called party device using communication information received from a specialized resource function node of a carrier network.

FIG. 10 exemplarily illustrates an embodiment of the system 300 comprising the callback notification system 305 for sending one or more callback notifications from a source number of a calling party device 301, herein referred to as an "A party device", to a destination number of a called party device 308, herein referred to as a "B party device", using communication information received from a specialized resource function (SRF) node 315 of a carrier network. In this embodiment, the callback notification system (CNS) 305 receives the communication information of the unsuccessful call attempt from the mobile switching center (MSC) of the carrier network associated with the A party device 301, that is, the MSC-A 302, through the SRF node 315 implemented in the callback notification system 305 and exemplarily illustrated as CNS SRF 315 in FIG. 10. The MSC-A 302 forwards signaling information of the unsuccessful call attempt made by the A party device 301 to contact the B party device 308, to the CNS SRF node 315 of the callback notification system 305. The callback notification system 305 receives the communication information by extracting the source number and the destination number from the forwarded signaling information. The CNS SRF node 315, operably coupled between the MSC-A 302 and the callback notification system 305, plays an early media announcement on the unsuccessful call attempt to the A party device 301. In an embodiment, the callback notification system 305 receives the communication information from a response from the A party device 301 to an early media prompt played by the CNS SRF node 315.

As exemplarily illustrated in FIG. 10, the calling party, that is, the A party, attempts to call the B party device 308. The originating mobile switching center (MSC), that is, the MSC serving the A party device 301, MSC-A 302, sends a request to the service control point (SCP) 303 of the intelligent network (IN) 304, that is, the SCP/IN 303/304, to charge the A party for the call. The SCP 303 returns a response conveying insufficient credit in the A party's account registered with the carrier. The MSC-A 302 redirects the call attempt made by the A party device 301 to the callback notification system specialized resource function (CNS SRF) node 315 to play an early media prompt through which the CNS SRF 315 captures an A number of the A party device 301 and a B number of the B party device 308. The CNS SRF 315 sends the captured A number and the B number to the callback notification system 305 and releases the redirected call attempt to the MSC-A 302. In an embodiment, the CNS SRF 315 captures the A number and the B number and sends the captured A number and the B number to the callback notification system 305 and then plays the early media prompt. In another embodiment, the CNS SRF 315 plays the early media prompt, then captures the A number and the B number, and then sends the captured A number and the B number to the callback notification system 305. In another embodiment, the CNS SRF 315 plays the early media prompt and sends the A number and the B number to the callback notification system 305. The MSC-A 302 releases the call attempt to the A party device 301.

The callback notification system 305 initiates a missed call ring alert by placing a call from the A number to the B number through the gateway mobile switching center (GMSC) 306. The terminating mobile switching center (MSC), that is, the MSC serving the B party device 308, MSC-B 307, alerts the B party of the call initiated by the callback notification system 305 by ringing the B party device 308. The callback notification system 305 releases the initiated call after the B party device 308 receives a ring. The B party device 308 receives a missed call. The B party sees the missed call on the B party device 308 and calls back the A party for connecting and completing communication with the A party. In an embodiment, the callback notification system 305 sends an alternative callback notification, for example, a callback short message service (SMS) message to the B party device 308 via the short message service center (SMSC) 309, and/or a callback client push notification to the B party device 308 via the push notification server 311, and/or a callback electronic mail (email) to an email identification (ID) of the B party via the simple mail transfer protocol (SMTP) server 312, if the missed call ring alert is successful or fails, or concurrently with the missed call ring alert as disclosed in the detailed description of FIGS. 3B-3E. The B party device 308 receives the alternative callback notification and the B party calls back the A party for connecting and completing communication with the A party.

Figure 11:
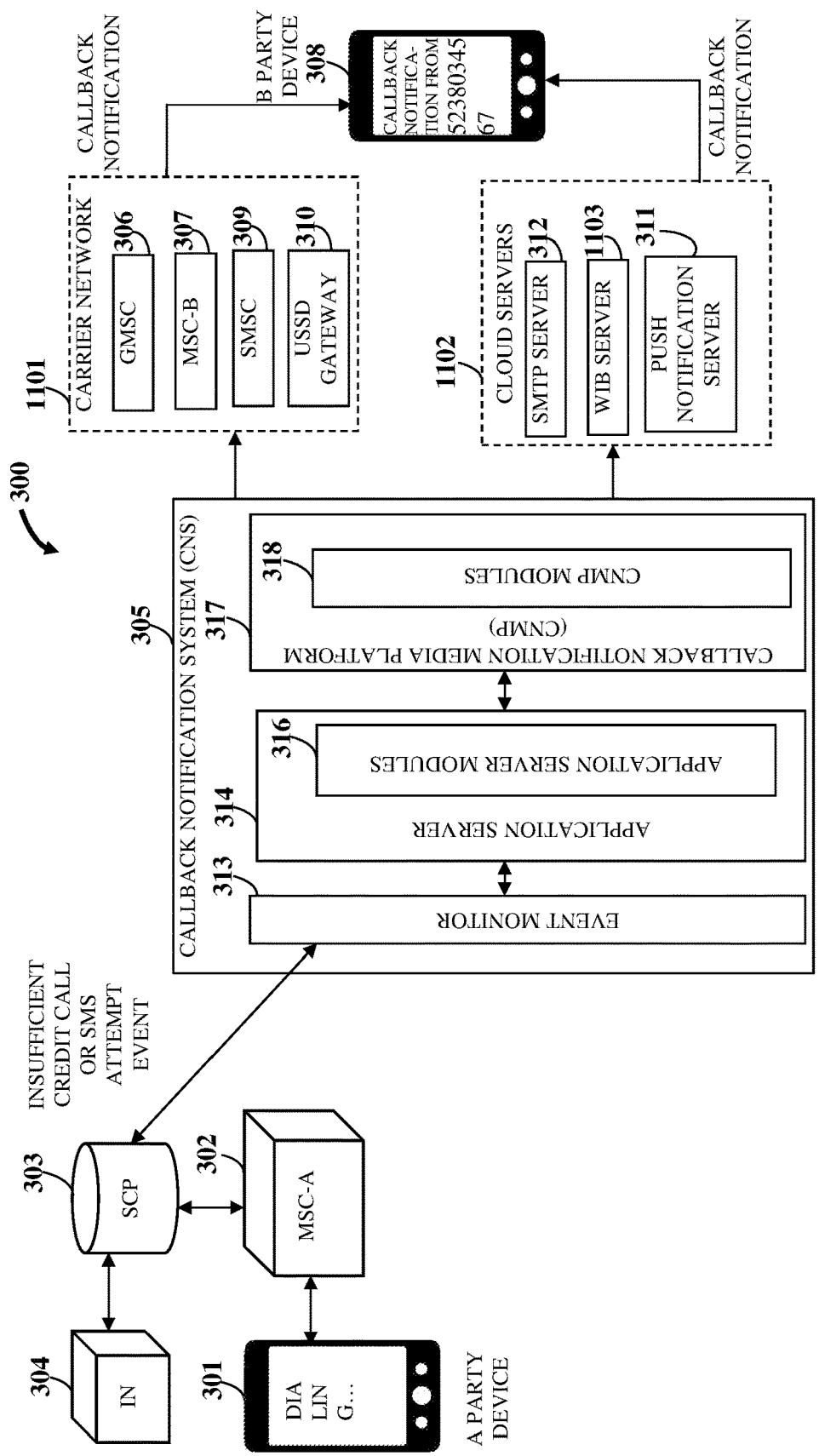
FIG. 11 exemplarily illustrates communication between the callback notification system, a calling party device, and a called party device for sending a callback notification from a source number of the calling party device to a destination number of the called party device.

FIG. 11 exemplarily illustrates communication between the callback notification system 305, a calling party device 301, herein referred to as an "A party device", and a called party device 308, herein referred to as a "B party device", for sending a callback notification from a source number of the A party device 301 to a destination number of the B party device 308. In an embodiment, the callback notification system 305 comprises the event monitor 313 and the application server 314 as disclosed in the detailed description of FIG. 4, and a callback notification media platform 317. The event monitor 313 receives communication information comprising the source number and the destination number from the A party device 301 or a carrier network 1101 of the calling party associated with the A party device 301, when an unsuccessful communication attempt, for example, an unsuccessful call attempt or an unsuccessful short service message (SMS) attempt, is made by the A party device 301 to contact the B party device 308.

As exemplarily illustrated in FIG. 11, the event monitor 313 receives the communication information from a service control point (SCP)/intelligent network (IN) 303/304. In an embodiment, the event monitor 313 receives the communication information from the mobile switching center (MSC) of the carrier network 1101 associated with the A party device 301, that is, the MSC-A 302, or a service control point (SCP) 303 of the carrier network 1101, or a specialized resource function (SRF) node 315 of the carrier network 1101 exemplarily illustrated in FIG. 10, or a billing server 702, or a mediation platform 701 exemplarily illustrated in FIG. 7, or the callback notification application implemented on the A party device 301 as disclosed in the detailed description of FIG. 1, FIG. 8, FIGS. 9A-9B, and FIG. 10. The event monitor 313 receives the communication information by processing call detail records received from the SCP 303 of the intelligent network (IN) 304, or, in an embodiment, from the billing server 702 or the mediation platform 701. The event monitor 313 applies filters to the call detail records for identifying communication attempts made by the A party device 301 to contact the B party device 308 that are unsuccessful due to insufficient credit for voice communication, and/or a short message service (SMS) communication, and/or data communication over the carrier network 1101 in the calling party's account or absence of network connectivity between the A party device 301 and the B party device 308, if the call detail records received from the SCP/IN 303/304, or the billing server 702, or the mediation platform 701 are unfiltered. In another embodiment, the event monitor 313 receives the communication information from the SCP 303 of the carrier network 1101 by receiving signaling information and data traffic processed by the SCP 303 using mirroring on a network switch 401 connected to the SCP 303 exemplarily illustrated in FIG. 4 and as disclosed in the detailed description of FIG. 4. In other embodiments, the event monitor 313 receives the communication information from the callback notification application in the A party device 301 or from one of different components of the carrier network 1101 in different ways as disclosed in the detailed description of FIGS. 1-2, FIGS. 7-8, FIGS. 9A-9B, and FIG. 10.

Figure 12:
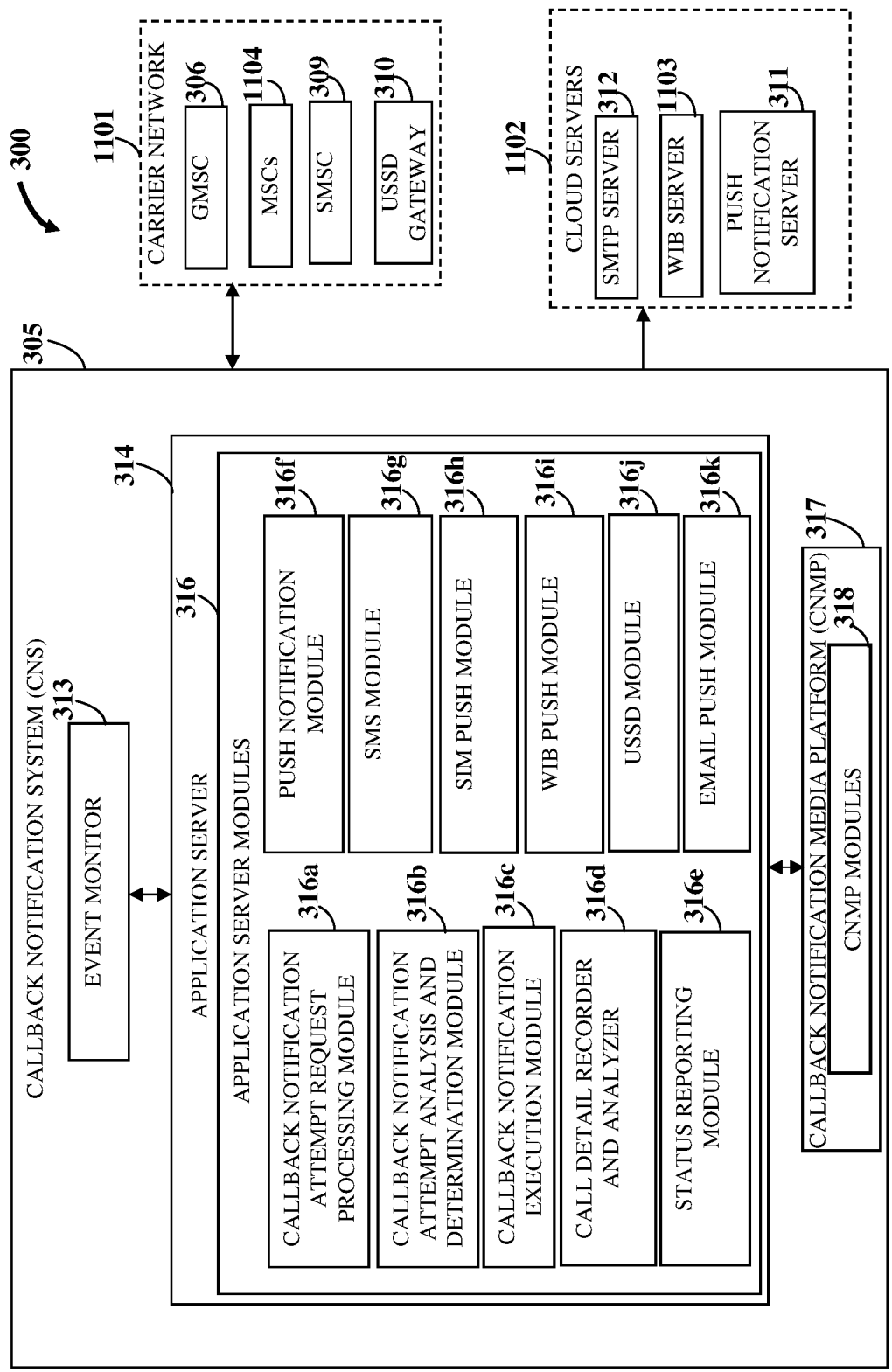
FIGS. 12-13 exemplarily illustrate modules of an embodiment of the callback notification system, in communication with a carrier network and cloud servers, for sending a callback notification from a source number of a calling party device to a destination number of a called party device.
Figure 13:
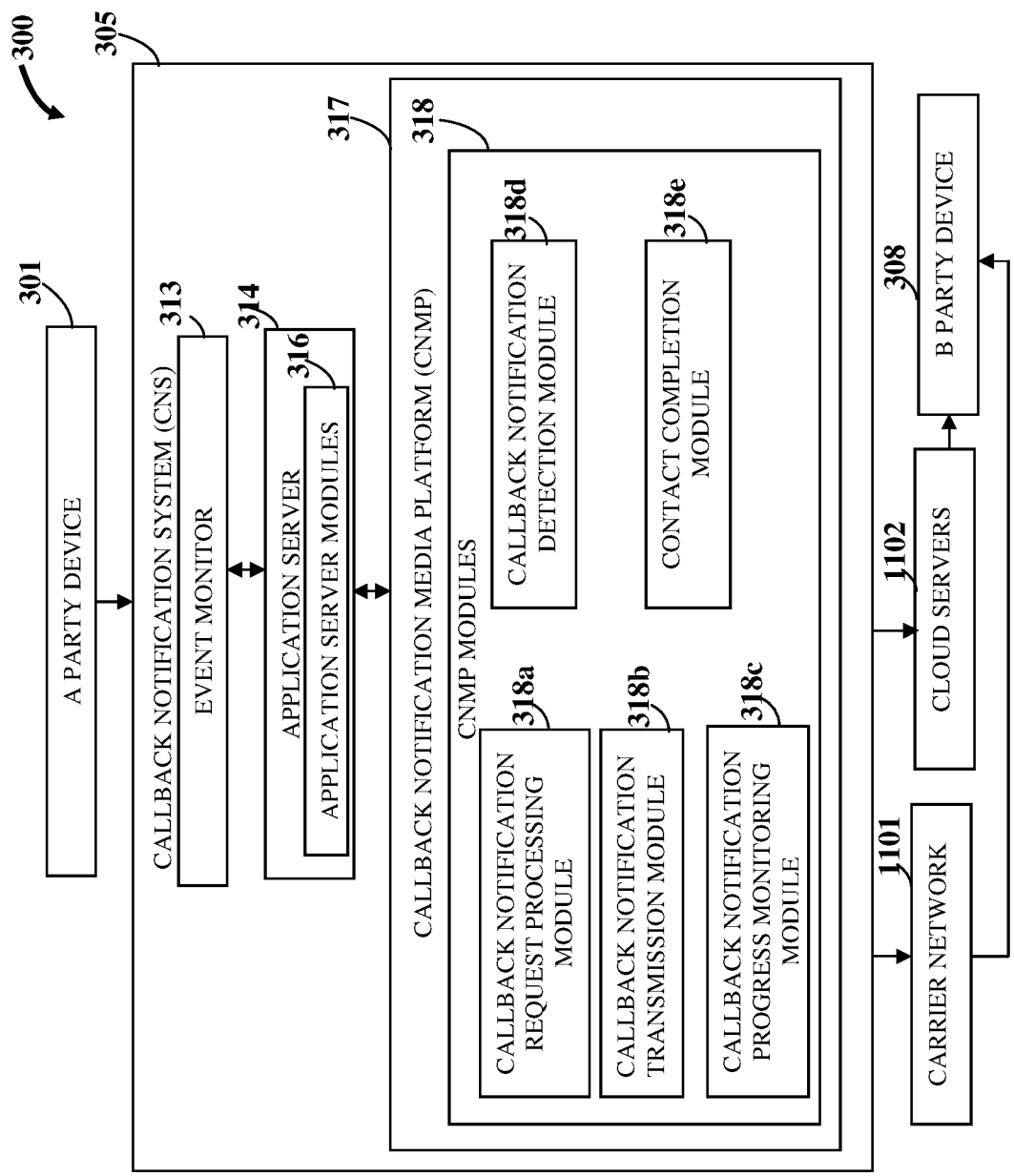

The application server 314 comprises application server modules 316, and the callback notification media platform 317 comprises callback notification media platform modules 318 as exemplarily illustrated in FIGS. 12-13. The callback notification system 305 sends the callback notifications to the B party device 308 over the carrier network 1101 and cloud servers 1102. For example, the callback notification system 305 sends the missed call ring alert through the gateway mobile switching center (GMSC) 306 and the mobile switching center (MSC) serving the B party device 308, that is, the MSC-B 307, the callback unstructured supplementary service data (USSD) push notification through the USSD gateway 310, a callback wireless internet browser (WIB) push notification through a WIB server 1103, a callback SMS message through the short message service center (SMSC) 309, a callback electronic mail through the simple mail transfer protocol (SMTP) server 312, a subscriber identity module (SIM) push notification through the SMSC 309, and callback client push notifications via the push notification server 311. As exemplarily illustrated in FIG. 11, the GMSC 306, the MSC-B 307, the SMSC 309, and the USSD gateway 310 constitute the carrier network 1101, while the SMTP server 312, the WIB server 1103, and the push notification server 311 constitute the cloud servers 1102 of the system 300.

A generic device using a generic program cannot interface instantaneously with the event monitor 313, the application server 314, and the callback notification media platform 317 of the callback notification system 305 for sending a callback notification from a source number of the A party device 301 to a destination number of the B party device 308, when an unsuccessful communication attempt is made by the A party device 301 to contact the B party device 308. In the system 300 disclosed herein, the callback notification application 2002a on the A party device 301 exemplarily illustrated in FIG. 20, interfaces with the different components of the carrier network 1101 and with the callback notification system 305, and the event monitor 313, the application server 314, and the callback notification media platform 317 of the callback notification system 305 interface with each other and with the carrier network 1101 and the cloud servers 1102 for sending the callback notification from the source number of the A party device 301 to the destination number of the B party device 308, when an unsuccessful communication attempt is made by the A party device 301 to contact the B party device 308, and therefore the system 300 disclosed herein uses more than one specifically programmed computer system.

FIGS. 12-13 exemplarily illustrate modules of an embodiment of the callback notification system 305, in communication with the carrier network 1101 and the cloud servers 1102, for sending a callback notification from a source number of a calling party device 301, herein referred to as an "A party device", to a destination number of a called party device 308, herein referred to as a "B party device". As exemplarily illustrated in FIG. 12, the application server modules 316 of the application server 314 of the callback notification system 305 comprise a callback notification attempt request processing module 316a, a callback notification attempt analysis and determination module 316b, a callback notification execution module 316c, a call detail recorder and analyzer 316d, a status reporting module 316e, a push notification module 316f, a short message service (SMS) module 316g, a subscriber identity module (SIM) push module 316h, a wireless internet browser (WIB) push module 316i, an unstructured supplementary service data (USSD) module 316j, and an electronic mail (email) push module 316k. Although FIG. 12 exemplarily illustrates the application server modules 316 being implemented on a single application server 314, the scope of the callback notification system 305 disclosed herein may be extended to implement the application server modules 316 on a network of two or more servers and computer systems. In an embodiment, the callback notification system 305 provides options to the A party device 301 for sending a callback message, for example, an interactive message to the B party device 308 when an unsuccessful communication attempt is made by the A party device 301 to contact the B party device 308. The options for sending the callback notification comprise, for example, a SMS, a SIM push, a network initiated USSD push, a WIB push, a notification in the callback notification application implemented on the B party device 308, etc. The callback message sent to the B party device 308 comprises an option for placing a callback to the A party device 301.

The callback notification attempt request processing module 316a of the application server 314 processes a request for a callback notification, for example, a callback missed call ring alert, a callback short message service (SMS) message, a callback client push notification, a callback network initiated unstructured supplementary service data (USSD) push notification, a callback wireless internet browser (WIB) push notification, a callback subscriber identity module (SIM) push notification, a callback electronic mail (email), a notification in the callback notification application on the B party device 308, etc., with a source number and a destination number extracted from the communication information received by the event monitor 313. The callback notification attempt request processing module 316a processes the request for the callback notification through different modes of communication using the carrier network 1101 and the cloud servers 1102. The callback notification system 305 communicates with the B party device 308 through SMS messaging using the SMS module 316g, through a SIM push using the SIM push module 316h, through a WIB push using the WIB push module 316i, through USSD commands using the USSD module 316j, through other push notifications using the push notification module 316f, and through electronic mails (emails) using the email push module 316k according to the mode of communication requested by the A party device 301.

In an embodiment, the callback notification attempt analysis and determination module 316b, in communication with the callback notification application implemented on the A party device 301, detects communication attempts made by the A party device 301 to contact the B party device 308 that are unsuccessful due to insufficient credit for voice communication, and/or a short message service (SMS) communication, and/or data communication over the network, for example, the carrier network 1101 in the calling party's account. In another embodiment, the callback notification attempt analysis and determination module 316b analyzes the communication information of the unsuccessful communication attempt made by the A party device 301 to contact the B party device 308 based on one or more predetermined parameters to determine whether the calling party associated with the A party device 301 as identified by the source number and a called party associated with the B party device 308 as identified by the destination number qualify for sending the callback notification from the source number to the destination number as disclosed in the detailed description of FIG. 1.

The callback notification attempt analysis and determination module 316b analyzes communication attempts made by the A party device 301 to contact the B party device 308 and determines whether the B party device 308 is available for receiving the callback notification. If the B party device 308 is available, the callback notification attempt analysis and determination module 316b determines a status and a profile of the A party device 301 as identified by the source number and a status and a profile of the B party device 308 as identified by the destination number to be qualified for sending the callback notification at a particular point in time. In an embodiment, the callback notification attempt analysis and determination module 316b determines that the A party device 301 as identified by the source number does not qualify for sending a callback notification at a particular time because of a high frequency of requesting callback notifications to one or more destination numbers. In another embodiment, the callback notification attempt analysis and determination module 316b determines that the B party device 308 as identified by the destination number does not qualify for sending the callback notification at that time because of receiving a recent request from the destination number for sending a callback notification indicating that the B party device 308 as identified by the destination number does not have sufficient credit to communicate with the A party device 301 via a return call or a return short message service (SMS) message.

The callback notification execution module 316c initiates sending of the callback notification from the source number to the destination number through respective gateways and servers. For example, the callback notification execution module 316c initiates placement of a call from the source number to the destination number through the gateway mobile switching center (GMSC) 306 and the mobile switching centers (MSCs) 1104. For sending a callback short message service (SMS) message to the destination number from the source number, the callback notification execution module 316c activates the SMS module 316g to initiate sending the callback SMS message to the destination number via the short message service center (SMSC) 309. For sending a callback subscriber identity module (SIM) push notification to the B party device 308, the callback notification execution module 316c activates the SIM push module 316h to initiate sending the callback SIM push notification to the destination number via the SMSC 309. The callback notification execution module 316c activates the wireless internet browser (WIB) push module 316i and the electronic mail (email) push module 316k to send a callback WIB push notification and a callback email respectively to the B party device 308 via the WIB server 1103 and the simple mail transfer protocol (SMTP) server 312 respectively. For sending callback client push notifications to the B party device 308, the callback notification execution module 316c activates the push notification module 316f to initiate sending the callback client push notifications via the push notification server 311. For sending a callback network initiated unstructured supplementary service data (USSD) push notification to the B party device 308, the callback notification execution module 316c activates the USSD module 316j to initiate sending the callback network initiated USSD push notification to the B party device 308 via the USSD gateway 310.

The call detail recorder and analyzer 316d generates separate call detail records for each of the sent callback notifications and calculates revenue generated from callbacks or other responses, for example, in the form of SMS messages, etc., from the B party device 308 to the A party device 301 by correlating the separate call details records for each of the sent callback notifications with call detail records of the callbacks and other responses. The status reporting module 316e reports, to the A party device 301, the status of the callback notification, for example, the missed call ring alert and one or more of the alternative callback notifications sent to the A party device 301 as either having successfully reached the destination number or the B party device 308, or incomplete, for example, because the B party device 308 is switched off.

As exemplarily illustrated in FIG. 13, the callback notification media platform modules 318 of the callback notification media platform 317 comprise a callback notification request processing module 318a, a callback notification transmission module 318b, a callback notification progress monitoring module 318c, a callback notification detection module 318d, and a contact completion module 318e. Although FIG. 13 exemplarily illustrates the callback notification media platform modules 318 being implemented on a single callback notification media platform 317, the scope of the callback notification system 305 disclosed herein may be extended to implement the callback notification media platform modules 318 on a network of two or more servers, platforms, and computer systems. The callback notification request processing module 318a receives a request for sending one or more callback notification to the B party device 308 from the callback notification attempt request processing module 316a of the application server 314 and processes the request for sending the callback notifications to the B party device 308. For example, the callback notification request processing module 318a receives the request for initiating a call or sending a short message service (SMS) message to the destination number from the source number of the A party device 301 and processes the request for the call or the SMS message to the destination number of the B party device 308.

The callback notification transmission module 318b sends the callback notifications to the destination number of the B party device 308 with an identification of an originator of the callback notifications as the source number using the communication information received from the event monitor 313. In an embodiment, the callback notification transmission module 318b of the callback notification media platform 317 receives the communication information comprising the source number and the destination number from the application server 314. The callback notification progress monitoring module 318c monitors the progress of the callback notification sent by the callback notification transmission module 318b to check whether the callback notification has been sent or is incomplete, for example, due to the B party device 308 being switched off. The callback notification detection module 318d detects successful reach of the callback notification from the source number of the A party device 301 to the destination number of the B party device 308. For a missed call ring alert as a callback notification to the B party device 308 from the A party device 301, the callback notification detection module 318d detects a ringtone of the B party device 308 associated with the destination number when the call successfully reaches the destination number.

The contact completion module 318e provides multiple options to the A party device 301 for communicating with the B party device 308, when an unsuccessful communication attempt is made by the A party device 301 to contact the B party device 308. One of the options is to receive an advance of credit in the calling party's account for voice communication, and/or a short message service (SMS) communication, and/or data communication with the B party device 308 over the carrier network 1101. Another option is to receive credit in the calling party's account for voice communication, and/or the SMS communication, and/or data communication over the carrier network 1101 in exchange for engaging with an advertisement on the A party device 301. Another option is to place a collect call to the B party device 308 based on an agreement from the B party device 308 to pay for the collect call. Another option is send to a callback message to the B party device 308 with a request for a callback to the A party device 301 using an SMS message, or a subscriber identity module (SIM) push, or a network initiated unstructured supplementary service data (USSD) push, or a wireless internet browser (WIB) push, or a notification on the callback notification application on the B party device 308 via the carrier network 1101 and/or the cloud servers 1102.

Figure 14:
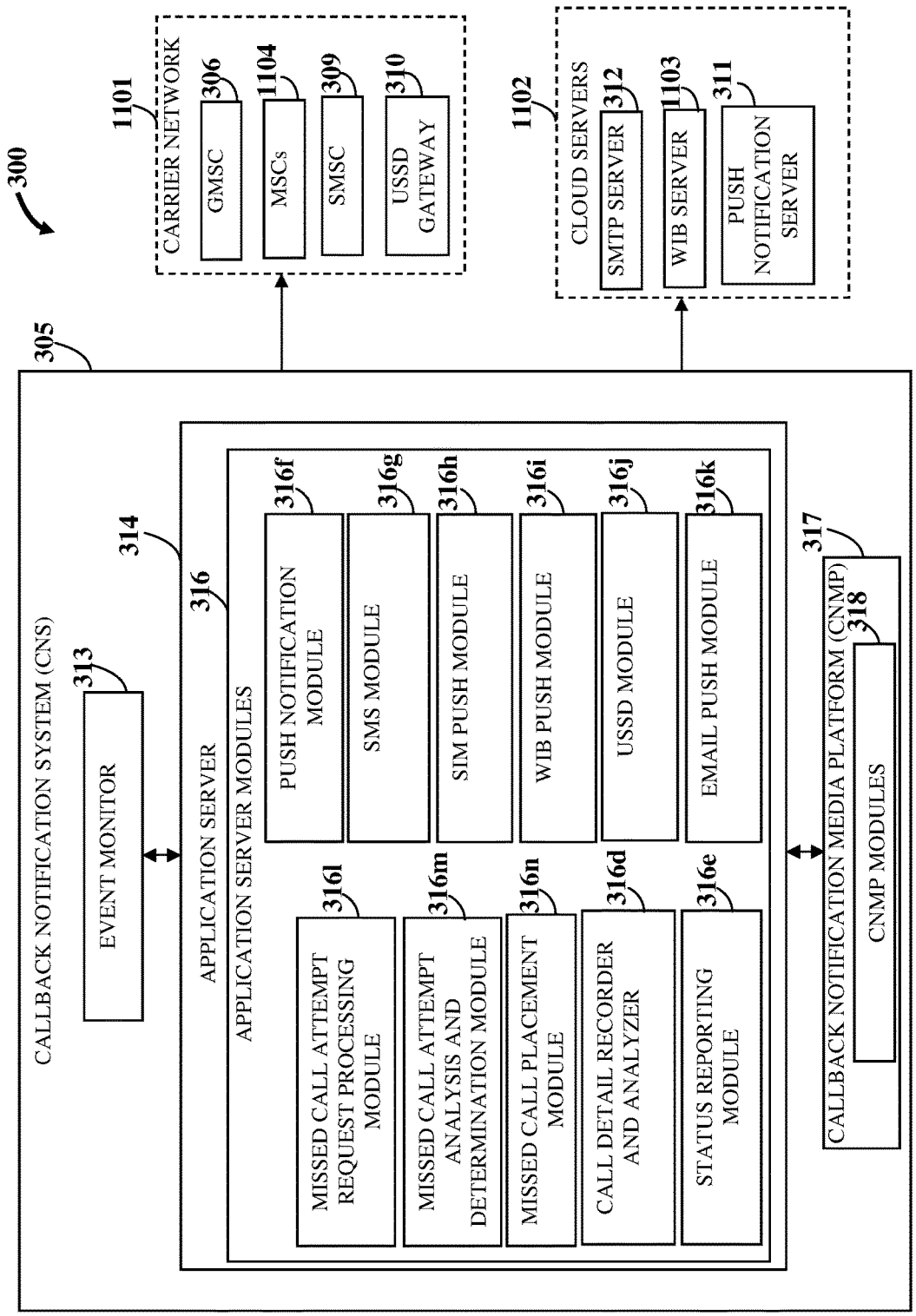
FIGS. 14-15 exemplarily illustrate modules of the callback notification system, in communication with a carrier network and cloud servers, for sending a missed call ring alert from a source number of a calling party device to a destination number of a called party device.
Figure 15:
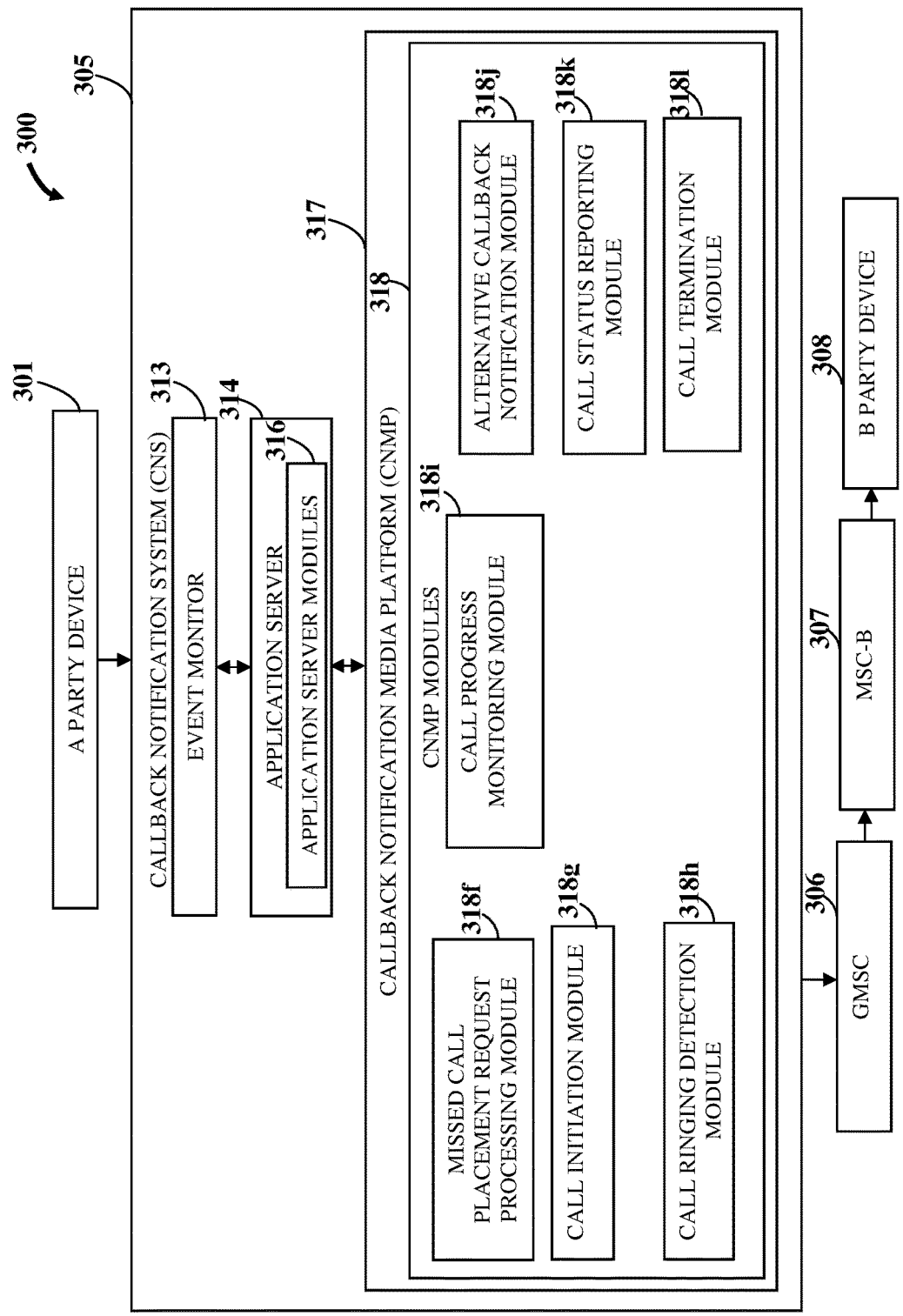

FIGS. 14-15 exemplarily illustrate modules of the callback notification system 305 in communication with the carrier network 1101 and the cloud servers 1102, for sending a missed call ring alert from a source number of a calling party device 301, herein referred to as an "A party device", to a destination number of a called party device 308, herein referred to as a "B party device". As exemplarily illustrated in FIG. 14, in addition to the call detail recorder and analyzer 316d, the status reporting module 316e, the push notification module 316f, the short message service (SMS) module 316g, the subscriber identity module (SIM) push module 316h, the wireless internet browser (WIB) push module 316i, the unstructured supplementary service data (USSD) module 316j, and the electronic mail (email) push module 316k disclosed in the detailed description of FIG. 12, the application server modules 316 of the application server 314 further comprise a missed call attempt request processing module 316l, a missed call attempt analysis and determination module 316m, and a missed call placement module 316n. The callback notification system 305 provides options to the A party device 301 for sending a callback notification using an SMS, a SIM push, network initiated USSD, a WIB push, a notification in the callback notification application on the B party device 308, etc., to the B party device 308 via the carrier network 1101 or the cloud servers 1102 when a call attempt made by the A party device 301 to contact the B party device 308 is unsuccessful as disclosed in the detailed description of FIG. 12.

The missed call attempt request processing module 316l processes a request for a missed call ring alert with a source number and a destination number received from the event monitor 313. The missed call attempt request processing module 316l processes the request for the missed call ring alert through different modes of communication using the carrier network 1101 and the cloud servers 1102 as disclosed in the detailed description of FIGS. 1-2. In an embodiment, the missed call attempt analysis and determination module 316m, in communication with the callback notification application implemented on the A party device 301, detects call attempts made by the A party device 301 to contact the B party device 308 that are unsuccessful due to insufficient credit for voice communication, and/or a short message service (SMS) communication, and/or data communication over the network, for example, the carrier network 1101 in the calling party's account.

In another embodiment, the missed call attempt analysis and determination module 316m analyzes the communication information of the unsuccessful call attempt made by the A party device 301 to contact the B party device 308 based on one or more predetermined parameters to determine whether the calling party associated with the A party device 301 as identified by the source number and a called party associated with the B party device 308 as identified by the destination number qualify for sending the missed call ring alert from the source number to the destination number as disclosed in the detailed description of FIGS. 1-2. The missed call attempt analysis and determination module 316m analyzes missed call attempts and determines whether the B party device 308 is available for receiving the missed call. If the B party device 308 is available, the missed call attempt analysis and determination module 316m determines a status and a profile of the A party device 301 as identified by the source number and a status and a profile of the B party device 308 as identified by the destination number to be qualified for placing the missed call at a particular point in time. In an embodiment, the missed call attempt analysis and determination module 316m determines that the A party device 301 as identified by the source number does not qualify for placing the missed call at a particular time because of a high frequency of requesting missed calls to one or more destination numbers. In another embodiment, the missed call attempt analysis and determination module 316m determines that the B party device 308 as identified by the destination number does not qualify for placing the missed call at that time because of receiving a recent request from the destination number for placing a missed call indicating that the B party device 308 as identified by the destination number does not have sufficient credit to place a return call.

The missed call placement module 316n initiates placement of the missed call from the source number to the destination number through the gateway mobile switching center (GMSC) 306. The call detail recorder and analyzer 316d generates separate call detail records for the sent missed call ring alert and calculates revenue generated from callbacks from the B party device 308 to the A party device 301 by correlating the separate call details records for each of the sent missed call ring alerts with call detail records of the callbacks as disclosed in the detailed description of FIGS. 1-2. The status reporting module 316e reports the status of the missed call ring alert as either having successfully reached the destination number, or incomplete, for example, because the B party device 308 is switched off.

As exemplarily illustrated in FIG. 15, the callback notification media platform modules 318 of the callback notification media platform 317 comprise a missed call placement request processing module 318f, a call initiation module 318g, a call ringing detection module 318h, a call progress monitoring module 318i, an alternative callback notification module 318j, a call status reporting module 318k, and a call termination module 318l. The missed call placement request processing module 318f receives a request for placing a missed call from the source number of the A party device 301 to the to the destination number of the B party device 308, from the missed call attempt request processing module 316l of the application server 314 and processes the request for the missed call to the destination number. The call initiation module 318g places a call to the destination number with the identification of the originator of the call as the source number using the received communication information. The call initiation module 318g initiates a call to the destination number on the B party device 308 through the gateway mobile switching center (GMSC) 306 and the mobile switching center (MSC) serving the B party device 308, that is, MSC-B 307. The call initiation module 318g places the call to the destination number using signaling resources of the network, for example, the carrier network 1101 exemplarily illustrated in FIG. 14, without reserving media resources for optimizing usage of resources of the carrier network 1101 as disclosed in the detail description of FIG. 2.

The call progress monitoring module 318i monitors the progress of the call initiated by the call initiation module 318g to check whether the call is incomplete, for example, due to the B party device 308 being switched off. The call ringing detection module 318h identifies a ring of the A party device 301 when the call successfully reaches the destination number. The call ringing detection module 318h detects a ringtone of the destination number when the call successfully reaches the destination number. The call termination module 318l terminates the call, thereby placing the missed call and sending the missed call ring alert to the destination number on the B party device 308. The call termination module 318l terminates the call on identification of the ring of the B party device 308 and prior to chargeable completion of the call. On terminating the call, the call termination module 318l sends the missed call ring alert from the source number of the A party device 301 to the destination number of the B party device 308. The call initiation module 318g, the call ringing detection module 318h, and the call termination module 318l constitute the callback notification transmission module 318*b* of the callback notification media platform 317 exemplarily illustrated in FIG. 13, in the embodiment where the callback notification is a missed call ring alert. The call status reporting module 318*k* reports a status of the call to the call termination module 318*l* to allow the call termination module 318*l* to terminate the call prior to chargeable completion of the call.

The alternative callback notification module 318*j* sends one or more alternative callback notifications to the B party device 308 when the placement of the call to the destination number of the B party device 308 for sending of the missed call ring alert to the destination number by the call initiation module 318*g* is unsuccessful. In an embodiment, the alternative callback notification module 318*j* sends one or more alternative callback notifications concurrently with the missed call ring alert to the B party device 308. The callback notification detection module 318*d*, exemplarily illustrated in FIG. 13, detects successful reach of the alternative callback notifications to the B party device 308. The status reporting module 316*e*, exemplarily illustrated in FIG. 13, reports, to the A party device 301, status of the missed call ring alert and the alternative callback notifications sent to the B party device 308. The architectural diagrams in FIGS. 11-15 are exemplarily illustrated in a non-redundant mode. High availability can be achieved by deploying multiple instances of the relevant devices and platforms.

FIGS. 16A-16E exemplarily illustrate message flow diagrams showing an exchange of signaling messages between a calling party device 301, herein referred to as an "A party device", components of a carrier network, and the callback notification system 305 for sending a callback notification from a source number of the A party device 301 to a destination number of a called party device 308, herein referred to as a "B party device". The signaling messages exchanged are integrated services digital network (ISDN) user part (ISUP) messages when there is a call attempt by the A party device 301 to the B party device 308 exemplarily illustrated in FIG. 3A, where the call attempt is unsuccessful, that is, cannot be placed, due to insufficient credit for communication in the A party's account. As exemplarily illustrated in FIGS. 16A-16E, a calling party, for example, the A party initiates a call setup to an originating mobile switching center (MSC), that is, the MSC serving the A party device 301, MSC-A 302. The MSC-A 302 sends a charging request to the service control point (SCP) 303 of an intelligent network (IN) 304, that is, the SCP/IN 303/304 to charge the A party for the call. The SCP/IN 303/304 returns a no credit response conveying insufficient credit in the A party's account with the carrier network.

Figure 16A:
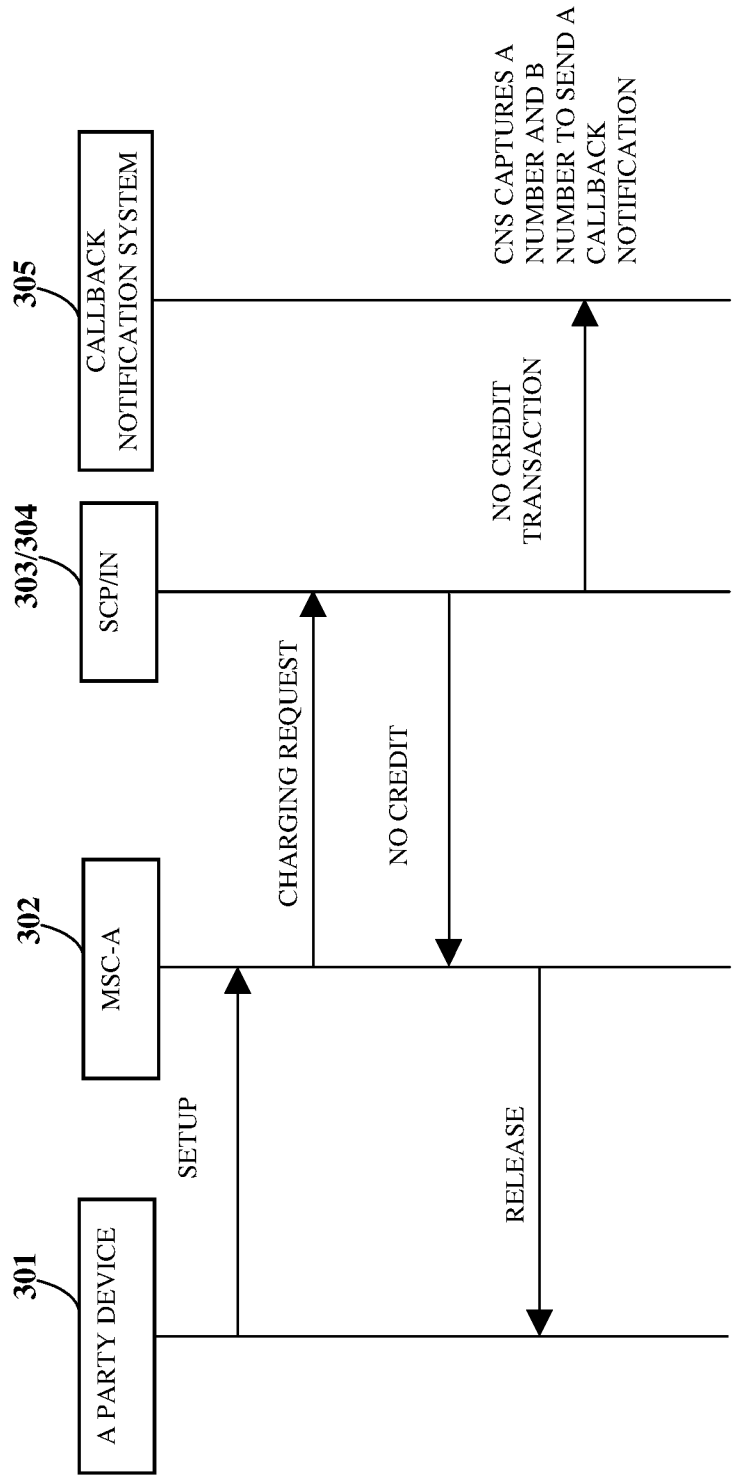
FIGS. 16A-16E exemplarily illustrate message flow diagrams showing an exchange of signaling messages between a calling party device, components of a carrier network, and the callback notification system for sending a callback notification from a source number of the calling party device to a destination number of a called party device.
Figure 16B:
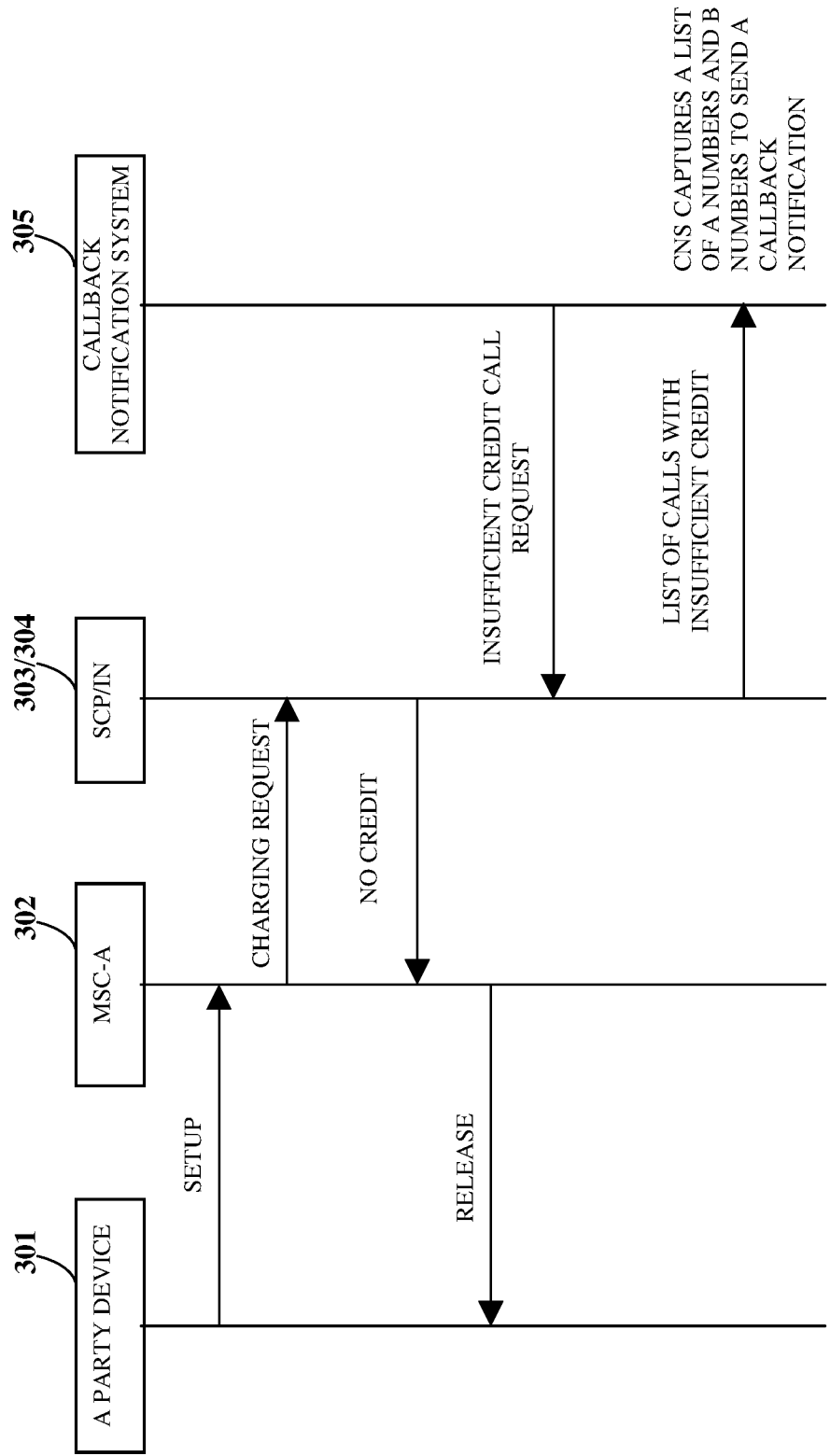

In an embodiment exemplarily illustrated in FIG. 16A, the mobile switching center (MSC) serving the A party device 301, MSC-A 302, releases the attempted call to the A party device 301. The callback notification system 305 receives communication information about the unsuccessful call attempt made by the A party device 301 to contact the B party device 308 with insufficient credit for communication from the service control point (SCP) 303 of an intelligent network (IN) 304, that is, the SCP/IN 303/304 through a no credit transaction. The callback notification system 305 captures a number of the A party device 301, that is, an A number, and a number of the B party device 308, that is, a B number from the no credit transaction for sending a callback notification from the A number to the B number. In an embodiment exemplarily illustrated in FIG. 16B, the callback notification system 305 regularly pulls information about unsuccessful call attempts in batches from the SCP/IN 303/304 as disclosed in the detailed description of FIG. 1.

After the MSC-A 302 releases the attempted call to the A party device 301, the callback notification system 305 obtains information about a batch of unsuccessful call attempts from the SCP/IN 303/304 through an insufficient credit call request. The SCP/IN 303/304 returns a list of calls with insufficient credit to the callback notification system 305 from which the callback notification system 305 captures a list of A numbers and B numbers for sending callback notifications. The callback notification system 305 also captures the A number of the A party device 301 and the B number of the B party device 308 from the list sent by the SCP/IN 303/304.

Figure 16C:
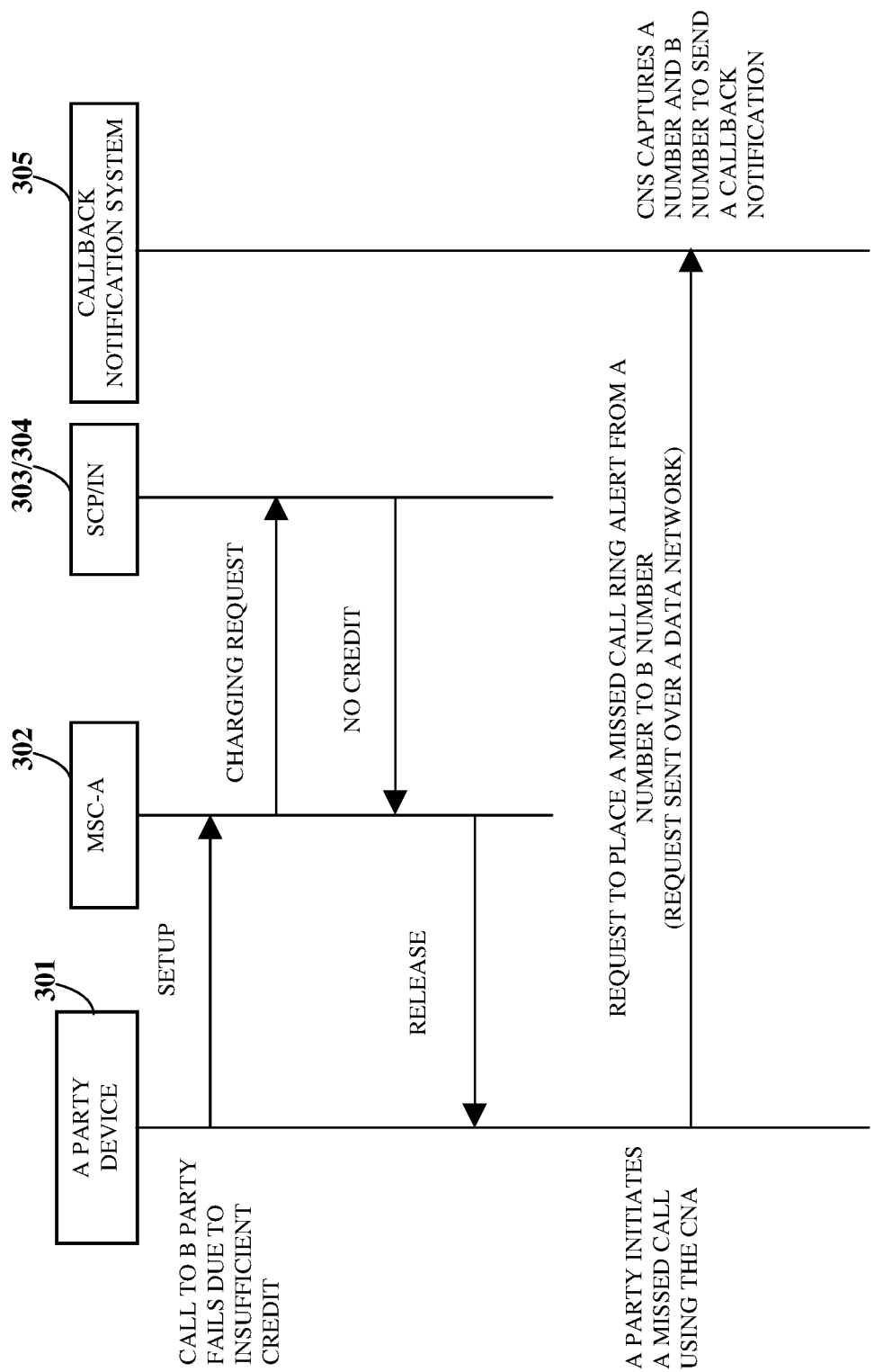
Figure 16D:
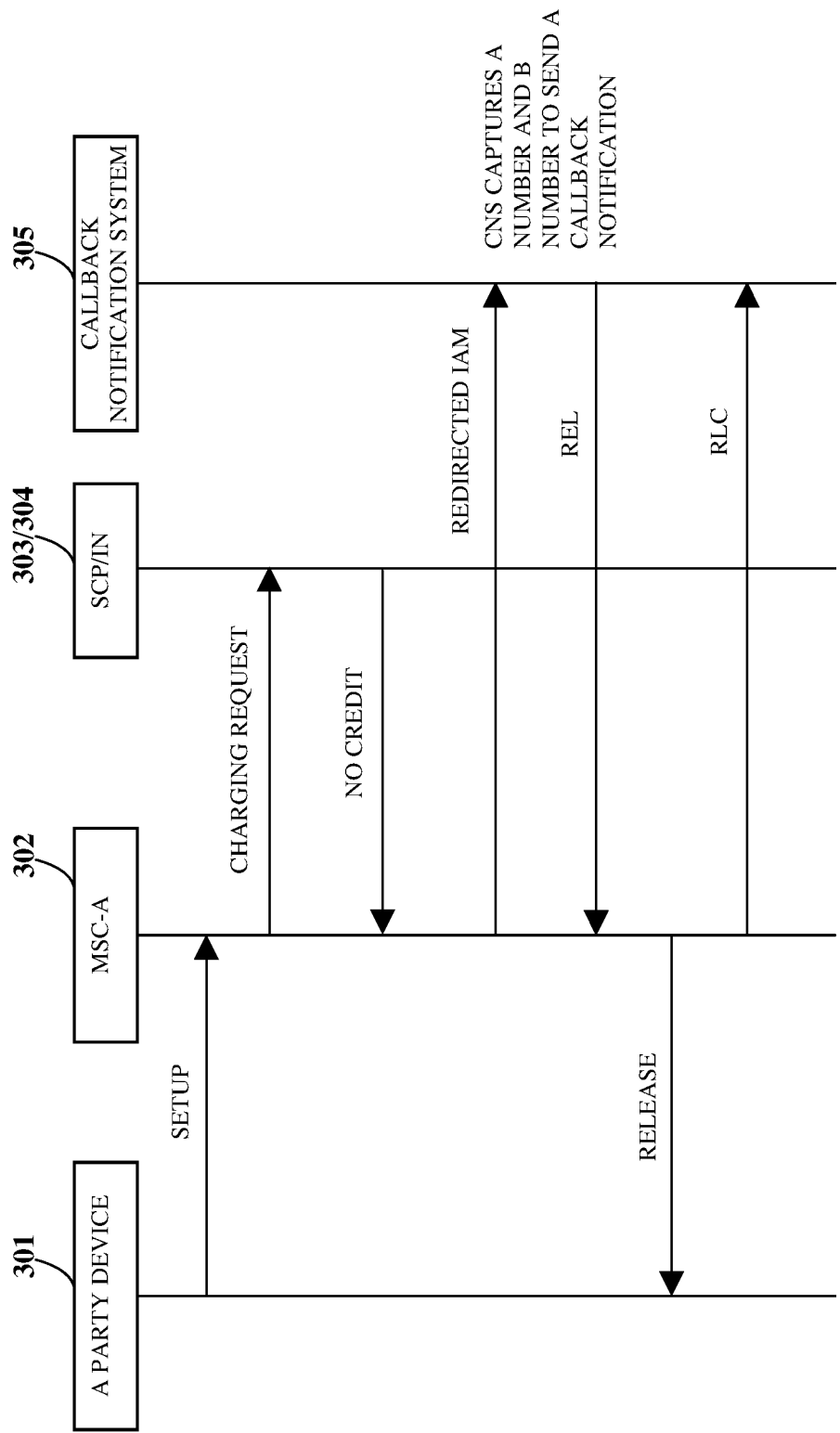
Figure 16E:
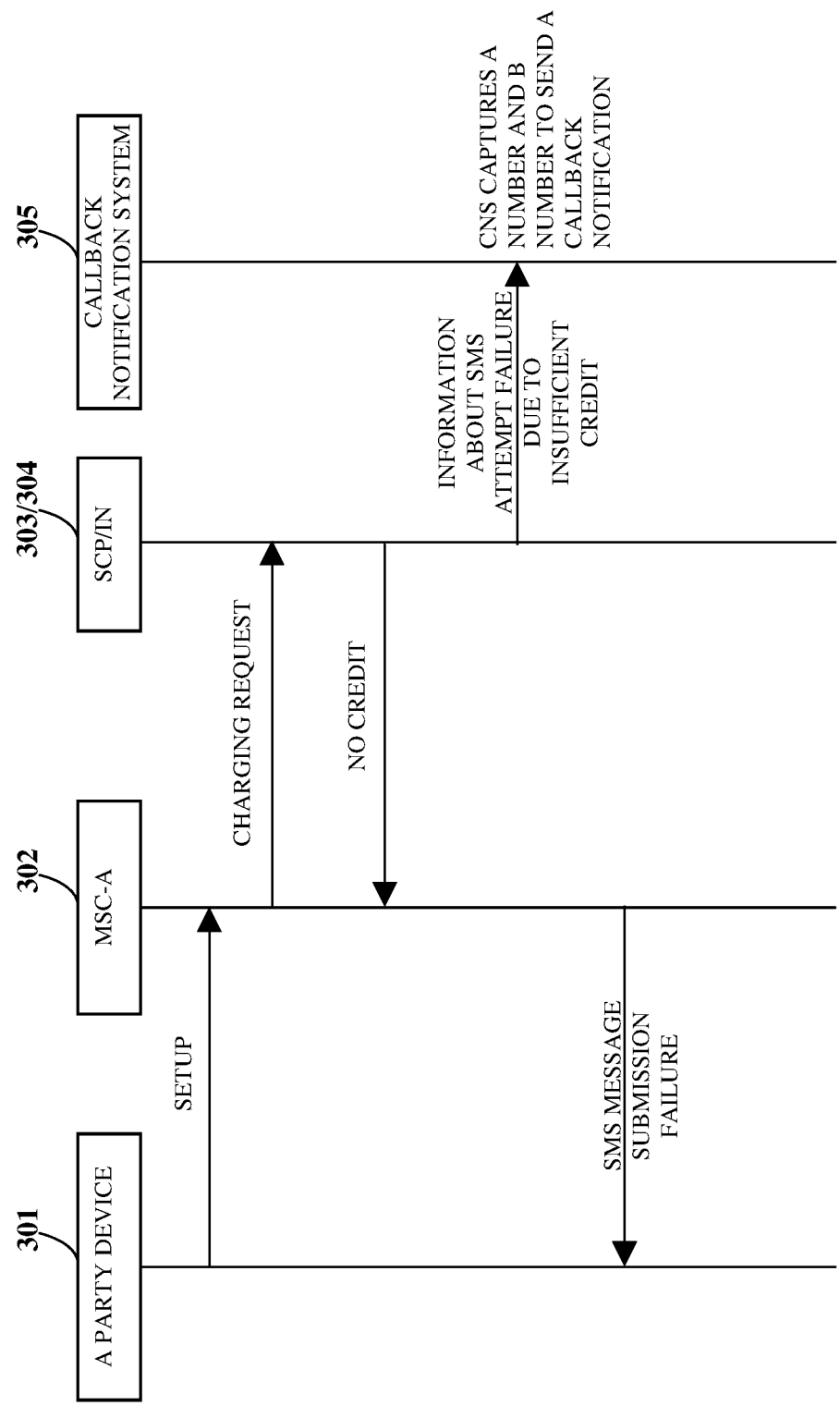

In an embodiment exemplarily illustrated in FIG. 16C, the callback notification system 305 receives a request to send a callback notification, for example, a missed call ring alert from the A number of the A party device 301 to the B number of the B party device 308 from the callback notification application implemented on the A party device 301. As exemplarily illustrated in FIG. 16C, the request to send the callback notification is sent over a data network 602 exemplarily illustrated in FIG. 6, to which the A party device 301 is connected. The callback notification system 305 captures the A number of the A party device 301 and the B number of the B party device 308 for sending the callback notification from the A party device 301 to the B party device 308. In an embodiment, the callback notification application on the A party device 301 identifies an unsuccessful call attempt made by the A party device 301 to contact the B party device 308 and offers options for sending a callback notification using the callback notification system 305 to the A party via a graphical user interface displayed on the A party device 301. In an embodiment exemplarily illustrated in FIG. 16D, the callback notification system 305 receives a redirected initial address message (IAM) from the mobile switching center (MSC) serving the A party device 301, MSC-A 302. The callback notification system 305 captures the A number of the A party device 301 and the B number of the B party device 308 from the received IAM and releases the call initiated by the A party device 301 to the MSC-A 302 by sending a release (REL) message to the MSC-A 302. On receiving the REL message from the callback notification system 305, the MSC-A 302 releases the call to the A party device 301 and sends a release complete (RLC) message to the callback notification system 305 so that other callback notifications can be attempted by the A party device 301. As exemplarily illustrated in FIG. 16E, the A party initiates a short message service (SMS) message setup to an originating mobile switching center (MSC), the MSC-A 302. The MSC-A 302 sends a charging request to the service control point (SCP) 303 of the intelligent network (IN) 304, that is, the SCP/IN 303/304 to charge the A party for the SMS message. The SCP/IN 303/304 returns a no credit response conveying insufficient credit in the A party's account registered with the carrier. The MSC-A 302 reports an SMS message submission failure to the A party device 301. The callback notification system 305 receives information about the unsuccessful SMS attempt or the SMS attempt failure of the A party device 301 due to insufficient credit for communication from the SCP/IN 303/304 through a no credit transaction. The callback notification system 305 captures the A number of the A party device 301 and the B number of the B party device 308 from the no credit transaction for sending a callback notification from the A number to the B number.

FIGS. 17A-17E exemplarily illustrate message flow diagrams showing an exchange of signaling messages between the callback notification system 305, components of a carrier network, and a called party device 308, herein referred to as a "B party device", for sending a callback notification from a source number of a calling party device 301, herein referred to as an "A party device", to a destination number of the B party device 308 exemplarily illustrated in FIG. 3A. In an embodiment exemplarily illustrated in FIG. 17A, the callback notification system 305 initiates a missed call to the B party device 308 as a callback notification on behalf of the A party device 301. The callback notification system 305 initiates the missed call by making a call attempt to the gateway mobile switching center (GMSC) 306 configured by the carrier through an initial address message (IAM). The GMSC 306 routes the IAM to a terminating mobile switching center (MSC), that is, the MSC serving the B party device 308, MSC-B 307. The MSC-B 307 forwards the attempted call to the B party device 308 and receives an alerting message when the called party, that is, the B party hears a ring. The MSC-B 307 sends an address complete message (ACM) to the GMSC 306 to indicate that the B party device 308 has received a ring for the attempted call. The GMSC 306 forwards the ACM to the callback notification system 305, which then releases the attempted call by sending a release (REL) message to the GMSC 306. The GMSC 306 forwards the REL message to the MSC-B 307, which then releases the attempted call ensuring that the call is not completed and resulting in a missed call from the A party device 301 on the B party device 308. The MSC-B 307 sends a release complete (RLC) message to the GMSC 306, which forwards the RLC to the callback notification system 305 so that any further missed calls can be placed by the callback notification system 305 to the B party device 308. In an embodiment, the address complete message (ACM) is not an indication of the B party device 308 ringing. In this embodiment, after the callback notification system 305 initiates the missed call by making the call attempt, the callback notification system 305 waits for additional integrated services digital network (ISDN) user part (ISUP) messages, for example, a call progress (CPG) message, that provide a definitive indication of the B party ringing, before releasing the attempted call.

Figure 17A:
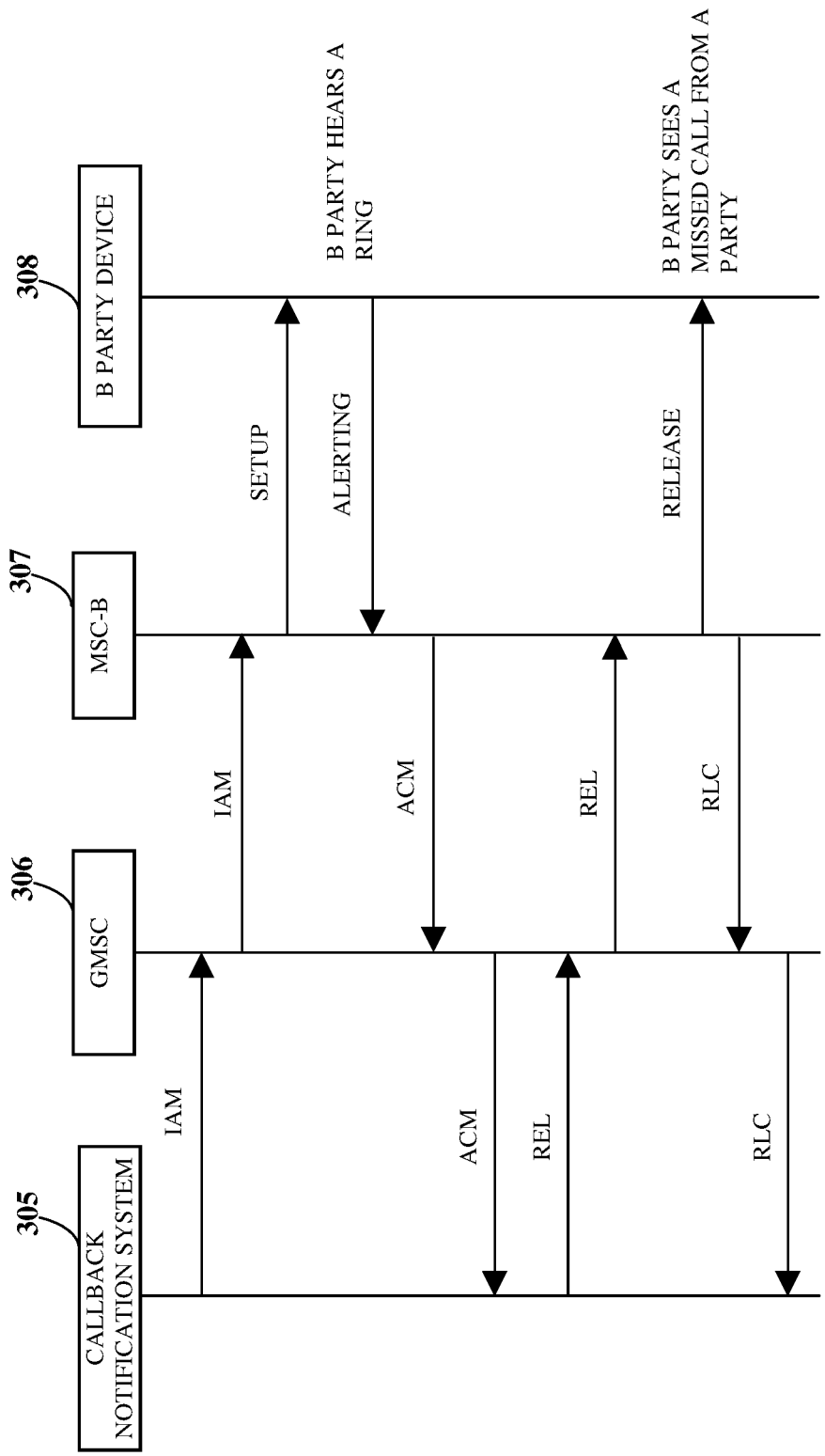
FIGS. 17A-17E exemplarily illustrate message flow diagrams showing an exchange of signaling messages between the callback notification system, components of a carrier network, and a called party device for sending a callback notification from a source number of a calling party device to a destination number of the called party device.
Figure 17B:
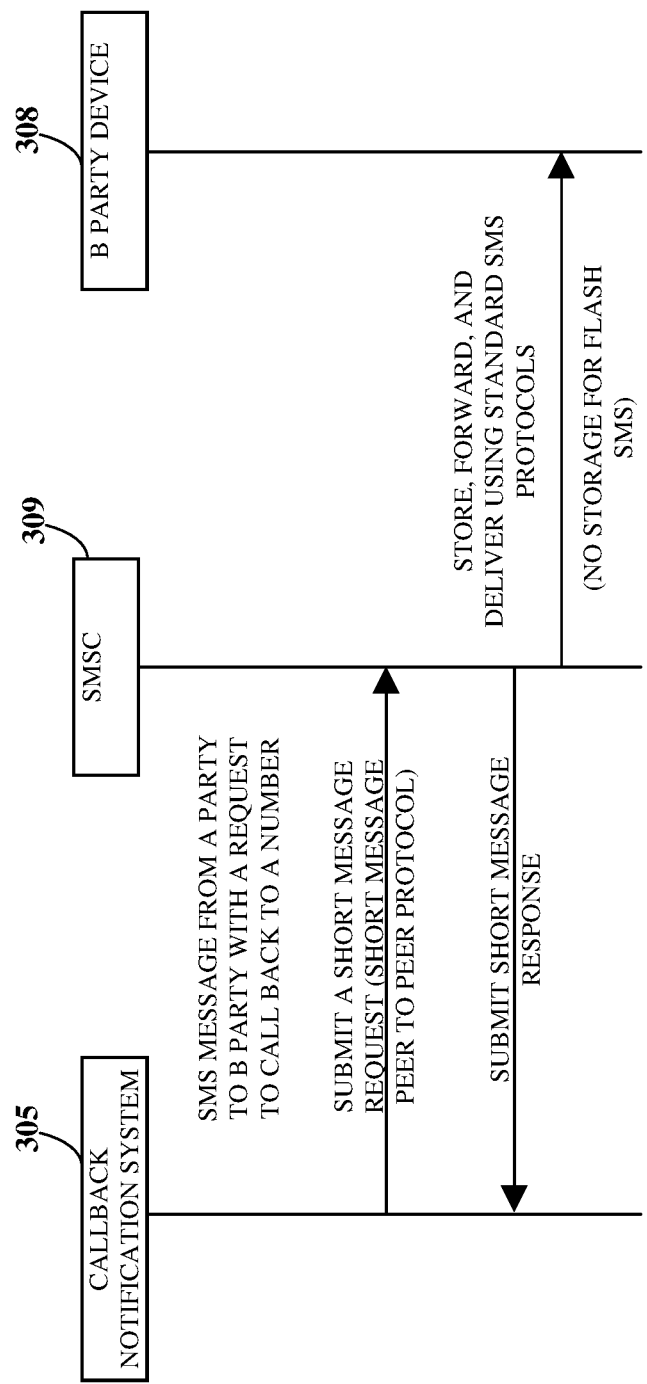

In an embodiment exemplarily illustrated in FIG. 17B, the callback notification system 305 initiates a short message service (SMS) message to the B party device 308 on behalf of the A party device 301 exemplarily illustrated in FIG. 3B. The callback notification system 305 sends an SMS message from the A party device 301 to the B party device 308 with a request to call back to the source number, that is, an A number of the A party device 301. The callback notification system 305 submits a short message (SM) request using a short message peer to peer (SMPP) protocol to the short message service center (SMSC) 309. The SMSC 309 stores, forward, and delivers the sent SMS message to the B party device 308 using standard SMS protocols via the carrier network. The SMSC 309 also submits an SM response to the SM request sent by the callback notification system 305. In an embodiment where a flash SMS message is sent as a callback notification by the callback notification system 305 to the B party device 308, the SMSC 309 does not store the flash SMS message but forwards and delivers the flash SMS to the B party device 308.

Figure 17C:
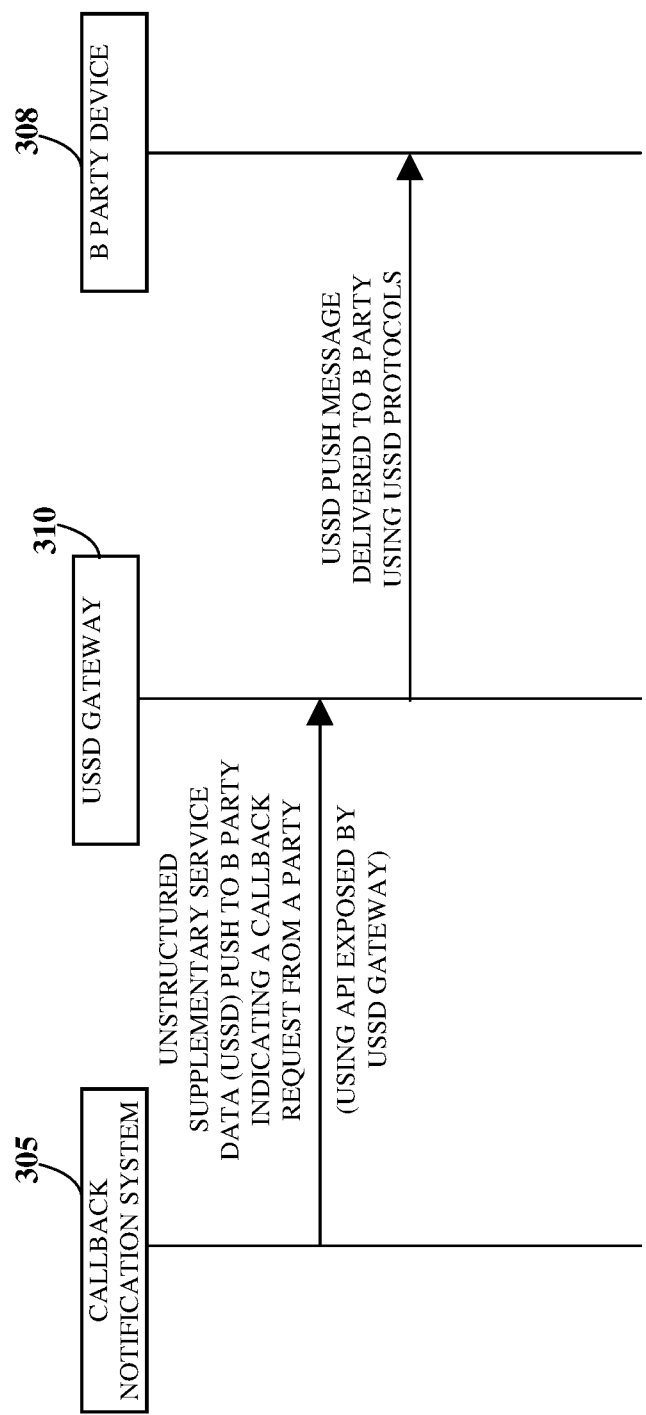
Figure 17D:
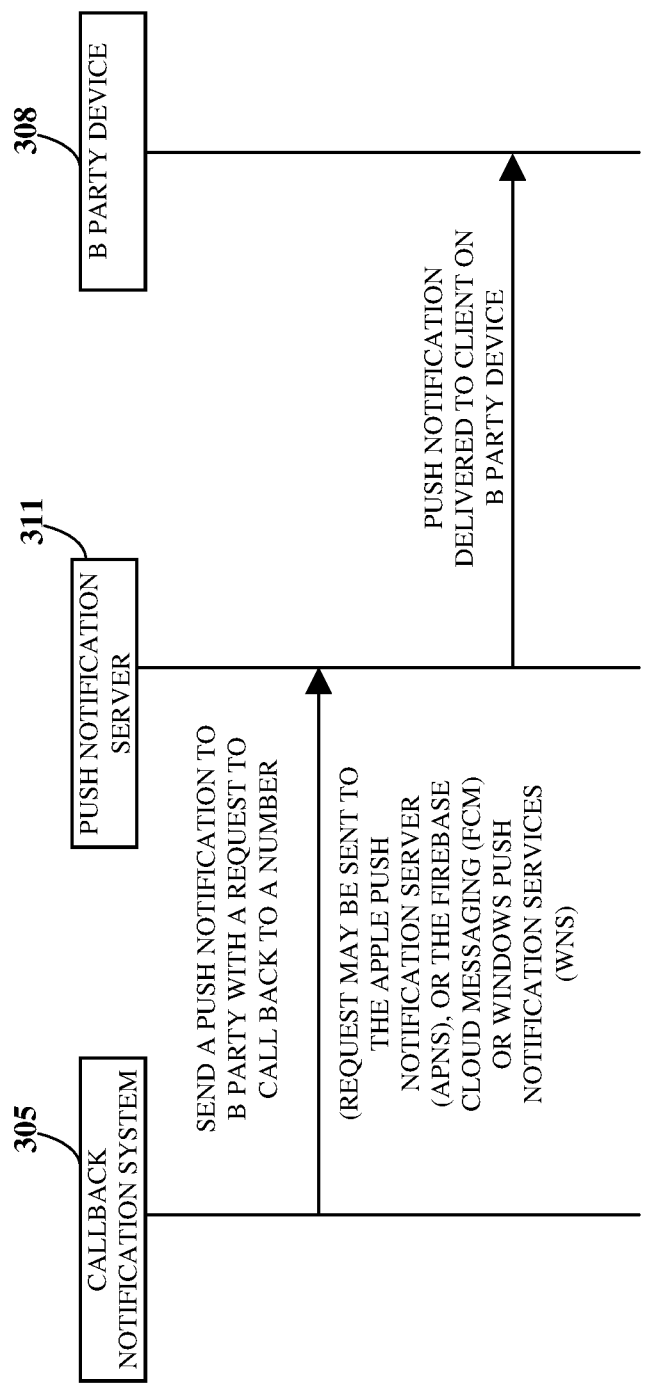
Figure 17E:
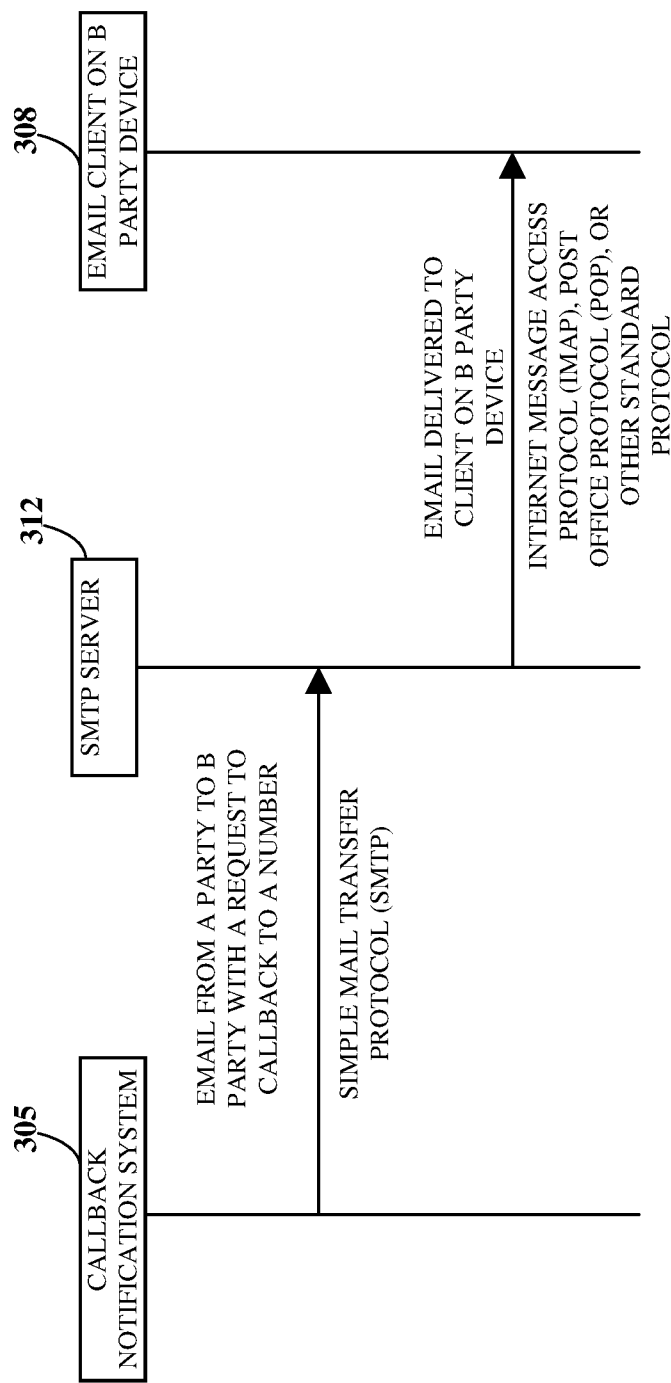

In another embodiment exemplarily illustrated in FIG. 17C, the callback notification system 305 initiates a callback network initiated unstructured supplementary service data (USSD) push notification as a callback notification to the B party device 308 indicating a callback request from the A party device 301. The callback notification system 305 sends the callback request to the USSD gateway 310 using an application programming interface (API) exposed by the USSD gateway 310. The USSD gateway 310 delivers the callback USSD push notification to the B party device 308 using USSD protocols. In another embodiment exemplarily illustrated in FIG. 17D, the callback notification system 305 sends a callback client push notification to the B party device 308 with a request to call back to the A number of the A party device 301. The callback notification system 305 sends the request to the push notification server 311, for example, the Apple Push notification server (APNS), the Firebase® cloud messaging (FCM) services, the Windows® push notification services (WNS), etc. The push notification server 311 delivers the callback client push notification to a client on the B party device 308. In another embodiment exemplarily illustrated in FIG. 17E, the callback notification system 305 initiates a callback electronic mail (email) from the A party device 301 to the B party device 308 with a request to callback to an A number of the A party device 301 using a simple mail transfer protocol (SMTP). The SMTP server 312 delivers the email to a client on the B party device 308, for example, using an internet message access protocol (IMAP), a post office protocol (POP), or other standard protocols.

Figure 18:
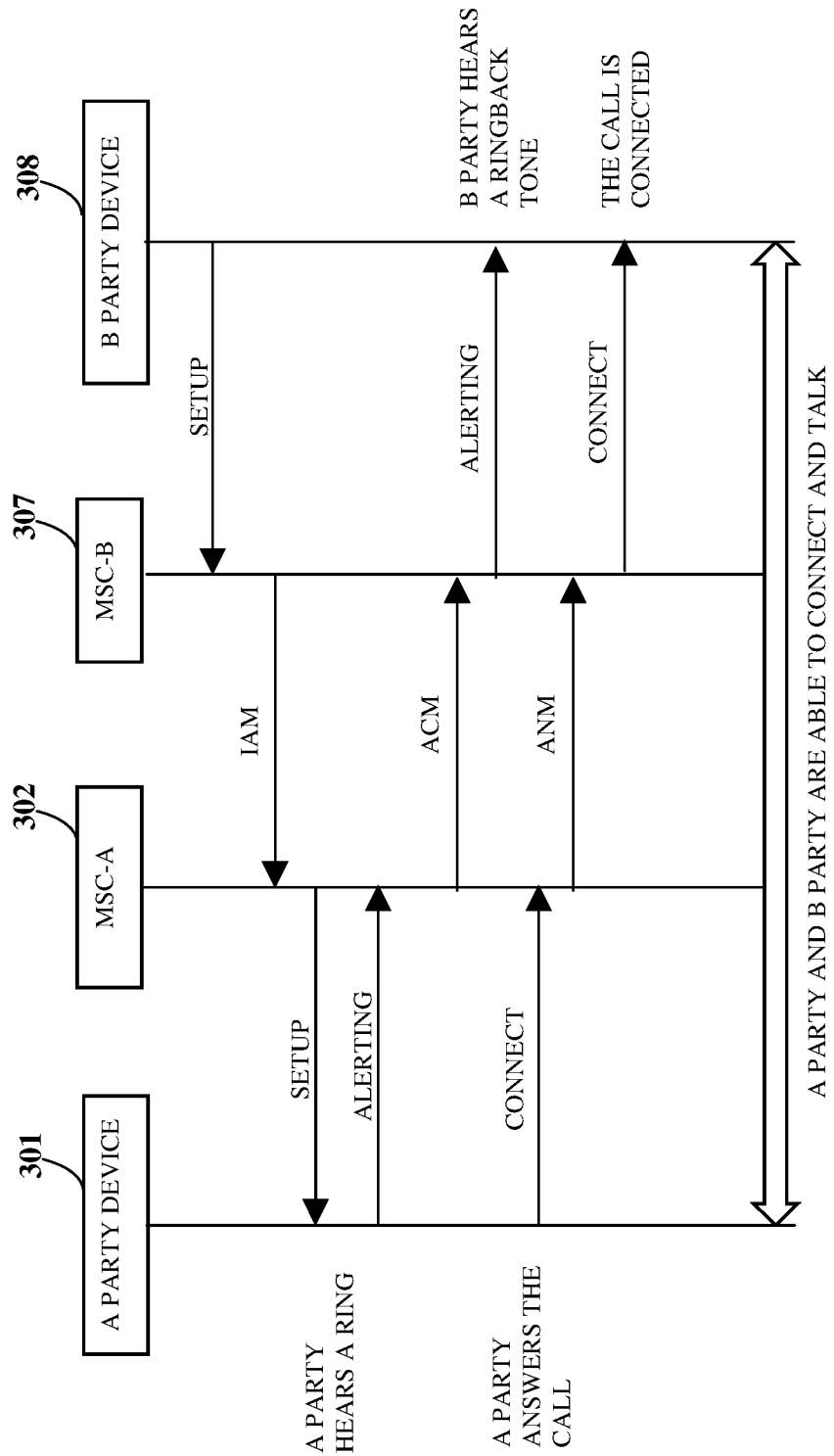
FIG. 18 exemplarily illustrates a message flow diagram showing an exchange of signaling messages between a calling party device, components of a carrier network, and a called party device for responding to a callback notification and facilitating a communication between the calling party device and the called party device.

FIG. 18 exemplarily illustrates a message flow diagram showing an exchange of signaling messages between a calling party device 301, herein referred to as an "A party device", components of a carrier network, and a called party device 308, herein referred to as a "B party device", for responding to a callback notification and facilitating a communication between the A party device 301 and the B party device 308. A called party, that is, the B party calls back a calling party, that is, the A party after receiving a missed call through the callback notification system 305 exemplarily illustrated in FIG. 3A. The B party device 308 initiates a return call to the A party device 301 by sending a setup message to a terminating mobile switching center (MSC), that is, the MSC serving the B party device 308, MSC-B 307. The MSC-B 307 sends an initial address message (IAM) to an originating mobile switching center (MSC), that is, the MSC serving the A party device 301, MSC-A 302. The MSC-A 302 sends a setup message to the A party device 301. When the A party hears a ring, the MSC-A 302 receives an alerting message from the A party device 301 and sends an address complete message (ACM) to the MSC-B 307 indicating that the call has connected successfully. The MSC-B 307 sends an alerting message to the B party device 308 so that the B party can hear a ringback tone indicating that the A party device 301 is ringing. When the A party answers the call in response to the ringing, the MSC-A 302 receives a connect message from the A party device 301 and sends an answer message (ANM) to the MSC-B 307. The MSC-B 307 sends a connect message to the B party device 308 and connects the call between the B party device 308 and the A party device 301 so that the B party and the A party can connect and talk to each other. The signaling messages exemplarily illustrated in FIGS. 16A-16E, FIGS. 17A-17E, and FIG. 18 are integrated services digital network (ISDN) user part (ISUP) messages used in ISUP signaling. ISUP signaling is an example of a protocol used for the signaling. Signaling can also be accomplished using a session initiation protocol (SIP).

Figure 19A:
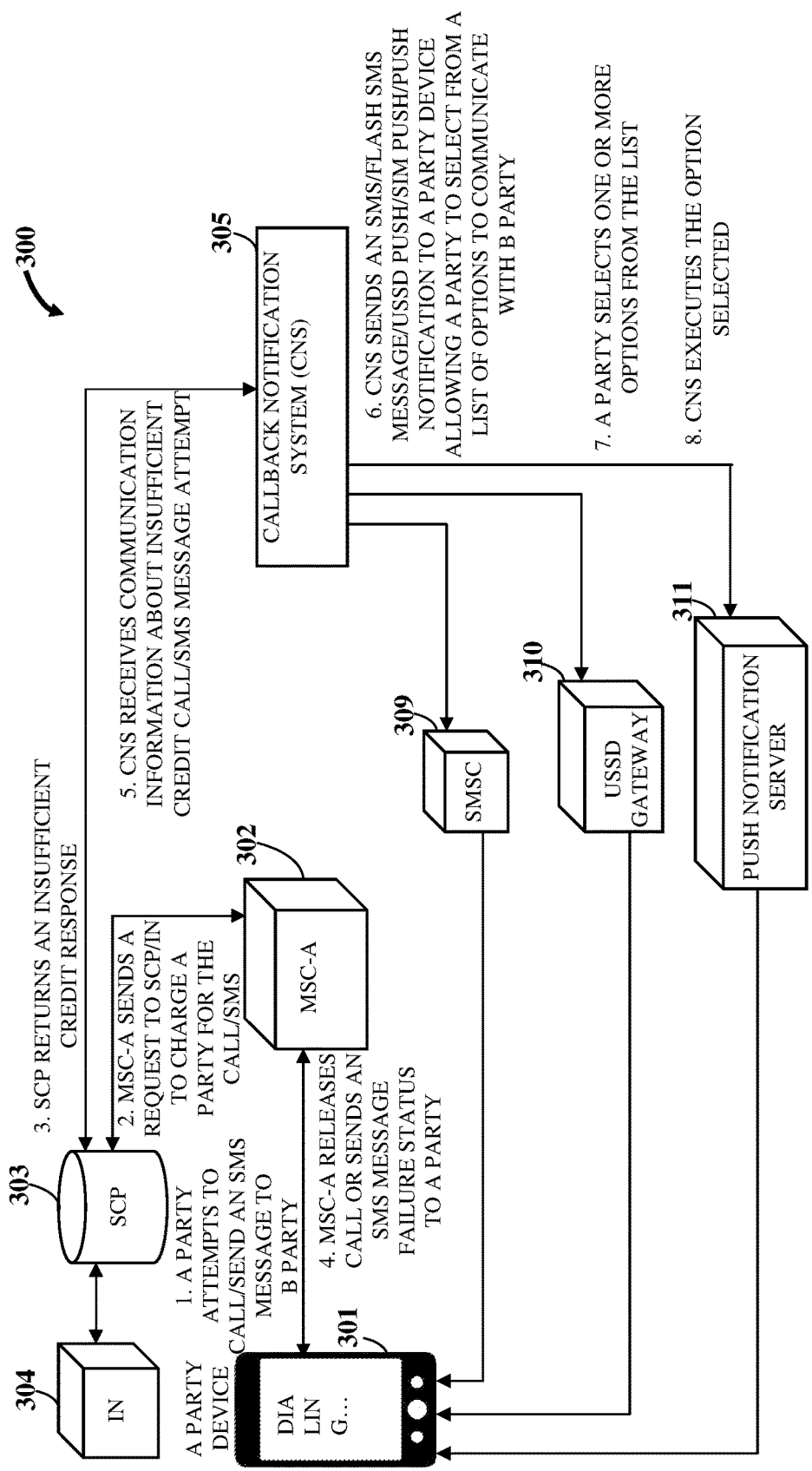
FIGS. 19A-19B exemplarily illustrate embodiments of the system comprising the callback notification system for providing multiple options to a calling party device for communicating with a called party device, when an unsuccessful communication attempt is made by the calling party device to contact the called party device.
Figure 19B:
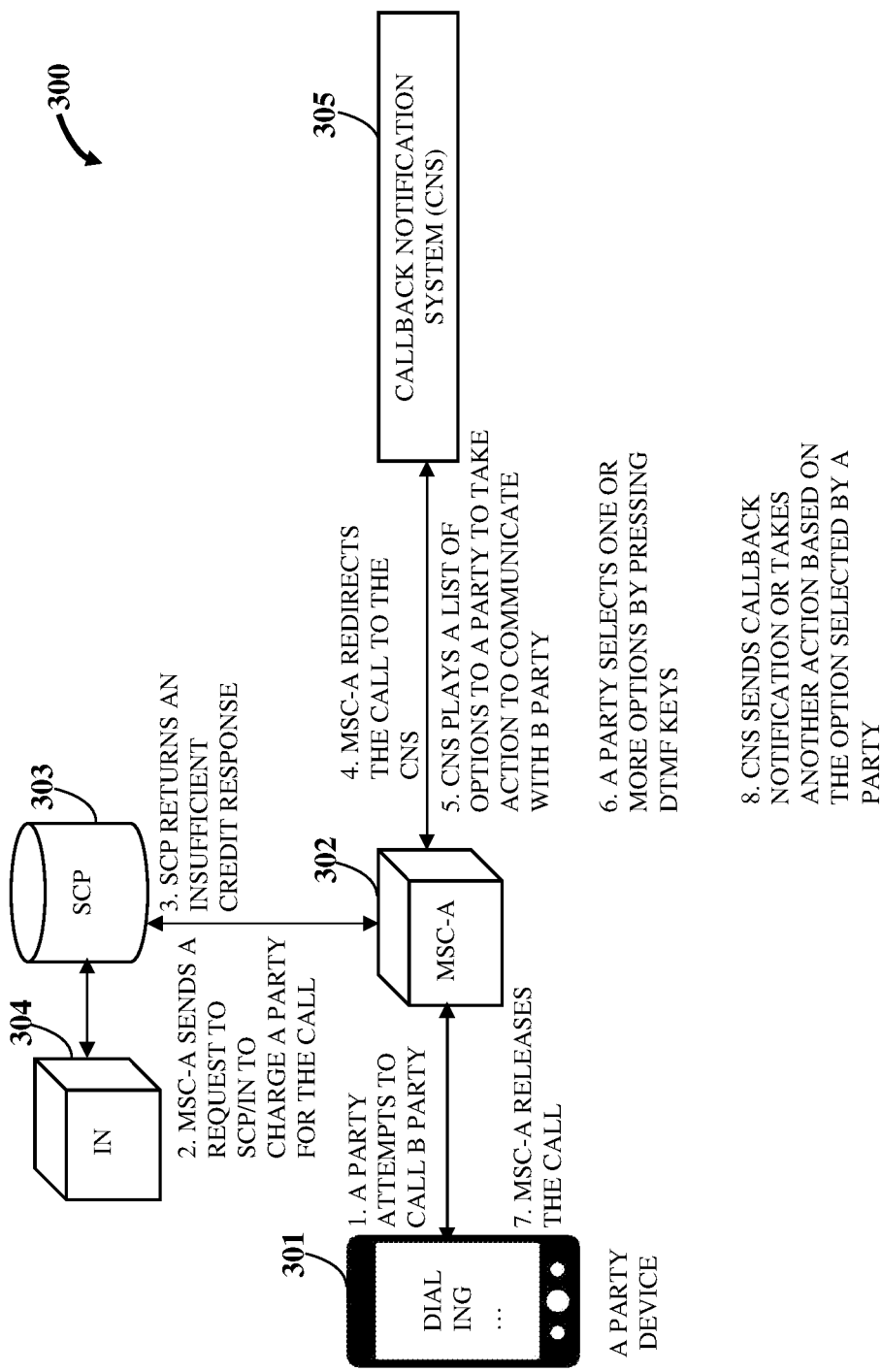

FIGS. 19A-19B exemplarily illustrate embodiments of the system 300 comprising the callback notification system 305 for providing multiple options to a calling party device 301, herein referred to as an "A party device", for communicating with a called party device 308, herein referred to as a "B party device", when an unsuccessful communication attempt is made by the A party device 301 to contact the B party device 308. A calling party, herein referred to as "A party", using the A party device 301, attempts to call or send a short message service (SMS) message to a called party, herein referred to as "B party", via the mobile switching center (MSC) associated with the A party device 301, that is, MSC-A 302. The MSC-A 302 sends a request to the service control point (SCP) 303 of the intelligent network (IN) 304, that is, the SCP/IN 303/304 to charge the A party for the call or the SMS message. The SCP 303 returns an insufficient credit response to the MSC-A 302. The MSC-A 302 releases the call or sends an SMS message submission failure status to the A party device 301. The callback notification system 305 receives communication information about the insufficient credit for the call attempt or the SMS message attempt from the SCP 303. The callback notification system 305 sends an SMS message or a flash SMS message via the short message service center (SMSC) 309, or an unstructured supplementary service data (USSD) push notification via the USSD gateway 310, or a subscriber identity module (SIM) push notification via the SMSC 309, or a callback client push notification via the push notification server 311 to the A party device 301, offering the A party multiple options for communicating with the B party device 308 as disclosed in the detailed description of FIG. 1. The options comprise, for example, receiving an advance credit in the A party's account, receiving an advance credit in the A party's account for communicating with the B party in exchange for engaging with an advertisement, placing a collect call to the A party device 301 that is paid by the B party device 308, sending a callback message to the B party device 308 with a request to callback, etc. From the options rendered on a graphical user interface (GUI) of the A party device 301, the A party selects one or more options and the callback notification system 305 executes the selected options.

As exemplarily illustrated in FIG. 19B, the A party attempts to call the B party via the MSC-A 302 and the MSC-A 302 sends a request to the service control point (SCP) 303 of the intelligent network (IN) 304, that is, the SCP/IN 303/304 to charge the A party for the call as disclosed in the detailed description of FIG. 19A. The SCP 303 returns an insufficient credit response to the MSC-A 302 and the MSC-A 302 redirects the call to the callback notification system 305. The callback notification system 305 plays a list of options as disclosed in the detailed description of FIG. 19A, to the A party to select from to communicate with the B party. The A party selects one or more options, for example, by pressing dual tone multi frequency (DTMF) keys. The MSC-A 302 releases the call and the callback notification system 305 sends a callback notification or takes another action based on the option selected by the A party.

Figure 20:
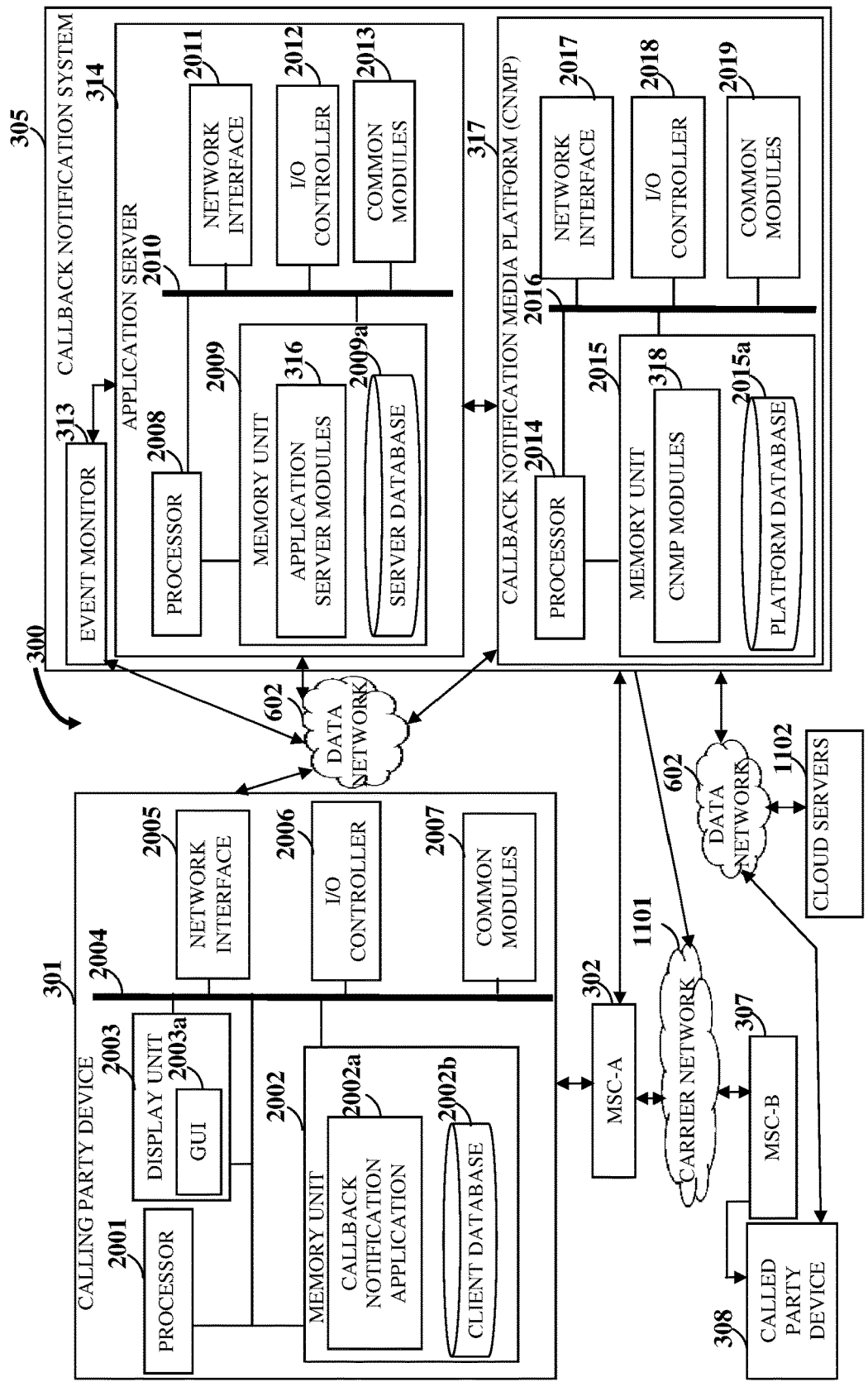
FIG. 20 exemplarily illustrates an architectural diagram of the system for sending one or more callback notifications from a source number of a calling party device to a destination number of a called party device.

FIG. 20 exemplarily illustrates an architectural diagram of the system 300 for sending one or more callback notifications from a source number of a calling party device 301 to a destination number of a called party device 308. The system 300 disclosed herein comprises the callback notification application (CNA) 2002a installed on the calling party device 301 in communication with the callback notification system 305 via a carrier network 1101 and a data network 602. The calling party device 301 communicates with the called party device 308 via the carrier network 1101 and the cloud servers 1102 using the data network 602. The calling party device 301 and the called party device 308 are user devices as disclosed in the detailed description of FIG. 1. In an embodiment, the calling party device 301 and the called party device 308 are hybrid computing devices that combine the functionality of multiple devices. Examples of hybrid computing devices comprise a cellular telephone that includes media player functionality, a gaming device that includes a wireless communications capability, a cellular telephone that includes game and multimedia functions, and a portable device that receives electronic mail (email), supports mobile telephone calls, has media player functionality, and supports web browsing. The callback notification system 305 is accessible to users, for example, through a broad spectrum of technologies and devices such as personal computers with access to the internet, internet enabled cellular phones, tablet computing devices, etc. The callback notification system 305 comprises the event monitor 313, the application server 314, and the callback notification media platform 317 as disclosed in the detailed descriptions of FIGS. 11-15.

The calling party device 301, the application server 314, and the callback notification media platform 317 are computer systems that are programmable using high level computer programming languages. In an embodiment, the callback notification application 2002a is implemented on the calling party device 301 using programmed and purposeful hardware. The calling party device 301 that deploys the callback notification application 2002a can run a single operating system or different operating systems, for example, Android®, iOS and Windows® platforms. The calling party device 301 is manufactured by a single vendor or different vendors. In an embodiment, the callback notification application 2002a is a mobile application that can be used by smart phone users for initiating missed call ring alerts from their smart phones. The users can place a missed call ring alert directly from the callback notification application 2002a, for example, in a one tap action, without the need to use a native dialer application or a native contacts application and waiting to disconnect the call after initiating the call. The callback notification application 2002a uses the data network 602 to initiate the request to send the missed call ring alert. The calling party device 301 needs to be connected to either the data network 602 or another network, for example, a Wi-Fi® hotspot that implements Wi-Fi® of Wi-Fi Alliance Corporation to place the missed call ring alert from the callback notification application 2002a. Smartphone users can use the callback notification application 2002a with any valid mobile number to initiate a missed call ring alert to anyone directly from, for example, an in-app contact list, an in-app contact search screen, a native contact book, etc., or by directly typing the destination number of the called party device 308 using an in-app dialer. In an embodiment, users will need to validate their phone number with a one-time password (OTP) once and then can use the callback notification application 2002a on multiple user devices with a password setup for their account. Status for all the missed call ring alerts initiated is shown in real time on a recent screen in the callback notification application 2002a with a reason, for example, successful rings, failed rings, and cases when the called party is not reachable. The callback notification application 2002a is implemented, for example, on the Android® platform of Google Inc., the iOS platform of Apple Inc., the Windows® platform of Microsoft Corporation, and other platforms.

The application server modules 316 are implemented on the application server 314 using programmed and purposeful hardware. Similarly, the callback notification media platform modules 318 are implemented on the callback notification media platform 317 using programmed and purposeful hardware. As exemplarily illustrated in FIG. 20, the calling party device 301, the application server 314, and the callback notification media platform 317 comprise non-transitory computer readable storage media, for example, memory units 2002, 2009, and 2015 respectively, for storing program instructions, applications, and data. As used herein, "non-transitory computer readable storage media" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wires, fiber optic cables, modems, etc., including wires that constitute a system bus coupled to a processor, for example, 2001, or 2008, or 2014.

The callback notification application 2002*a* and a client database 2002*b* of the calling party device 301 are installed and stored in the memory unit 2002 of the calling party device 301. The application server modules 316 and a server database 2009*a* are installed and stored in the memory unit 2009 of the application server 314. The callback notification media platform modules 318 and a platform database 2015*a* are installed and stored in the memory unit 2015 of the callback notification media platform 317. The memory unit 2002 of the calling party device 301 stores computer program instructions defined by the callback notification application 2002*a* of the calling party device 301. The memory unit 2009 of the application server 314 stores computer program instructions defined by the application server modules 316 of the application server 314. The memory unit 2015 of the callback notification media platform 317 stores computer program instructions defined by the callback notification media platform modules 318. The memory units 2002, 2009, and 2015 of the calling party device 301, the application server 314, and the callback notification media platform 317 respectively are, for example, random access memories (RAMs) or other types of dynamic storage devices that store information and instructions for execution by the processors 2001, 2008, and 2014 of the calling party device 301, the application server 314, and the callback notification media platform 317 respectively. The memory units 2002, 2009, and 2015 also store temporary variables and other intermediate information used during execution of the instructions by the processors 2001, 2008, and 2014 respectively. The calling party device 301, the application server 314, and the callback notification media platform 317, each further comprises a read only memory (ROM) or another type of static storage device that stores static information and instructions for the processors 2001, 2008, and 2014 respectively.

The processors 2001, 2008, and 2014 are communicatively coupled to the memory units 2002, 2009, and 2015 of the calling party device 301, the application server 314, and the callback notification media platform 317 respectively. The processor 2001 of the calling party device 301 executes computer program instructions defined by the callback notification application 2002*a* of the calling party device 301. The processor 2008 of the application server 314 executes computer program instructions defined by the application server modules 316 of the application server 314. The processor 2014 of callback notification media platform 317 executes computer program instructions defined by the callback notification media platform modules 318 of the callback notification media platform 317. The processors 2001, 2008, and 2014 of the calling party device 301, the application server 314, and the callback notification media platform 317 respectively, refer to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, each of the processors 2001, 2008, and 2014 is implemented as a processor set comprising, for example, a programmed microprocessor and a math or graphics co-processor. The processor 2001, 2008, and 2014 are selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The system 300 disclosed herein is not limited to employing the processors 2001, 2008, and 2014. In an embodiment, the system 300 employs controllers or microcontrollers.

As exemplarily illustrated in FIG. 20, the calling party device 301, the application server 314, and the callback notification media platform 317 further comprise data buses 2004, 2010, and 2016, network interfaces 2005, 2011 and 2017, input/output (I/O) controllers 2006, 2012, and 2018, and common modules 2007, 2013, and 2019 respectively, where the common modules 2007, 2013, and 2019 comprise input devices, output devices, fixed media drives such as hard drives, removable media drives for receiving removable media, etc. The data bus 2004 of the calling party device 301 permits communication between the modules, for example, 2001, 2002, 2003, 2005, 2006, 2007, etc., of the calling party device 301. The data bus 2010 of the application server 314 permits communication between the modules, for example, 2008, 2009, 2011, 2012, 2013, etc., of the application server 314. The data bus 2016 of the callback notification media platform 317 permits communication between the modules, for example, 2014, 2015, 2017, 2018, 2019, etc., of the callback notification media platform 317. The network interfaces 2005, 2011, and 2017 enable connection of the calling party device 301, the application server 314, and the callback notification media platform 317 respectively, to the data network 602 and the carrier network 1101. In an embodiment, the network interfaces 2005, 2011, and 2017 of the calling party device 301, the application server 314, and the callback notification media platform 317 respectively, are provided as interface cards also referred to as line cards. The network interfaces 2005, 2011, and 2017 are, for example, one or more of infrared (IR) interfaces, interfaces implementing Wi-Fi® of Wi-Fi Alliance Corporation, universal serial bus (USB) interfaces, FireWire® interfaces of Apple Inc., Ethernet interfaces, frame relay interfaces, cable interfaces, digital subscriber line (DSL) interfaces, token ring interfaces, peripheral controller interconnect (PCI) interfaces, local area network (LAN) interfaces, wide area network (WAN) interfaces, interfaces using serial protocols, interfaces using parallel protocols, Ethernet communication interfaces, asynchronous transfer mode (ATM) interfaces, high speed serial interfaces (HSSIs), fiber distributed data interfaces (FDDIs), interfaces based on transmission control protocol (TCP)/internet protocol (IP), interfaces based on wireless communications technology such as satellite technology, radio frequency (RF) technology, near field communication, etc. The I/O controllers 2006, 2012, and 2018 of the calling party device 301, the application server 314, and the callback notification media platform 317 control input actions and output actions performed by the calling party device 301, the application server 314, and the callback notification media platform 317 respectively.

In an embodiment, the calling party device 301 further comprises a display unit 2003 that displays the graphical user interface (GUI) 2003a rendered by the callback notification application 2002a. The display unit 2003 is, for example, a video display, a liquid crystal display, a plasma display, an organic light emitting diode (OLED) based display, etc. The display unit 2003, via the GUI 2003a, displays information, displays interfaces, user interface elements such as swipeable arrows, icons, search boxes, etc., for example, for selecting the destination number on the calling party device 301 to place the missed call or send a short message service (SMS) message, for selecting one of the options to contact the called party device 308 on detection of an unsuccessful communication attempt made by the calling party device 301 to contact the called party device 308, etc. The callback notification application 2002a renders the GUI 2003a on the display unit 2003 to receive user inputs, for example, a selection of the source number and the destination number, a selection of one of the options to contact the called party device 308, etc. The GUI 2003a is, for example, an online web interface, a web based downloadable application interface, a mobile based downloadable application interface, etc.

The client database 2002b in the calling party device 301, the server database 2009a in the application server 314, and the platform database 2015a in the callback notification media platform 317 can be any storage area or medium that can be used for storing the source number, the destination number, and the profile data of the calling party and the called party. In an embodiment, the client database 2002b, the server database 2009a, and the platform database 2015a are external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the client database 2002b, the server database 2009a, and the platform database 2015a can also be locations on respective file systems of the calling party device 301, the application server 314, and the callback notification media platform 317 respectively. In another embodiment, the client database 2002b, the server database 2009a, and the platform database 2015a can be remotely accessed by the calling party device 301, the application server 314, and the callback notification media platform 317 respectively, via the data network 602. In another embodiment, the client database 2002b, the server database 2009a, and the platform database 2015a are configured as cloud based databases implemented in a cloud computing environment, where computing resources are delivered as a service over the data network 602.

Computer applications and programs are used for operating the callback notification application 2002a on the calling party device 301, the application server modules 316 on the application server 314, and the callback notification media platform modules 318 on the callback notification media platform 317. The programs are loaded onto the fixed media drives and into the memory units 2002, 2009, and 2015 of the calling party device 301, the application server 314, and the callback notification media platform 317 respectively, via the respective removable media drives. In an embodiment, the computer applications and programs are loaded directly into the memory units 2002, 2009, and 2015 of the calling party device 301, the application server 314, and the callback notification media platform 317 respectively, via the data network 602.

Each of the processors 2001, 2008, and 2014 of the calling party device 301, the application server 314, and the callback notification media platform 317 respectively, executes an operating system, for example, one of the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The calling party device 301, the application server 314, and the callback notification media platform 317 employ their respective operating systems for performing multiple tasks. The operating systems of the calling party device 301, the application server 314, and the callback notification media platform 317 are responsible for management and coordination of activities and sharing of their respective resources. The operating systems further manage security, peripheral devices, and network connections. The operating systems recognize, for example, inputs provided by a user, files, and directories stored locally on the respective fixed media drives. The operating systems of the calling party device 301, the application server 314, and the callback notification media platform 317 execute different programs using the processors 2001, 2008, and 2014 respectively. The processors 2001, 2008, and 2014 and the operating systems of the calling party device 301, the application server 314, and the callback notification media platform 317 respectively, together define a computer platform for which application programs in high level programming languages are written.

The processor 2001 of the calling party device 301 executes the callback notification application 2002a stored in the memory unit 2002 of the calling party device 301. The processor 2008 of the application server 314 retrieves instructions defined by the application server modules 316, for example, the callback notification attempt request processing module 316a, the callback notification attempt analysis and determination module 316b, the callback notification execution module 316c, the call detail recorder and analyzer 316d, the status reporting module 316e, the push notification module 316f, the short message service (SMS) module 316g, the subscriber identity module (SIM) push module 316h, the wireless internet browser (WIB) push module 316i, the unstructured supplementary service data (USSD) module 316j, and the electronic mail (email) push module 316k, the missed call attempt request processing module 316l, the missed call attempt analysis and determination module 316m, and the missed call placement module 316n exemplarily illustrated in FIG. 12 and FIG. 14, in the memory unit 2009 of the application server 314, for performing respective functions as disclosed in the detailed descriptions of FIG. 12 and FIG. 14.

The processor 2014 of the callback notification media platform 317 retrieves instructions defined by the callback notification media platform modules 318, for example, the callback notification request processing module 318a, the callback notification transmission module 318b, the callback notification progress monitoring module 318c, the callback notification detection module 318d, the contact completion module 318e, the missed call placement request processing module 318f, the call initiation module 318g, the call ringing detection module 318h, the call progress monitoring module 318i, the alternative callback notification module 318j, the call status reporting module 318k, and the call termination module 318l exemplarily illustrated in FIG. 13 and FIG. 15, in the memory unit 2015 of the callback notification media platform 317, for performing respective functions disclosed in the detailed descriptions of FIG. 13 and FIG. 15.

A program counter determines the location of the instructions in each of the memory units 2002, 2009, and 2015. The program counter stores a number that identifies the current position in the program of the callback notification application 2002a, and each of the modules, for example, 316a, 316b, 316c, 316d, 316e, 316f, 316g, 316h, 316i, 316j, 316k, 316l, 316m, 316n, etc., of the application server 314, and each of the modules, for example, 318a, 318b, 318c, 318d, 318e, 318f, 318g, 318h, 318j, 318k, 318l, etc., of the callback notification media platform 317 respectively. The instructions fetched by the processors 2001, 2008, and 2014 from the memory units 2002, 2009, and 2015 respectively, after being processed are decoded. The instructions are stored in an instruction register in each of the processors 2001, 2008, and 2014. After processing and decoding, the processors 2001, 2008, and 2014 execute the instructions, thereby performing one or more processes defined by those instructions.

At the time of execution, the instructions stored in the instruction register are examined to determine the operations to be performed. The processors 2001, 2008, and 2014 of the calling party device 301, the application server 314, and the callback notification media platform 317 respectively, then perform the specified operations. The operations comprise arithmetic operations and logic operations. The respective operating systems perform multiple routines for performing a number of tasks required to assign the memory units 2002, 2009, and 2015 for execution of the callback notification application 2002a, the modules, for example, 316a, 316b, 316c, 316d, 316e, 316f, 316g, 316h, 316i, 316j, 316k, 316l, 316m, 316n, etc., on the application server 314, and the modules, for example, 318a, 318b, 318c, 318d, 318e, 318f, 318g, 318h, 318i, 318j, 318k, 318l, etc., on the callback notification media platform 317 respectively. The tasks performed by the respective operating systems comprise, for example, assigning memory to the callback notification application 2002a, the modules, for example, 316a, 316b, 316c, 316d, 316e, 316f, 316g, 316h, 316i, 316j, 316k, 316l, 316m, 316n, etc., on the application server 314, and the modules, for example, 318a, 318b, 318c, 318d, 318e, 318f, 318g, 318h, 318i, 318j, 318k, 318l, etc., on the callback notification media platform 317 respectively, and to data used by the calling party device 301, the application server 314, and the callback notification media platform 317 respectively, moving data between the memory units 2002, 2009, and 2015 and disk units, and handling input/output operations. The respective operating systems perform the tasks on request by the operations and after performing the tasks, the respective operating systems transfer the execution control back to the processors 2001, 2008, and 2014. The processors 2001, 2008, and 2014 continue the execution to obtain one or more outputs. The outputs of the execution of the callback notification application 2002a, the modules, for example, 316a, 316b, 316c, 316d, 316e, 316f, 316g, 316h, 316i, 316j, 316k, 316l, 316m, 316n, etc., on the application server 314, and the modules, for example, 318a, 318b, 318c, 318d, 318e, 318f, 318g, 318h, 318i, 318j, 318k, 318l, etc., on the callback notification media platform 317 respectively, are displayed to the user on the graphical user interface (GUI) 2003a of the calling party device 301.

For purposes of illustration, the detailed description refers to the calling party device 301, the application server 314, and the callback notification media platform 317 being run locally as single computer systems; however, the scope of the method and the system 300 disclosed herein is not limited to the calling party device 301, the application server 314, and the callback notification media platform 317 being run locally as single computer systems via their respective operating systems and processors 2001, 2008, and 2014, but may be extended to run remotely over the data network 602 by employing a web browser and a remote server, a mobile phone, or other electronic devices. In an embodiment, one or more portions of the system 300 disclosed herein are distributed across one or more computer systems (not shown) coupled to the data network 602. Furthermore, although the detailed descriptions of FIGS. 3A-20 relate to an implementation of the callback notification system 305 comprising the event monitor 313, the application server 314, and the callback notification media platform 317, the callback notification system 305 is not limited to be implemented using the event monitor 313, the application server 314, and the callback notification media platform 317, but may be extended to be implemented using a single server or a network of two or more servers and computer systems.

The non-transitory computer readable storage media disclosed herein stores computer program codes comprising instructions executable by the processors 2001, 2008, and 2014 for sending one or more callback notifications comprising a missed call ring alert from a source number of the calling party device 301 to a destination number of the called party device 308. In the non-transitory computer readable storage media of the callback notification system 305, the computer program codes comprise a first computer program code for receiving communication information comprising the source number of the calling party device 301 and the destination number of the called party device 308 from the calling party device 301 or the network of the calling party associated with the calling party device 301, when an unsuccessful attempt is made by the calling party device 301 to contact the called party device 308 due to insufficient credit for voice communication, and/or a short message service (SMS) communication, and/or data communication over the network in the calling party's account or absence of network connectivity between the calling party device 301 and the called party device 308; a second computer program code for placing a call to the destination number with an identification of the originator of the call as the source number using the received communication information; a third computer program code for identifying a ring of the called party device 308 when the call successfully reaches the destination number; and a fourth computer program code for terminating the call on the identification of the ring of the called party device 308 and prior to chargeable completion of the call, thereby sending the missed call ring alert from the source number of the calling party device 301 to the destination number of the called party device 308.

The computer program codes further comprise a fifth computer program code for sending one or more alternative callback notifications to the called party device 308 when the placement of the call to the destination number of the called party device 308 for sending of the missed call ring alert to the destination number is unsuccessful, and a sixth computer program code for sending one or more alternative callback notifications concurrently with the missed call ring alert to the called party device 308. The computer program codes further comprise a seventh computer program code for reporting, to the calling party device 301, status of the missed call ring alert and one or more alternative callback notifications sent to the called party device 308.

The first computer program code receives the communication information from the mobile switching center (MSC) of the carrier network 1101 associated with the calling party device 301, that is, MSC-A 302 or the service control point (SCP) 303 of the carrier network 1101, or the specialized resource function (SRF) node 315 of the carrier network 1101, or the billing server 702, or the mediation platform 701, or the callback notification application 2002a implemented on the calling party device 301 as exemplarily illustrated in FIGS. 3A-3F, FIGS. 7-8, FIGS. 9A-9B, and FIG. 10. The first computer program code comprises an eighth computer program code for processing call detail records received from the SCP 303 of an IN 304, or the billing server 702, or the mediation platform 701, to the callback notification system 305 to obtain the communication information. The eighth computer program code comprises a ninth computer program code for applying filters to the call detail records for identifying communication attempts made by the calling party device 301 to contact the called party device 308 that are unsuccessful due to insufficient credit for voice communication, and/or a short message service (SMS) communication, and/or data communication over the carrier network 1101 in the calling party's account, or absence of network connectivity between the calling party device 301 and the called party device 308, if the call detail records received from the SCP 303 of the IN 304, or the billing server 702, or the mediation platform 701 are unfiltered.

In an embodiment, the first computer program code further comprises a tenth computer program code for receiving the communication information from the service control point (SCP) 303 of the carrier network 1101 by receiving signaling information and data traffic processed by the SCP 303 of the carrier network 1101 using mirroring on a switch 401 connected to the SCP 303 exemplarily illustrated in FIG. 4. The computer program codes further comprise an eleventh computer program code for detecting communication attempts made by the calling party device 301 to contact the called party device 308 that are unsuccessful due to insufficient credit for voice communication, and/or short message service (SMS) communication, and/or data communication over the carrier network 1101 in the calling party's account, in communication with the callback notification application 2002a on the calling party device 301.

The computer program code further comprises a twelfth computer program code for generating separate call detail records for each of the sent missed call ring alerts and a thirteenth computer program code for calculating revenue generated from callbacks from the called party device 308 to the calling party device 301 by correlating the separate call details records for each of the sent missed call ring alerts with call detail records of the callbacks. The computer program codes further comprise a fourteenth computer program code for analyzing the communication information of the unsuccessful communication attempt made by the calling party device 301 to contact the called party device 308 based on one or more predetermined parameters to determine whether the calling party associated with the calling party device 301 as identified by the source number of the calling party device 301 and the called party associated with the called party device 308 as identified by the destination number of the called party device 308 qualify for sending of the missed call ring alert from the source number of the calling party device 301 to the destination number of the called party device 308 as disclosed in the detailed description of FIG. 1. The computer program codes further comprise a fifteenth computer program code for providing multiple options to the calling party device 301 for communicating with the called party device 308, when the unsuccessful communication attempt is made by the calling party device 301 to contact the called party device 308 due to the insufficient credit for voice communication, and/or short message service (SMS) communication, and/or data communication over the carrier network 1101 in the calling party's account as disclosed in the detailed description of FIG. 1.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used in the method disclosed herein are C, C++, C#, Java®, JavaScript®, Fortran, Ruby, Perl®, Python®, Visual Basic®, hypertext preprocessor (PHP), Microsoft®.NET, Objective-C®, the Swift™ programming language of Apple Inc., etc. Other object-oriented, functional, scripting, and/or logical programming languages can also be used. In an embodiment, the computer program codes or software programs are stored on or in one or more mediums as object code. In another embodiment, various aspects of the method and the system 300 exemplarily illustrated in FIGS. 3A-20, disclosed herein are implemented in a non-programmed environment comprising documents created, for example, in a hypertext markup language (HTML), an extensible markup language (XML), or other format that render aspects of the graphical user interface (GUI) 2003a exemplarily illustrated in FIG. 20, or perform other functions, when viewed in a visual area or a window of a browser program. In another embodiment, various aspects of the method and the system 300 disclosed herein are implemented as programmed elements, or non-programmed elements, or any suitable combination thereof.

Where databases are described such as the client database 2002b, the server database 2009a, and the platform database 2015a exemplarily illustrated in FIG. 20, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 300, the databases are integrated to communicate with each other for enabling simultaneous updates of data linked across the databases, when there are any updates to the data in one of the databases.

The method and the system 300 disclosed herein can be configured to work in a network environment comprising one or more computers that are in communication with one or more devices via the data network 602 exemplarily illustrated in FIG. 20. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the data network 602. Each of the computers and the devices executes an operating system, examples of which are disclosed above. While the operating system may differ depending on the type of computer, the operating system provides the appropriate communications protocols to establish communication links with the data network 602. Any number and type of machines may be in communication with the computers.

The method and the system 300 disclosed herein are not limited to a particular computer system platform, processor, operating system, or network. In an embodiment, one or more aspects of the method and the system 300 disclosed herein are distributed among one or more computer systems, for example, servers configured to provide one or more services to one or more client computers, or to perform a complete task in a distributed system. For example, one or more aspects of the method and the system 300 disclosed herein are performed on a client-server system that comprises components distributed among one or more server systems that perform multiple functions according to various embodiments. These components comprise, for example, executable, intermediate, or interpreted code, which communicate over the data network 602 using a communication protocol. The method and the system 300 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the system 300 disclosed herein. While the method and the system 300 have been described with reference to various embodiments, it is understood that the words, which have been used herein, are words of description and illustration, rather than words of limitation. Further, although the method and the system 300 have been described herein with reference to particular means, materials, and embodiments, the method and the system 300 are not intended to be limited to the particulars disclosed herein; rather, the method and the system 300 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the system 300 disclosed herein in their aspects.

We claim:
1. A method for sending a callback notification comprising a missed call ring alert from a source number of a calling party device to a destination number of a called party device, said method employing a callback notification system comprising at least one processor configured to execute computer program instructions for performing said method comprising:
  receiving communication information comprising said source number and said destination number from one of said calling party device and a network of a calling party associated with said calling party device by said callback notification system, when an unsuccessful communication attempt is made by said calling party device to contact said called party device;
  determining whether one or more of said calling party and a called party qualify for said sending said missed call ring alert from said source number to said destination number based on a qualification score of one or more of said calling party and said called party, by said callback notification system;

placing a call to said destination number with an identification of an originator of said call as said source number by said callback notification system using said received communication information based on said qualification of one or more of said calling party and said called party for sending said callback notification;

identifying a ring of said called party device by said callback notification system when said call successfully reaches said destination number; and terminating said call by said callback notification system on said identification of said ring of said called party device and prior to chargeable completion of said call, thereby sending said missed call ring alert from said source number of said calling party device to said destination number of said called party device by said callback notification system.

2. The method of claim 1, wherein said unsuccessful communication attempt made by said calling party device to contact said called party device is due to one of insufficient credit for one or more of voice communication, a short message service communication, and data communication over said network in an account registered by said network for said calling party associated with said calling party device and absence of network connectivity between said calling party device and said called party device.

3. The method of claim 1, further comprising sending one or more of a plurality of alternative callback notifications to said called party device by said callback notification system when said placement of said call to said destination number of said called party device for said sending of said missed call ring alert to said destination number by said callback notification system is unsuccessful, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

4. The method of claim 1, further comprising sending one or more of a plurality of alternative callback notifications concurrently with said missed call ring alert to said called party device by said callback notification system, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

5. The method of claim 1, further comprising reporting, to said calling party device, status of said missed call ring alert and one or more of a plurality of alternative callback notifications sent to said called party device, by said callback notification system, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

6. The method of claim 1, wherein said communication information is received by said callback notification system from one of a mobile switching center of a carrier network associated with said calling party device, a service control point of said carrier network, a specialized resource function node of said carrier network, a billing server, a mediation platform, and a client application implemented on said calling party device.

7. The method of claim 6, wherein said communication information is received by said callback notification system by processing call detail records received from one of said service control point of an intelligent network, said billing server, and said mediation platform.

8. The method of claim 7, further comprising applying filters to said call detail records by said callback notification system for identifying communication attempts made by said calling party device to contact said called party device that are unsuccessful due to one of insufficient credit for one or more of voice communication, a short message service communication, and data communication over said network in an account registered by said network for said calling party associated with said calling party device and absence of network connectivity between said calling party device and said called party device, if said call detail records received from said one of said service control point of said intelligent network, said billing server, and said mediation platform are unfiltered.

9. The method of claim 6, wherein said communication information is received by said callback notification system from said service control point of said carrier network by receiving signaling information and data traffic processed by said service control point of said carrier network using mirroring on a switch connected to said service control point.

10. The method of claim 1, further comprising detecting communication attempts made by said calling party device to contact said called party device that are unsuccessful due to insufficient credit for one or more of voice communication, a short message service communication, and data communication over said network, by said callback notification system, in communication with a client application implemented on said calling party device.

11. The method of claim 1, wherein said call to said destination number is placed by said callback notification system using signaling resources of said network without reserving media resources for optimizing usage of resources of said network.

12. The method of claim 1, further comprising generating separate call detail records for each said sent missed call ring alert by said callback notification system, and calculating revenue generated from callbacks from said called party device to said calling party device by said callback notification system by correlating said separate call details records for said each said sent missed call ring alert with call detail records of said callbacks.

13. The method of claim 1, further comprising analyzing said communication information of said unsuccessful communication attempt made by said calling party device to contact said called party device for said qualification determination, by said callback notification system, based on one or more of a plurality of predetermined parameters, wherein said predetermined parameters comprise timestamp of said unsuccessful communication attempt made by said calling party device to contact said called party device, time of said placement of said call to said destination number of said called party device for said sending of said missed call ring alert to said destination number, history of communication attempts to contact said destination number, a profile of said calling party, a profile of said called party, time of day, and load on said callback notification system.

14. The method of claim 1, further comprising providing a plurality of options to said calling party device for communicating with said called party device by said callback notification system, when said unsuccessful communication attempt is made by said calling party device to contact said called party device due to insufficient credit for one or more of voice communication, a short message service communication, and data communication over said network in an account registered by said network for said calling party associated with said calling party device, wherein said options comprise:

receiving an advance of credit in said account of said calling party for said one or more of said voice communication, said short message service communication, and said data communication with said called party device over said network;

receiving credit in said account of said calling party for said one or more of said voice communication, said short message service communication, and said data communication over said network in exchange for engaging with an advertisement on said calling party device;

placing a collect call to said called party device based on an agreement from said called party device to pay for said collect call; and sending a callback message to said called party device with a request for a callback to said calling party device using one of a short message service, a subscriber identity module push, network initiated unstructured supplementary service data, a wireless internet browser push, and a client application notification.

15. A callback notification system for sending a callback notification comprising a missed call ring alert from a source number of a calling party device to a destination number of a called party device, said callback notification system comprising:

non-transitory computer readable storage media for storing computer program instructions defined by modules of said callback notification system; and at least one processor communicatively coupled to said non-transitory computer readable storage media, said at least one processor configured to execute said computer program instructions defined by said modules of said callback notification system, said modules comprising:

an event monitor for receiving communication information comprising said source number and said destination number from one of said calling party device and a network of a calling party associated with said calling party device, when an unsuccessful communication attempt is made by said calling party device to contact said called party device;

a missed call attempt analysis and determination module for determining whether one or more of said calling party and a called party qualify for sending said missed call ring alert from said source number to said destination number based on a qualification score of one or more of said calling party and said called party;

a call initiation module for placing a call to said destination number with an identification of an originator of said call as said source number using said received communication information based on said qualification of one or more of said calling party and said called party for sending said callback notification;

a call ringing detection module for identifying a ring of said called party device when said call successfully reaches said destination number; and a call termination module for terminating said call on said identification of said ring of said called party device and prior to chargeable completion of said call, thereby sending said missed call ring alert from said source number of said calling party device to said destination number of said called party device.

16. The callback notification system of claim 15, wherein said unsuccessful communication attempt made by said calling party device to contact said called party device is due to one of insufficient credit for one or more of voice communication, a short message service communication, and data communication over said network in an account registered by said network for said calling party associated with said calling party device and absence of network connectivity between said calling party device and said called party device.

17. The callback notification system of claim 15, wherein said modules further comprise an alternative callback notification module for sending one or more of a plurality of alternative callback notifications to said called party device when said placement of said call to said destination number of said called party device for said sending of said missed call ring alert to said destination number by said call initiation module is unsuccessful, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

18. The callback notification system of claim 15, wherein said modules further comprise an alternative callback notification module for sending one or more of a plurality of alternative callback notifications concurrently with said missed call ring alert to said called party device, wherein said alternative callback notifications comprise, a callback short message service message, a callback client push notification, a callback network initiated unstructured supplementary service data push notification, a callback wireless internet browser push notification, a callback subscriber identity module push notification, a callback electronic mail, and a client application notification.

19. The callback notification system of claim 15, wherein said modules further comprise a status reporting module for reporting, to said calling party device, status of said missed call ring alert and one or more of a plurality of alternative callback notifications sent to said called party device, wherein said alternative callback notifications comprise, a callback short message service message, a callback client push notification, a callback network initiated unstructured supplementary service data push notification, a callback wireless internet browser push notification, a callback subscriber identity module push notification, a callback electronic mail, and a client application notification.

20. The callback notification system of claim 15, wherein said event monitor receives said communication information from one of a mobile switching center of a carrier network associated with said calling party device, a service control point of said carrier network, a specialized resource function node of said carrier network, a billing server, a mediation platform, and a client application implemented on said calling party device.

21. The callback notification system of claim 20, wherein said event monitor receives said communication information by processing call detail records received from one of said service control point of an intelligent network, said billing server, and said mediation platform.

22. The callback notification system of claim 21, wherein said event monitor applies filters to said call detail records for identifying communication attempts made by said calling party device to contact said called party device that are unsuccessful due to one of insufficient credit for one or more of voice communication, a short message service communication, and data communication over said network in an account registered by said network for said calling party associated with said calling party device and absence of network connectivity between said calling party device and said called party device, if said call detail records received from said one of said service control point of said intelligent network, said billing server, and said mediation platform are unfiltered.

23. The callback notification system of claim 20, wherein said event monitor receives said communication information from said service control point of said carrier network by receiving signaling information and data traffic processed by said service control point of said carrier network using mirroring on a switch connected to said service control point.

24. The callback notification system of claim 15, wherein said modules further comprise a callback notification attempt analysis and determination module for detecting communication attempts made by said calling party device to contact said called party device that are unsuccessful due to insufficient credit for one or more of voice communication, a short message service communication, and data communication over said network, in communication with a client application implemented on said calling party device.

25. The callback notification system of claim 15, wherein said call initiation module places said call to said destination number using signaling resources of said network without reserving media resources for optimizing usage of resources of said network.

26. The callback notification system of claim 15, wherein said modules further comprise a call detail recorder and analyzer for generating separate call detail records for each said sent missed call ring alert and calculating revenue generated from callbacks from said called party device to said calling party device by correlating said separate call details records for said each said sent missed call ring alert with call detail records of said callbacks.

27. The callback notification system of claim 15, wherein said callback notification attempt analysis and determination module analyzes said communication information of said unsuccessful communication attempt made by said calling party device to contact said called party device for said qualification determination, based on one or more of a plurality of predetermined parameters, wherein said predetermined parameters comprise timestamp of said unsuccessful communication attempt made by said calling party device to contact said called party device, time of said placement of said call to said destination number of said called party device for said sending of said missed call ring alert to said destination number, history of communication attempts to contact said destination number, a profile of said calling party, a profile of said called party, time of day, and load on said callback notification system.

28. The callback notification system of claim 15, wherein said modules further comprise a contact completion module for providing a plurality of options to said calling party device for communicating with said called party device, when said unsuccessful communication attempt is made by said calling party device to contact said called party device due to insufficient credit for one or more of voice communication, a short message service communication, and data communication over said network in an account registered by said network for said calling party associated with said calling party device, wherein said options comprise:
  receiving an advance of credit in said account of said calling party for said one or more of said voice communication, said short message service communication, and said data communication with said called party device over said network;
  receiving credit in said account of said calling party for said one or more of said voice communication, said short message service communication, and said data communication over said network in exchange for engaging with an advertisement on said calling party device;
  placing a collect call to said called party device based on an agreement from said called party device to pay for said collect call; and
  sending a callback message to said called party device with a request for a callback to said calling party device using one of a short message service, a subscriber identity module push, network initiated unstructured supplementary service data, a wireless internet browser push, and a client application notification.

29. A non-transitory computer readable storage medium having embodied thereon, computer program codes comprising instructions executable by at least one processor for sending a callback notification comprising a missed call ring alert from a source number of a calling party device to a destination number of a called party device, said computer program codes comprising:
  a first computer program code for receiving communication information comprising said source number and said destination number from one of said calling party device and a network of a calling party associated with said calling party device, when an unsuccessful communication attempt is made by said calling party device to contact said called party device due to one of insufficient credit for one or more of voice communication, a short message service communication, and data communication over said network in an account registered by said network for said calling party associated with said calling party device and absence of network connectivity between said calling party device and said called party device;
  a second computer program code for determining whether one or more of said calling party and a called party qualify for sending said missed call ring alert from said source number to said destination number based on a qualification score of one or more of said calling party and said called party, by said callback notification system;
  a third computer program code for placing a call to said destination number with an identification of an originator of said call as said source number using said received communication information based on said qualification of one or more of said calling party and said called party for sending said callback notification;
  a fourth computer program code for identifying a ring of said called party device when said call successfully reaches said destination number; and
  a fifth computer program code for terminating said call on said identification of said ring of said called party device and prior to chargeable completion of said call, thereby sending said missed call ring alert from said source number of said calling party device to said destination number of said called party device.

30. The non-transitory computer readable storage medium of claim 29, wherein said computer program codes further comprise a sixth computer program code for sending one or more of a plurality of alternative callback notifications to said called party device when said placement of said call to said destination number of said called party device for said sending of said missed call ring alert to said destination number is unsuccessful, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

31. The non-transitory computer readable storage medium of claim 29, wherein said computer program codes further comprise a seventh computer program code for sending one or more of a plurality of alternative callback notifications concurrently with said missed call ring alert to said called party device, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

32. The non-transitory computer readable storage medium of claim 29, wherein said computer program codes further comprise a eighth computer program code for reporting, to said calling party device, status of said missed call ring alert and one or more of a plurality of alternative callback notifications sent to said called party device, wherein said alternative callback notifications comprise a callback short message service message, a callback client push notification, a callback network initiated unstructured supplementary service data push notification, a callback wireless internet browser push notification, a callback subscriber identity module push notification, a callback electronic mail, and a client application notification.

33. The non-transitory computer readable storage medium of claim 29, wherein said first computer program code receives said communication information from one of a mobile switching center of a carrier network associated with said calling party device, a service control point of said carrier network, a specialized resource function node of said carrier network, a billing server, a mediation platform, and a client application implemented on said calling party device.

34. The non-transitory computer readable storage medium of claim 33, wherein said first computer program code comprises a ninth computer program code for processing call detail records received from one of said service control point of an intelligent network, said billing server, and said mediation platform to obtain said communication information.

35. The non-transitory computer readable storage medium of claim 34, wherein said ninth computer program code comprises a tenth computer program code for applying filters to said call detail records for identifying communication attempts made by said calling party device to contact said called party device that are unsuccessful due to said one of said insufficient credit for said one or more of said voice communication, said short message service communication, and said data communication over said network in said account registered by said network for said calling party associated with said calling party device and said absence of said network connectivity between said calling party device and said called party device, if said call detail records received from said one of said service control point of said intelligent network, said billing server, and said mediation platform are unfiltered.

36. The non-transitory computer readable storage medium of claim 33, wherein said first computer program code comprises a eleventh computer program code for receiving said communication information from said service control point of said carrier network by receiving signaling information and data traffic processed by said service control point of said carrier network using mirroring on a switch connected to said service control point.

37. The non-transitory computer readable storage medium of claim 29, wherein said computer program codes further comprise a twelfth computer program code for detecting communication attempts made by said calling party device to contact said called party device that are unsuccessful due to said insufficient credit for said one or more of said voice communication, said short message service communication, and said data communication over said network, in communication with a client application implemented on said calling party device.

38. The non-transitory computer readable storage medium of claim 29, wherein said computer program codes further comprise:
    a thirteenth computer program code for generating separate call detail records for each said sent missed call ring alert; and
    a fourteenth computer program code for calculating revenue generated from callbacks from said called party device to said calling party device by correlating said separate call details records for said each said sent missed call ring alert with call detail records of said callbacks.

39. The non-transitory computer readable storage medium of claim 29, wherein said computer program codes further comprise a fifteenth computer program code for analyzing said communication information of said unsuccessful communication attempt made by said calling party device to contact said called party device for said qualification determination, based on one or more of a plurality of predetermined parameters, wherein said predetermined parameters comprise timestamp of said unsuccessful communication attempt made by said calling party device to contact said called party device, time of said placement of said call to said destination number of said called party device for said sending of said missed call ring alert to said destination number, history of communication attempts to contact said destination number, a profile of said calling party, a profile of said called party, time of day, and load on a callback notification system.

40. The non-transitory computer readable storage medium of claim 29, wherein said computer program codes further comprise a sixteenth computer program code for providing a plurality of options to said calling party device for communicating with said called party device, when said unsuccessful communication attempt is made by said calling party device to contact said called party device due to said insufficient credit for said one or more of said voice communication, said short message service communication, and said data communication over said network in said account registered by said network for said calling party associated with said calling party device, wherein said options comprise:

receiving an advance of credit in said account of said calling party for said one or more of said voice communication, said short message service communication, and said data communication with said called party device over said network;

receiving credit in said account of said calling party for said one or more of said voice communication, said short message service communication, and said data communication over said network in exchange for engaging with an advertisement on said calling party device;

placing a collect call to said called party device based on an agreement from said called party device to pay for said collect call; and sending a callback message to said called party device with a request for a callback to said calling party device using one of a short message service, a subscriber identity module push, network initiated unstructured supplementary service data, a wireless internet browser push, and a client application notification.

41. A method for sending a callback notification comprising a missed call ring alert from a source number of a calling party device to a destination number of a called party device, said method employing a callback notification system comprising at least one processor configured to execute computer program instructions for performing said method comprising:

receiving communication information comprising said source number and said destination number from a network of said calling party device by said callback notification system, when an unsuccessful communication attempt is made by said calling party device to contact said called party device;

placing a call to said destination number with an identification of an originator of said call as said source number by said callback notification system using said received communication information;

identifying a ring of said called party device by said callback notification system when said call successfully reaches said destination number; and terminating said call by said callback notification system on said identification of said ring of said called party device and prior to chargeable completion of said call, thereby sending said missed call ring alert from said source number of said calling party device to said destination number of said called party device by said callback notification system.

* * * * *